(12) United States Patent
Reynolds et al.

(10) Patent No.: US 8,500,992 B2
(45) Date of Patent: *Aug. 6, 2013

(54) PROCESS FOR TREATING A HYDROCARBON-CONTAINING FEED

(75) Inventors: Michael Anthony Reynolds, Katy, TX (US); Stanley Nemec Milam, Houston, TX (US); Scott Lee Wellington, Bellaire, TX (US)

(73) Assignee: Shell Oil Company, Houston, TX (US)

(*) Notice: Subject to any disclaimer, the term of this patent is extended or adjusted under 35 U.S.C. 154(b) by 267 days.

This patent is subject to a terminal disclaimer.

(21) Appl. No.: 13/010,895

(22) Filed: Jan. 21, 2011

(65) Prior Publication Data

US 2011/0192764 A1 Aug. 11, 2011

Related U.S. Application Data

(60) Provisional application No. 61/297,101, filed on Jan. 21, 2010, provisional application No. 61/297,108, filed on Jan. 21, 2010.

(51) Int. Cl.
| | |
|---|---|
| *C10G 47/06* | (2006.01) |
| *C10G 47/02* | (2006.01) |
| *C10G 47/24* | (2006.01) |
| *C10G 47/26* | (2006.01) |

(52) U.S. Cl.
USPC ............. 208/112; 208/46; 208/106; 208/107; 208/108; 208/121; 502/100; 502/216; 502/219; 502/220; 502/221; 502/300

(58) Field of Classification Search
USPC .................. 208/106, 107, 108, 46, 112, 113, 208/121; 502/100, 216, 219, 220, 221, 300
See application file for complete search history.

(56) References Cited

U.S. PATENT DOCUMENTS

| | | | | | |
|---|---|---|---|---|---|
| 4,557,821 | A | * | 12/1985 | Lopez et al. ................. | 208/108 |
| 4,581,125 | A | * | 4/1986 | Stiefel et al. ................. | 208/108 |
| 5,300,212 | A | * | 4/1994 | Winter, Jr. .................... | 208/67 |
| 5,484,755 | A | * | 1/1996 | Lopez ........................... | 502/219 |
| 2008/0135450 | A1 | * | 6/2008 | Reynolds et al. ............. | 208/108 |
| 2009/0008291 | A1 | * | 1/2009 | Chabot et al. ................. | 208/57 |

OTHER PUBLICATIONS

Parkash, S, Refining Processes Handbook, 2003, Gulf Prof. Publishing, pp. 62-108.*
Hou, H, Mo(W,V)-Cu(Ag)-S(Se) Cluster Compoungs, Coordination Chemistry Reviews, 153, 1996, Elsevier, pp. 25-56.*
Rana, M, A Review of Recent Advances on Process Technologies for Upgrading of Heavy Oils and Residua, Fuel 86, 2007, pp. 1216-1231.*

* cited by examiner

*Primary Examiner* — Walter D Griffin
*Assistant Examiner* — Derek Mueller

(57) ABSTRACT

A process for treating a hydrocarbon-containing feed is provided in which a hydrocarbon-containing feed comprising at least 20 wt. % of heavy hydrocarbons is mixed with hydrogen and a catalyst to produce a hydrocarbon-containing product. The catalyst is comprised of a material comprised of a first metal and a second metal, where the first metal is selected from the group consisting of Cu, Fe, Bi, Ag, Mn, Zn, Sn, Ru, La, Pr, Sm, Eu, Yb, Lu, Dy, Pb, and Sb and the second metal is Mo, W, V, Sn, and Sb.

24 Claims, 9 Drawing Sheets

US 8,500,992 B2

PROCESS FOR TREATING A HYDROCARBON-CONTAINING FEED

CROSS REFERENCE TO RELATED APPLICATION

The present application claims the benefit of priority from U.S. Provisional Patent Application Ser. No. 61/297,101 filed Jan. 21, 2010 and U.S. Provisional Patent Application Ser. No. 61/297,108 filed Jan. 21, 2010.

FIELD OF THE INVENTION

The present invention is directed to a process for treating a hydrocarbon-containing feedstock.

BACKGROUND OF THE INVENTION

Increasingly, resources such as heavy crude oils, bitumen, tar sands, shale oils, and hydrocarbons derived from liquefying coal are being utilized as hydrocarbon sources due to decreasing availability of easily accessed light sweet crude oil reservoirs. These resources are disadvantaged relative to light sweet crude oils, containing significant amounts of heavy hydrocarbon fractions such as residue and asphaltenes, and often containing significant amounts of sulfur, nitrogen, metals, and/or naphthenic acids. The disadvantaged crudes typically require a considerable amount of upgrading, for example by cracking and by hydrotreating, in order to obtain more valuable hydrocarbon products. Upgrading by cracking, either thermal cracking, hydrocracking and/or catalytic cracking, is also effective to partially convert heavy hydrocarbon fractions such as atmospheric or vacuum residues derived from refining a crude oil or hydrocarbons derived from liquefying coal into lighter, more valuable hydrocarbons.

Numerous processes have been developed to crack and treat disadvantaged crude oils and heavy hydrocarbon fractions to recover lighter hydrocarbons and to reduce metals, sulfur, nitrogen, and acidity of the hydrocarbon-containing material. For example, a hydrocarbon-containing feedstock may be cracked and hydrotreated by passing the hydrocarbon-containing feedstock over a catalyst located in a fixed bed catalyst reactor in the presence of hydrogen at a temperature effective to crack heavy hydrocarbons in the feedstock and/or to reduce the sulfur content, nitrogen content, metals content, and/or the acidity of the feedstock. Another commonly used method to crack and/or hydrotreat a hydrocarbon-containing feedstock is to disperse a catalyst in the feedstock and pass the feedstock and catalyst together with hydrogen through a slurry-bed, or fluid-bed, reactor operated at a temperature effective to crack heavy hydrocarbons in the feedstock and/or to reduce the sulfur content, nitrogen content, metals content, and/or the acidity of the feedstock. Examples of such slurry-bed or fluid-bed reactors include ebullating-bed reactors, plug-flow reactors, and bubble-column reactors.

Coke formation, however, is a particular problem in processes for cracking a hydrocarbon-containing feedstock having a relatively large amount of heavy hydrocarbons such as residue and asphaltenes. Substantial amounts of coke are formed in the current processes for cracking heavy hydrocarbon-containing feedstocks, limiting the yield of lighter molecular weight hydrocarbons that can be recovered and decreasing the efficiency of the cracking process by limiting the extent of hydrocarbon conversion that can be effected per cracking step in the process, for example, by deactivating the catalysts used in the process.

Cracking heavy hydrocarbons involves breaking bonds of the hydrocarbons, particularly carbon-carbon bonds, thereby forming two hydrocarbon radicals for each carbon-carbon bond that is cracked in a hydrocarbon molecule. Numerous reaction paths are available to the cracked hydrocarbon radicals, the most important being: 1) reaction with a hydrogen donor to form a stable hydrocarbon molecule that is smaller in terms of molecular weight than the original hydrocarbon from which it was derived; and 2) reaction with another hydrocarbon or another hydrocarbon radical to form a hydrocarbon molecule larger in terms of molecular weight than the cracked hydrocarbon radical—a process called annealation. The first reaction is desired, it produces hydrocarbons of lower molecular weight than the heavy hydrocarbons contained in the feedstock—and preferably produces naphtha, distillate, or gas oil hydrocarbons. The second reaction is undesired and leads to the production of coke as the reactive hydrocarbon radical combines with another hydrocarbon or hydrocarbon radical. Furthermore, the second reaction is autocatalytic since the growing coke particles are reactive with the cracked hydrocarbon radicals. Hydrocarbon-containing feedstocks having a relatively high concentration of heavy hydrocarbon molecules therein are particularly susceptible to coking due to the presence of a large quantity of high molecular weight hydrocarbons in the feedstock with which cracked hydrocarbon radicals may combine to form proto-coke or coke. As a result, cracking processes of heavy hydrocarbon-containing feedstocks have been limited by coke formation induced by the cracking reaction itself.

Numerous catalysts have been developed for use in processes for cracking disadvantaged hydrocarbon feedstocks, however, such catalysts have not eliminated problems associated with coking, and catalyst activity may be significantly reduced over time by accumulation of coke on the catalyst. Catalysts used in fixed catalyst bed reactors typically contain a Group VIB and/or Group VIII metal supported on a carrier formed of alumina, silica, or alumina-silica. The carrier is generally selected to possess acidic properties that catalytically facilitate cracking by promoting the formation of radical carbo-cation hydrocarbon species from cracked hydrocarbons. Fixed bed cracking catalysts are also generally porous and highly adsorptive, where the pores and pore size distribution of the catalysts are determined by the carrier on which active metals are placed. The pores and pore size distribution of such catalysts markedly affect the activity, selectivity, and the cracking reaction rate. The active Group VIB and/or Group VIII metals of the catalyst facilitate hydrogenation of the cracked hydrocarbon radicals. Such catalysts are commonly sulfided to activate the catalyst, either before contacting the catalyst with a disadvantaged hydrocarbon feed or in situ with the disadvantaged hydrocarbon feed.

Processes that utilize fixed bed catalysts to crack a heavy hydrocarbon-containing material suffer significantly from catalyst aging due to coke deposition on the catalyst over time. As noted above, coke and proto-coke formation occurs in cracking a hydrocarbon-containing material, and is particularly problematic when the hydrocarbon-containing material is a heavy hydrocarbon-containing material, for example, containing at least 20 wt. % pitch, residue, and/or asphaltenes. The coke that is formed in the cracking process deposits on the catalyst progressively over time, plugging the catalyst pores and covering the surface of the catalyst. The coked catalyst loses its catalytic activity and, ultimately, must be replaced. Furthermore, the cracking process must be conducted at relatively low cracking temperatures to prevent rapid deactivation of the catalyst by annealation leading to coke deposition.

Slurry catalyst processes have been utilized to address the problem of catalyst aging by coke deposition in the course of cracking a hydrocarbon-containing feedstock. Slurry catalyst particles are selected to be dispersible in the hydrocarbon-containing feedstock or in vaporized hydrocarbon-containing feedstock so the slurry catalysts circulate with the hydrocarbon-containing feedstock in the course of cracking the feedstock. The feedstock and the catalyst move together through the cracking reactor and are separated upon exiting the cracking reactor. Coke formed during the cracking reaction is separated from the product, and any coke deposited on the catalyst may be removed from the catalyst by regenerating the catalyst. The regenerated catalyst may then be recirculated with fresh hydrocarbon-containing feedstock through the cracking reactor. The process, therefore, is not affected by catalyst aging since fresh catalyst may be continually added into the cracking reactor, and catalyst upon which coke has been deposited may be continually regenerated.

Other slurry catalysts have been used in slurry cracking processes for the purpose of seeding the formation of coke. Very small particle slurry catalysts may be dispersed in a hydrocarbon-containing feedstock for the purpose of providing a plethora of small sites upon which coke may deposit in the course of the cracking process. This inhibits the formation of large coke particles since the coke may be dispersed throughout the hydrocarbon-containing feedstock on the small catalyst particles.

U.S. Pat. No. 4,557,821 provides a slurry catalyst formed of dispersed particles of highly active molybdenum disulfide useful for cracking a hydrocarbon-containing feedstock. The slurry catalyst exists as a substantially homogeneous dispersion of small particles in oil, where the catalyst's activity is dependent on the smallness of the particle size and resultant relatively large surface area rather than its pore characteristics. The catalyst does not have a porous support, e.g. a silica, alumina, or silica-alumina carrier, but is formed substantially only of molybdenum sulfides and molybdenum oxy-sulfides.

Although presently known slurry catalysts and slurry cracking processes utilizing such catalysts do not suffer the catalyst aging problems of fixed bed catalysts and fixed bed catalyst processes in cracking a heavy hydrocarbon-containing feedstock, coking is still a significant problem. Coking limits the yield of lighter molecular weight hydrocarbons that can be recovered from the cracking process since a portion of the hydrocarbons in the hydrocarbon-containing feedstock are converted to coke rather than to the desired lighter molecular weight hydrocarbons. Coking also decreases the efficiency of the cracking process by limiting the extent of hydrocarbon conversion that can be effected per cracking step in the process, even in a slurry process, since the hydrocarbon-containing feedstock and the catalyst must be periodically removed from the cracking process to separate developing coke particles to prevent excessive coking. The slurry catalysts may actually increase coking, for example, the slurry catalyst disclosed in U.S. Pat. No. 4,557,821 is described as "a very active coking catalyst", and a process is disclosed therein for using such a slurry catalyst that requires the use of exacting, slow heating steps to avoid massive coking.

Improved processes for cracking heavy hydrocarbon-containing feedstocks are desirable, particularly those in which coke formation is significantly reduced.

SUMMARY OF THE INVENTION

The present invention is directed to a process for cracking a hydrocarbon-containing feedstock, comprising:
mixing, at a temperature selected from 375° C. to 500° C. and a total pressure selected from 6.9 MPa to 27.5 MPa:
a) a hydrocarbon-containing feedstock containing at least 20 wt. % hydrocarbons having a boiling point of greater than 538° C. as determined in accordance with ASTM Method D5307;
b) hydrogen; and
c) a catalyst comprising a material comprised of a first metal and a second metal where the first metal is selected from the group consisting of Cu, Fe, Ni, Co, Bi, Ag, Mn, Zn, Sn, Ru, La, Ce, Pr, Sm, Eu, Yb, Lu, Dy, Pb, and Sb, and where the second metal is selected from the group consisting of Mo, W, V, Sn, and Sb, where the second metal is different from the first metal, and wherein at least a portion of the material of the catalyst has a structure according to a formula selected from the group consisting of formula (I), formula (II), formula (III), and formula (IV);

where M is either the first metal or the second metal, and at least one M is the first metal and at least one M is the second metal;

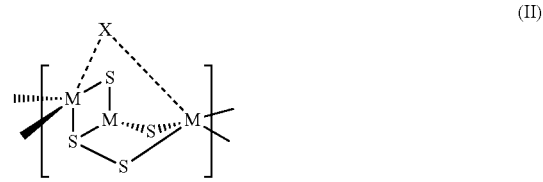

where M is either the first metal or the second metal, and at least one M is the first metal and at least one M is the second metal, and X is selected from the group consisting of $SO_4$, $PO_4$, oxalate $(C_2O_4)$, acetylacetonate, acetate, citrate, tartrate, Cl, Br, I, $ClO_4$, and $NO_3$;

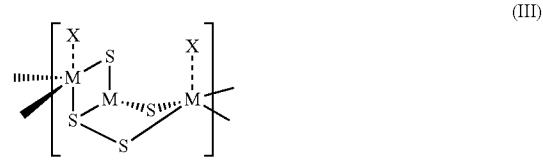

where M is either the first metal or the second metal, and at least one M is the first metal and at least one M is the second metal, and X is selected from the group consisting of $SO_4$, $PO_4$, oxalate $(C_2O_4)$, acetylacetonate, acetate, citrate, tartrate, Cl, Br, I, $ClO_4$, and $NO_3$;

where M is either the first metal or the second metal, and at least one M is the first metal and at least one M is the second metal, and X is selected from the group consisting of SO$_4$, PO$_4$, oxalate (C$_2$O$_4$), acetylacetonate, acetate, citrate, tartrate, Cl, Br, I, ClO$_4$, and NO$_3$;

where the hydrocarbon-containing feedstock, catalyst, and hydrogen form a mixture upon mixing; and while mixing the mixture at the selected temperature and selected total pressure, separating a vapor comprising a hydrocarbon-containing product from the mixture, where the hydrocarbon-containing product is comprised of one or more hydrocarbon compounds that are liquid at STP.

DETAILED DESCRIPTION OF THE INVENTION

Figure 1:
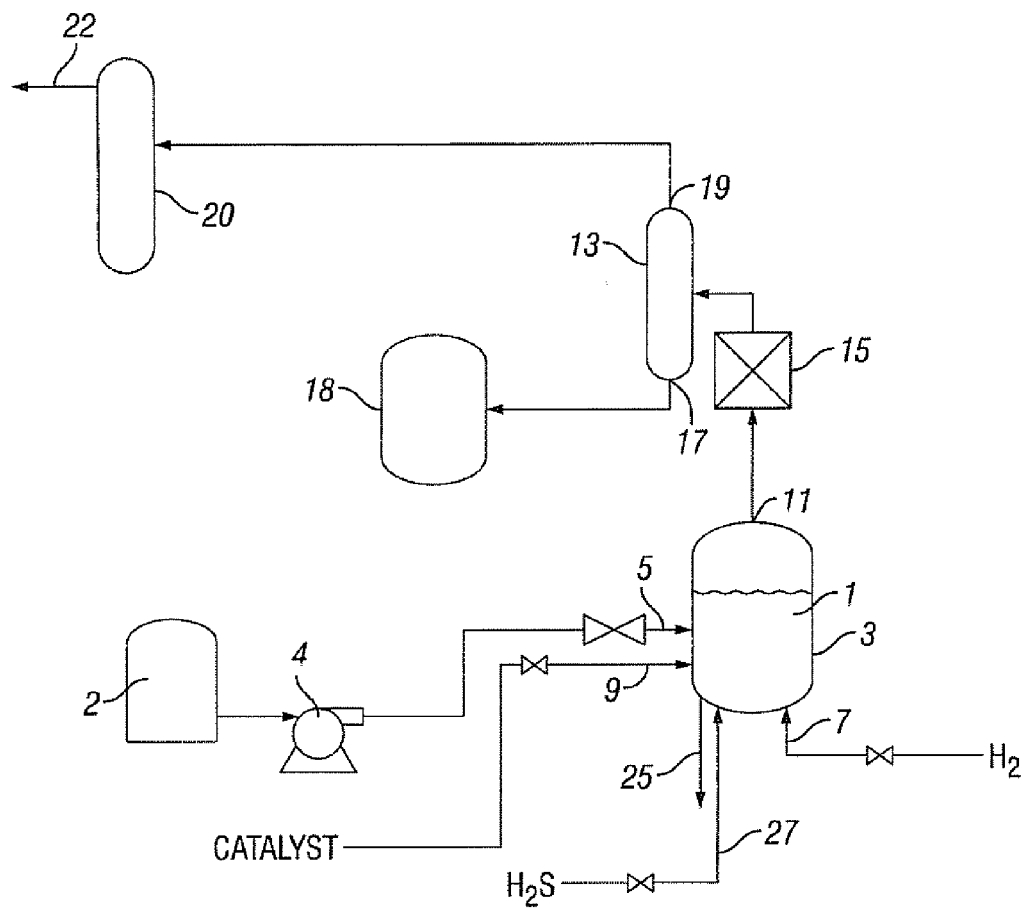
FIG. 1 is a schematic of a system useful for practicing the process of the present invention.

The present invention is directed to a process for cracking a hydrocarbon-containing feedstock containing at least 20 wt. % heavy hydrocarbons utilizing a thiometallate catalyst including a material comprised of a first metal and a second metal and sulfur, where the first metal is selected from the group consisting of copper (Cu), iron (Fe), nickel (Ni), cobalt (Co) bismuth (Bi), silver (Ag), manganese (Mn), zinc (Zn), tin (Sn), ruthenium (Ru), lanthanum (La), praseodymium (Pr), samarium (Sm), europium (Eu), ytterbium (Yb), lutetium (Lu), dysprosium (Dy), lead (Pb), and antimony (Sb), and where the second metal is selected from the group consisting of molybdenum (Mo), tungsten (W), vanadium (V), tin (Sn), and antimony (Sb), where the second metal is not the same as the first metal. At least a portion of the catalyst material has a structure in accordance with formula (I), formula (II), formula (III), and/or formula (IV):

(I)

where M is either the first metal or the second metal, and at least one M is the first metal and at least one M is the second metal;

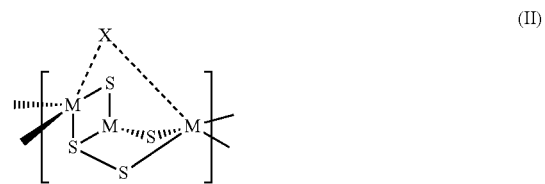

(II)

where M is either the first metal or the second metal, and at least one M is the first metal and at least one M is the second metal, and X is selected from the group consisting of SO$_4$, PO$_4$, oxalate (C$_2$O$_4$), acetylacetonate, acetate, citrate, tartrate, Cl, Br, I, ClO$_4$, and NO$_3$;

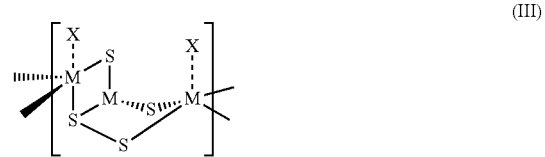

(III)

where M is either the first metal or the second metal, and at least one M is the first metal and at least one M is the second metal, and X is selected from the group consisting of SO$_4$, PO$_4$, oxalate (C$_2$O$_4$), acetylacetonate, acetate, citrate, tartrate, Cl, Br, I, ClO$_4$, and NO$_3$;

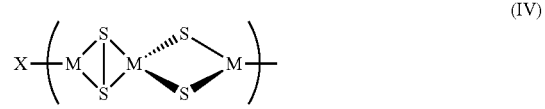

(IV)

where M is either the first metal or the second metal, and at least one M is the first metal and at least one M is the second metal, and X is selected from the group consisting of SO$_4$, PO$_4$, oxalate (C$_2$O$_4$), acetylacetonate, acetate, citrate, tartrate, Cl, Br, I, ClO$_4$, and NO$_3$. The material of the catalyst may be a polythiometallate polymer formed of repeating monomeric units having a structure in accordance with formula (V), formula (VI), formula (VII), and/or formula (VIII).

(V)

where M is either the first metal or the second metal, at least one M is the first metal, at least one M is the second metal, and where x is at least 2 and preferably is at least 5;

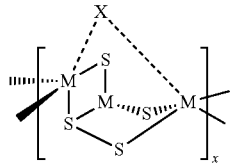

(VI)

where M is either the first metal or the second metal, and at least one M is the first metal and at least one M is the second metal, X is selected from the group consisting of $SO_4$, $PO_4$, oxalate ($C_2O_4$), acetylacetonate, acetate, citrate, tartrate, Cl, Br, I, $ClO_4$, and $NO_3$, and x is at least 2 and preferably is at least 5;

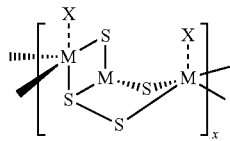

(VII)

where M is either the first metal or the second metal, and at least one M is the first metal and at least one M is the second metal, X is selected from the group consisting of $SO_4$, $PO_4$, oxalate ($C_2O_4$), acetylacetonate, acetate, citrate, tartrate, Cl, Br, I, $ClO_4$, and $NO_3$, and x is at least 2 and preferably is at least 5;

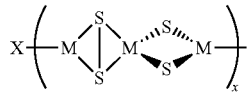

(VIII)

where M is either the first metal or the second metal, at least one M is the first metal and at least one M is the second metal, X is selected from the group consisting of $SO_4$, $PO_4$, oxalate ($C_2O_4$), acetylacetonate, acetate, citrate, tartrate, Cl, Br, I, $ClO_4$, and $NO_3$, and x is at least 2 and preferably is at least 5.

The material of the catalyst may be tetrathiometallate material comprised of alternating $M^1S_4$ and $M^2S_4$ tetrahedral formations located adjacent to each other, where $M^1$ is the first metal and $M^2$ is the second metal as described above, and where the metal of each tetrahedral formation is bonded to at least two sulfur atoms that are also bonded to the metal of an adjacent tetrahedral formation. The tetrathiometallate material may have a polymeric structure wherein a portion of the first metal is located within interstices or holes in the polymeric structure, where the portion of the first metal located within interstices or holes in the polymeric structure is not bonded with a sulfur atom or second metal atom included in the polymeric structure.

The process of the present invention is effective to crack a heavy hydrocarbon-containing feedstock while producing little, if any, coke, and resulting in a hydrocarbon-containing product that contains most of the atomic carbon from the heavy hydrocarbon-containing feedstock and that contains little, if any, hydrocarbons that have a boiling point above 538° C. The catalyst utilized in the process is particularly effective at selectively directing reactions occurring in the cracking process to avoid and/or inhibit coke formation.

Although not intending the present invention to be limited thereby, it is believed that the catalyst is a highly effective catalyst for use in cracking a heavy hydrocarbon-containing material due, at least in part, to: 1) the ability of the catalyst to donate or share electrons with hydrocarbons based on the molecular structure of the catalyst (i.e. to reduce the hydrocarbon so the hydrocarbon forms a radical anion upon cracking); and 2) the surface area of the catalyst available to interact with hydrocarbons and/or hydrocarbon radicals in the absence of any porous alumina, alumina-silica, or silica based carrier or support.

It is believed that the hydrocarbons of a hydrocarbon-containing feedstock are cracked in the process of the present invention by a Lewis base mediated reaction, wherein the catalyst facilitates a reduction at the site of the hydrocarbon where the hydrocarbon is cracked, forming two hydrocarbon radical anions from the initial hydrocarbon. Radical anions are most stable when present on a primary carbon atom, therefore, formation of primary hydrocarbon radical anions may be energetically favored when a hydrocarbon is cracked, or the cracked hydrocarbon may rearrange to form the more energetically favored primary radical anion. Should the primary radical anion react with another hydrocarbon to form a larger hydrocarbon, the reaction will result in the formation of a secondary carbon-carbon bond that is susceptible to being cracked again. However, since hydrocarbon radical anions are relatively stable they are likely to be hydrogenated by hydrogen present in the reaction mixture rather than react with another hydrocarbon in an annelation reaction, and significant hydrocarbon radical anion-hydrocarbon reactions are unlikely. As a result, little coke is formed by agglomeration of cracked hydrocarbons.

Conventional hydrocracking catalysts utilize an active hydrogenation metal, for example a Group VIII metal such as nickel, on a support having Lewis acid properties, for example, silica, alumina-silica, or alumina supports. It is believed that cracking heavy hydrocarbons in the presence of a Lewis acid catalyst results in the formation of cracked hydrocarbon radical cations rather than hydrocarbon radical anions. Radical cations are most stable when present on a tertiary carbon atom, therefore, cracking may be energetically directed to the formation of tertiary hydrocarbon radical cations, or, most likely, the cracked hydrocarbon may rearrange to form the more energetically favored tertiary radical cation. Hydrocarbon radical cations are unstable relative to hydrocarbon radical anions, and may react rapidly with other hydrocarbons. Should the tertiary radical cation react with another hydrocarbon to form a larger hydrocarbon, the reaction may result in the formation of a carbon-carbon bond that is not susceptible to being cracked again. As a result, coke is formed by agglomeration of the cracked hydrocarbons.

Again, not intending the present invention to be limited thereby, it is believed that the catalyst utilized in the process of the present invention is particularly effective for use in cracking a heavy hydrocarbon-containing material due, in part, to the molecular structure of the catalyst, which facilitates donation or sharing of electrons from the catalyst to a hydrocarbon or a hydrocarbon anion radical. The sulfur atoms linking the first and second metals in the catalyst may facilitate the electron donating/sharing activity of the catalyst, acting to enable charge transfer from the first metal to the second metal or from the second metal to the first metal across the molecular orbitals of the sulfur atoms, as well as potentially acting to directly share electrons from the sulfur atoms in the catalyst with the hydrocarbon or hydrocarbon anion radical. The sulfur atoms may further facilitate donation/sharing of electrons from the catalyst to a hydrocarbon or hydrocarbon radical by charge stabilization of the catalyst as the catalyst donates/shares electrons with a hydrocarbon or hydrocarbon radical. It is believed that the structure of the catalyst is particularly effective in facilitating donation or sharing of electrons from the catalyst to a hydrocarbon or hydrocarbon radical when the catalyst has a polythiometallate polymeric structure such as set forth in formulas (V), (VI), (VII), and (VIII) above, particularly when x is at least 5, since any charge induced in the catalyst by sharing or donation of electrons to the hydrocarbon or hydrocarbon radical may be spread over a large number of sulfur atoms and first and second metals that form the polymeric structure of the catalyst.

Again, not intending the present invention to be limited thereby, it is also believed that the catalyst utilized in the process of the present invention may be particularly effective for use in cracking a heavy hydrocarbon-containing material since the molecular structure of the catalyst may have sulfided electron-rich metals incorporated therein while inhibiting reduction of such electron-rich metals to a zero-oxidation state. As discussed above, it is believed that use of a catalyst having the ability to donate or share electrons with hydrocarbons and/or hydrocarbon anion radicals may facilitate cracking the hydrocarbons without attendant production of coke or proto-coke. The catalytic material containing sulfided electron-rich metals utilized in the process of the present invention, therefore, facilitates hydrocarbon cracking without formation of coke or proto-coke. However, use of sulfided electron-rich metals is typically avoided in hydrocarbon cracking processes since the metal of typical electron-rich metal compounds may be easily desulfided and reduced to its zero-oxidation state in the presence of hydrogen, and zero-oxidation state electron-rich metals catalyze the production of coke in a cracking process. For example, copper sulfide is an electron-rich metal that is not typically utilized in cracking processes due to its propensity to catalyze coke formation.

The molecular structure of the catalyst utilized in the process of the present invention, however, enables the use of an electron-rich metal such as copper or bismuth in a process for cracking a heavy hydrocarbon-containing material, where electron-rich metals such as copper or bismuth are preferred for use as the first metal in the catalyst. The electron-rich metal may be bound in the catalyst by two sulfur atoms, inhibiting or preventing the reduction of the electron-rich metal to its zero-oxidation state, and thereby inhibiting or preventing the formation of coke by the zero-oxidation state electron-rich metal. Inclusion of an electron-rich metal, particularly copper, in the catalyst utilized in the process of the present invention promotes the electron donation/sharing characteristics of the catalyst by increasing the electron density of the catalyst available to be donated or shared with a hydrocarbon or hydrocarbon anion radical.

Again, not intending the present invention to be limited thereby, it is also believed that the catalyst utilized in the process of the present invention is particularly effective for use in cracking a heavy hydrocarbon-containing material due, in part, to the physical structure of the catalyst, which facilitates contact of the catalyst with a hydrocarbon or a hydrocarbon anion radical. The catalyst does not include a porous alumina, alumina-silica, or silica carrier or support material yet may have substantial surface area available for contact with the hydrocarbon-containing feedstock, particularly relative to other "bulk metal" catalytic materials that include little or no alumina, alumina-silica, or silica as a carrier or support material. It is believed that at least a portion of the catalyst may have a tetrahedral molecular structure and that the tetrahedral molecular structure causes the physical structure of the catalyst to have significant porosity and pore volume relative to typical non-supported catalysts (which may have an octahedral molecular structure with a plate-like physical structure). The surface area of the present catalyst that is available for contact with a hydrocarbon-containing feedstock may be relatively large due to the porosity of the catalyst. The catalyst may have a surface area, a pore size distribution, a pore volume, and porosity comparable to a catalyst having active metals deposited on an alumina, alumina-silica, or silica based carrier. Since the surface area of the catalyst may be substantially or totally comprised of the active catalytic metals and sulfur, rather than islands of active metals deposited on a carrier or support, the catalyst may have very high catalytic activity due its large surface area that is substantially comprised of the catalytically active metals and sulfur.

Certain terms that are used herein are defined as follows:

"Acridinic compound" refers to a hydrocarbon compound including the structure:

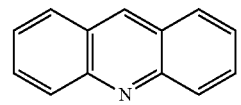 [SMILES: c1ccc2nc3ccccc3cc2c1]

As used in the present application, an acridinic compound includes any hydrocarbon compound containing the above structure, including, naphthenic acridines, napththenic benzoacridines, and benzoacridines, in addition to acridine.

"Anaerobic conditions" means "conditions in which less than 0.5 vol. % oxygen as a gas is present". For example, a process that occurs under anaerobic conditions, as used herein, is a process that occurs in the presence of less than 0.5 vol. % oxygen in a gaseous form. Anaerobic conditions may be such that no detectable oxygen gas is present.

"Aqueous" as used herein is defined as containing more than 50 vol. % water. For example, an aqueous solution or aqueous mixture, as used herein, contains more than 50 vol. % water.

"ASTM" refers to American Standard Testing and Materials.

"Atomic hydrogen percentage" and "atomic carbon percentage" of a hydrocarbon-containing material—including crude oils, crude products such as syncrudes, bitumen, tar sands hydrocarbons, shale oil, crude oil atmospheric residues, crude oil vacuum residues, naphtha, kerosene, diesel, VGO, and hydrocarbons derived from liquefying coal—are as determined by ASTM Method D5291.

"API Gravity" refers to API Gravity at 15.5° C., and as determined by ASTM Method D6822.

"Benzothiophenic compound" refers to a hydrocarbon compound including the structure:

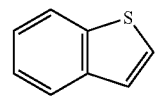

As used in the present application, a benzothiophenic compound includes any hydrocarbon compound containing the above structure, including di-benzothiophenes, naphthenic-benzothiophenes, napththenic-di-benzothiophenes, benzo-naphtho-thiophenes, naphthenic-benzo-naphthothiophenes, and dinaphtho-thiophenes, in addition to benzothiophene.

"BET surface area" refers to a surface area of a material as determined by ASTM Method D3663.

"Blending" as used herein is defined to mean contact of two or more substances by intimately admixing the two or more substances.

Boiling range distributions for a hydrocarbon-containing material are as determined by ASTM Method D5307.

"Bond" as used herein with reference to atoms in a molecule may refer to a covalent bond, a dative bond, or an ionic bond, dependent on the context.

"Carbazolic compound" refers to a hydrocarbon compound including the structure:

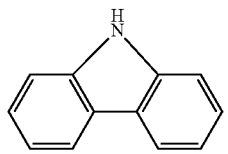 [SMILES: c1ccc2c(c1)[nH]c1ccccc12]

As used in the present application, a carbazolic compound includes any hydrocarbon compound containing the above structure, including naphthenic carbazoles, benzocarbazoles, and napthenic benzocarbazoles, in addition to carbazole.

"Carbon number" refers to the total number of carbon atoms in a molecule.

"Catalyst" refers to a substance that increases the rate of a chemical process and/or that modifies the selectivity of a chemical process as between potential products of the chemical process, where the substance is not consumed by the process. A catalyst, as used herein, may increase the rate of a chemical process by reducing the activation energy required to effect the chemical process. Alternatively, a catalyst, as used herein, may increase the rate of a chemical process by modifying the selectivity of the process between potential products of the chemical process, which may increase the rate of the chemical process by affecting the equilibrium balance of the process. Further, a catalyst, as used herein, may not increase the rate of reactivity of a chemical process but merely may modify the selectivity of the process as between potential products.

"Catalyst acidity by ammonia chemisorption" refers to the acidity of a catalyst substrate as measured by volume of ammonia adsorbed by the catalyst substrate and subsequently desorbed from the catalyst substrate as determined by ammonia temperature programmed desorption between a temperature of 120° C. and 550° C. For clarity, a catalyst that is decomposed in the measurement of acidity by ammonia temperature programmed desorption to a temperature of 550° C. and/or a catalyst for which a measurement of acidity may not be determined by ammonia temperature programmed desorption, e.g. a liquid or gas, is defined for purposes of the present invention to have an indefinite acidity as measured by ammonia chemisorption. Ammonia temperature programmed desorption measurement of the acidity of a catalyst is effected by placing a catalyst sample that has not been exposed to oxygen or moisture in a sample container such as a quartz cell; transferring the sample container containing the sample to a temperature programmed desorption analyzer such as a Micrometrics TPD/TPR 2900 analyzer; in the analyzer, raising the temperature of the sample in helium to 550° C. at a rate of 10° C. per minute; cooling the sample in helium to 120° C.; alternately flushing the sample with ammonia for 10 minutes and with helium for 25 minutes a total of 3 times, and subsequently measuring the amount of ammonia desorbed from the sample in the temperature range from 120° C. to 550° C. while raising the temperature at a rate of 10° C. per minute.

"Coke" is a solid carbonaceous material that is formed primarily of a hydrocarbonaceous material and that is insoluble in toluene as determined by ASTM Method D4072.

"Cracking" as used herein with reference to a hydrocarbon-containing material refers to breaking hydrocarbon molecules in the hydrocarbon-containing material into hydrocarbon fragments, where the hydrocarbon fragments have a lower molecular weight than the hydrocarbon molecule from which they are derived. Cracking conducted in the presence of a hydrogen donor may be referred to as hydrocracking. Cracking effected by temperature in the absence of a catalyst may be referred to a thermal cracking. Cracking may also produce some of the effects of hydrotreating such as sulfur reduction, metal reduction, nitrogen reduction, and reduction of TAN.

"Diesel" refers to hydrocarbons with a boiling range distribution from 260° C. up to 343° C. (500° F. up to 650° F.) at a pressure of 0.101 MPa. Diesel content may be determined by the quantity of hydrocarbons having a boiling range of from 260° C. to 343° C. at a pressure of 0.101 MPa relative to a total quantity of hydrocarbons as measured by boiling range distribution in accordance with ASTM Method D5307.

"Dispersible" as used herein with respect to mixing a solid, such as a salt, in a liquid is defined to mean that the components that form the solid, upon being mixed with the liquid, are retained in the liquid at STP for a period of at least 24 hours upon cessation of mixing the solid with the liquid. A solid material is dispersible in a liquid if the solid or its components are soluble in the liquid. A solid material is also dispersible in a liquid if the solid or its components form a colloidal dispersion or a suspension in the liquid.

"Distillate" or "middle distillate" refers to hydrocarbons with a boiling range distribution from 204° C. up to 343° C. (400° F. up to 650° F.) at a pressure of 0.101 MPa. Distillate content is as determined by ASTM Method D5307. Distillate may include diesel and kerosene.

"Hydrogen" as used herein refers to molecular hydrogen unless specified as atomic hydrogen.

"Insoluble" as used herein refers to a substance a majority (at least 50 wt. %) of which does not dissolve or disperse in a liquid after a period of 24 hours upon being mixed with the liquid at a specified temperature and pressure, where the undissolved portion of the substance can be recovered from the liquid by physical means. For example, a fine particulate material dispersed in a liquid is insoluble in the liquid if 50 wt. % or more of the material may be recovered from the liquid by centrifugation and filtration.

"IP" refers to the Institute of Petroleum, now the Energy Institute of London, United Kingdom.

"Iso-paraffins" refer to branched chain saturated hydrocarbons.

"Kerosene" refers to hydrocarbons with a boiling range distribution from 204° C. up to 260° C. (400° F. up to 500° F.) at a pressure of 0.101 MPa. Kerosene content may be determined by the quantity of hydrocarbons having a boiling range of from 204° C. to 260° C. at a pressure of 0.101 MPa relative to a total quantity of hydrocarbons as measured by boiling range distribution in accordance with ASTM Method D5307.

"Lewis base" refers to a compound and/or material with the ability to donate one or more electrons to another compound.

"Ligand" as used herein is defined as a molecule, compound, atom, or ion attached to, or capable of attaching to, a metal ion in a coordination complex.

"Light hydrocarbons" refers to hydrocarbons having carbon numbers in a range from 1 to 6.

"Mixing" as used herein is defined as contacting two or more substances by intermingling the two or more substances. Blending, as used herein, is a subclass of mixing, where blending requires intimately admixing or intimately intermingling the two or more substances, for example into a homogenous dispersion.

"Monomer" as used herein is defined as a molecular compound or portion of a molecular compound that may be reactively joined with itself or another monomer in repeated linked units to form a polymer.

"Naphtha" refers to hydrocarbon components with a boiling range distribution from 38° C. up to 204° C. (100° F. up to 400° F.) at a pressure of 0.101 MPa. Naphtha content may be determined by the quantity of hydrocarbons having a boiling range of from 38° C. to 204° C. at a pressure of 0.101 MPa relative to a total quantity of hydrocarbons as measured by boiling range distribution in accordance with ASTM Method D5307. Content of hydrocarbon components, for example, paraffins, iso-paraffins, olefins, naphthenes and aromatics in naphtha are as determined by ASTM Method D6730.

"n-Paraffins" refer to normal (straight chain) saturated hydrocarbons.

"Olefins" refer to hydrocarbon compounds with non-aromatic carbon-carbon double bonds. Types of olefins include, but are not limited to, cis, trans, internal, terminal, branched, and linear.

When two or more elements are described as "operatively connected", the elements are defined to be directly or indirectly connected to allow direct or indirect fluid flow between the elements.

"Periodic Table" refers to the Periodic Table as specified by the International Union of Pure and Applied Chemistry (IUPAC), November 2003. As used herein, an element of the Periodic Table of Elements may be referred to by its symbol in the Periodic Table. For example, Cu may be used to refer to copper, Ag may be used to refer to silver, W may be used to refer to tungsten etc.

"Polyaromatic compounds" refer to compounds that include two or more aromatic rings. Examples of polyaromatic compounds include, but are not limited to, indene, naphthalene, anthracene, phenanthrene, benzothiophene, dibenzothiophene, and bi-phenyl.

"Polymer" as used herein is defined herein as a compound comprised of repetitively linked monomers.

"Pore size distribution" refers a distribution of pore size diameters of a material as measured by ASTM Method D4641.

"SCFB" refers to standard cubic feet of gas per barrel of crude feed.

"STP" as used herein refers to Standard Temperature and Pressure, which is 25° C. and 0.101 MPa.

"TAN" refers to a total acid number expressed as millgrams ("mg") of KOH per gram ("g") of sample. TAN is as determined by ASTM Method D664.

"VGO" refers to hydrocarbons with a boiling range distribution of from 343° C. up to 538° C. (650° F. up to 1000° F.) at 0.101 MPa. VGO content may be determined by the quantity of hydrocarbons having a boiling range of from 343° C. to 538° C. at a pressure of 0.101 MPa relative to a total quantity of hydrocarbons as measured by boiling range distribution in accordance with ASTM Method D5307.

"wppm" as used herein refers to parts per million, by weight.

The present invention is directed to a process for cracking a hydrocarbon-containing feedstock in which the hydrocarbon-containing feedstock, hydrogen, and a catalyst, as defined herein, are mixed at a temperature of from 375° C. to 500° C. and a total pressure of from 6.9 MPa to 27.5 MPa (1000 psi to 4000 psi), and a vapor comprising a hydrocarbon-containing product comprising one or more hydrocarbon compounds that are liquid at STP is separated from the mixture.

Hydrocarbon-Containing Feedstock

The hydrocarbon-containing feedstock contains heavy hydrocarbons that are subject to being cracked in the process. The hydrocarbon-containing feedstock, therefore, is selected to contain at least 20 wt. % hydrocarbons having a boiling point of greater than 538° C. The amount of hydrocarbons having a boiling point of greater than 538° C. in a hydrocarbon-containing material may be determined in accordance with ASTM Method D5307. The hydrocarbon-containing feedstock may be selected to contain at least 25 wt. %, or at least 30 wt. %, or at least 35 wt. %, or at least 40 wt. %, or at least 45 wt. %, or at least 50 wt. % hydrocarbons having a boiling point of greater than 538° C. The hydrocarbon-containing feedstock may be selected to contain at least 20 wt. % residue, or at least 25 wt. % residue, or at least 30 wt. % residue, or at least 35 wt. % residue, or at least 40 wt. % residue, or at least 45 wt. % residue, or least 50 wt. % residue.

The hydrocarbon-containing feedstock may contain significant quantities of lighter hydrocarbons as well as the heavy hydrocarbons. The hydrocarbon-containing feedstock may contain at least 30 wt. %, or at least 35 wt. %, or at least 40 wt. %, or at least 45 wt. %, or at least 50 wt. % of hydrocarbons having a boiling point of 538° C. or less as measured at a pressure of 0.101 MPa. The amount of hydrocarbons having a boiling point of 538° C. or less in a hydrocarbon-containing material may be determined in accordance with ASTM Method D5307. The hydrocarbon-containing feedstock may contain at least 20 wt. %, or at least 25 wt. %, or at least 30 wt. %, or at least 35 wt. %, or at least 40 wt. %, or at least 45 wt. % of naphtha and distillate. The hydrocarbon-containing feedstock may be a crude oil, or may be a topped crude oil.

The hydrocarbon-containing feedstock may also contain quantities of metals such as vanadium and nickel. The hydrocarbon-containing feedstock may contain at least 50 wppm vanadium and at least 20 wppm nickel.

The hydrocarbon-containing feedstock may also contain quantities of sulfur and nitrogen. The hydrocarbon containing feedstock may contain at least 2 wt. % sulfur, or at least 3 wt. % sulfur; and the hydrocarbon-containing feedstock may contain at least 0.25 wt. % nitrogen, or at least 0.4 wt. % nitrogen.

The hydrocarbon-containing feedstock may also contain appreciable quantities of naphthenic acids. For example, the hydrocarbon-containing feedstock may have a TAN of at least 0.5, or at least 1.0, or at least 2.0.

The process of the present invention is particularly applicable to certain heavy petroleum and coal derived hydrocarbon-containing feedstocks. The hydrocarbon-containing feedstock may be a heavy or an extra-heavy crude oil containing significant quantities of residue or pitch; a topped heavy or topped extra-heavy crude oil containing significant quantities of residue or pitch; bitumen; hydrocarbons derived from tar sands; shale oil; crude oil atmospheric residues; crude oil vacuum residues; asphalts; and hydrocarbons derived from liquefying coal.

Hydrogen

The hydrogen that is mixed with the hydrocarbon-containing feedstock and the catalyst in the process of the present invention is derived from a hydrogen source. The hydrogen source may be hydrogen gas obtained from any conventional sources or methods for producing hydrogen gas.

Catalyst

As described above, the catalyst that is mixed with the hydrocarbon-containing feedstock and the hydrogen is comprised of a material that is comprised of a first metal, a second metal, and sulfur. The first metal of the material of the catalyst is a metal selected from the group consisting of copper (Cu), iron (Fe), nickel (Ni), cobalt (Co), bismuth (Bi), silver (Ag), manganese (Mn), zinc (Zn), tin (Sn), ruthenium (Ru), lanthanum (La), cerium (Ce), praseodymium (Pr), samarium (Sm), europium (Eu), ytterbium (Yb), lutetium (Lu), dysprosium (Dy), lead (Pb), and antimony (Sb). In a preferred embodiment, the first metal is relatively electron-rich, inexpensive, and relatively non-toxic, and preferably the first metal is selected to be copper or iron, most preferably copper. The second metal of the material of the catalyst is a metal selected from the group consisting of molybdenum (Mo), tungsten (W), vanadium (V), tin (Sn), and antimony (Sb), where the second metal is not the same metal as the first metal, and preferably is molybdenum or vanadium. At least a portion of the catalyst material has a structure in accordance with a structure selected from the group consisting of formula (I), formula (II), formula (III), and formula (IV) as provided below.

At least a portion of the material of the catalyst may be comprised of the first metal, the second metal, and sulfur having a structure according to formula (I):

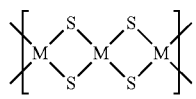

(I)

where M is either the first metal or the second metal, and at least one M is the first metal and at least one M is the second metal. The material of the catalyst as shown in formula (I) may include a third metal selected from the group consisting of Cu, Fe, Bi, Ag, Mn, Zn, Ni, Co, Sn, Re, Rh, Pd, Ir, Pt, Ce, La, Pr, Sm, Eu, Yb, Lu, Dy, Pb, Cd, Sb, and In, where the third metal is not the same as the first metal or the second metal, and where M is either the first metal, or the second metal, or the third metal, and at least one M is the first metal, at least one M is the second metal, and at least one M is the third metal. The portion of the material of the catalyst comprised of the first metal, the second metal, and sulfur may also have a polymeric structure according to formula (V):

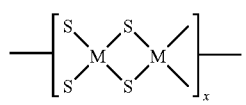

(V)

where M is either the first metal or the second metal, at least one M is the first metal and at least one M is the second metal, and x is at least 2. The material of the catalyst may be a polythiometallate polymer, where each monomer of the polymer is the structure as shown in formula (V) where x=1, and the polythiometallate polymer is the structure as shown in formula (V) where x is at least 5.

At least a portion of the material of the catalyst may be comprised of the first metal, the second metal, and sulfur having a structure according to formula (II):

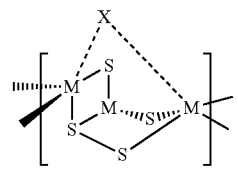

(II)

where M is either the first metal or the second metal, at least one M is the first metal and at least one M is the second metal, and X is selected from the group consisting of $SO_4$, $PO_4$, oxalate ($C_2O_4$), acetylacetonate, acetate, citrate, tartrate, Cl, Br, I, $ClO_4$, and $NO_3$. For example, the material of the catalyst may contain copper thiometallate-sulfate having the structure shown in formula (IX):

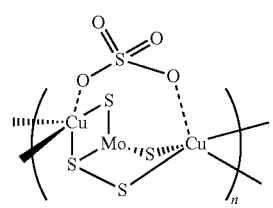

(IX)

where n may be an integer greater than or equal to 1. The material of the catalyst as shown in formula (II) may include a third metal selected from the group consisting of Cu, Fe, Bi, Ag, Mn, Zn, Ni, Co, Sn, Re, Rh, Pd, Ir, Pt, Ce, La, Pr, Sm, Eu, Yb, Lu, Dy, Pb, Cd, Sb, and In, where the third metal is not the same as the first metal or the second metal, where M is either the first metal, or the second metal, or the third metal, and at least one M is the first metal, at least one M is the second metal, and at least one M is the third metal. The portion of the material of the catalyst comprised of the first metal, the second metal, and sulfur may also have a polymeric structure according to formula (VI):

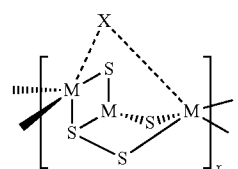

(VI)

where M is either the first metal or the second metal, at least one M is the first metal and at least one M is the second metal, X is selected from the group consisting of $SO_4$, $PO_4$, oxalate ($C_2O_4$), acetylacetonate, acetate, citrate, tartrate, Cl, Br, I, $ClO_4$, and $NO_3$, and x is at least 2.

At least a portion of the material of the catalyst may be comprised of the first metal, the second metal, and sulfur having a structure according to formula (III):

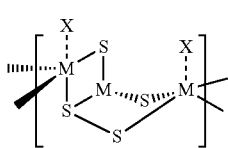

(formula III)

where M is either the first metal or the second metal, and at least one M is the first metal and at least one M is the second metal, and X is selected from the group consisting of $SO_4$, $PO_4$, oxalate ($C_2O_4$), acetylacetonate, acetate, citrate, tartrate, Cl, Br, I, $ClO_4$, and $NO_3$. The material of the catalyst as shown in formula (III) may include a third metal selected from the group consisting of Cu, Fe, Bi, Ag, Mn, Zn, Ni, Co, Sn, Re, Rh, Pd, Ir, Pt, Ce, La, Pr, Sm, Eu, Yb, Lu, Dy, Pb, Cd, Sb, and In, where the third metal is not the same as the first metal or the second metal, and where M is either the first metal, or the second metal, or the third metal, and at least one M is the first metal, at least one M is the second metal, and at least one M is the third metal. The portion of the material of the catalyst comprised of the first metal, the second metal, and sulfur may also have a polymeric structure according to formula (VII):

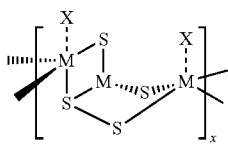

(VII)

where M is either the first metal or the second metal, and at least one M is the first metal and at least one M is the second metal, X is selected from the group consisting of $SO_4$, $PO_4$, oxalate ($C_2O_4$), acetylacetonate, acetate, citrate, tartrate, Cl, Br, I, $ClO_4$, and $NO_3$, and x is at least 2.

At least a portion of the material of the catalyst may be comprised of the first metal, the second metal, and sulfur having a structure according to formula (IV):

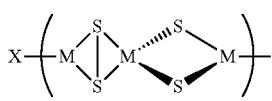

(IV)

where M is either the first metal or the second metal, at least one M is the first metal and at least one M is the second metal, and X is selected from the group consisting of $SO_4$, $PO_4$, oxalate ($C_2O_4$), acetylacetonate, acetate, citrate, tartrate, Cl, Br, I, $ClO_4$, and $NO_3$. The material of the catalyst as shown in formula (IV) may include a third metal selected from the group consisting of Cu, Fe, Bi, Ag, Mn, Zn, Ni, Co, Sn, Re, Rh, Pd, Ir, Pt, Ce, La, Pr, Sm, Eu, Yb, Lu, Dy, Pb, Cd, Sb, and In, where the third metal is not the same as the first metal or the second metal, and where M is either the first metal, or the second metal, or the third metal, and at least one M is the first metal, at least one M is the second metal, and at least one M is the third metal. The portion of the material of the catalyst comprised of the first metal, the second metal, and sulfur may also have a polymeric structure according to formula (VIII):

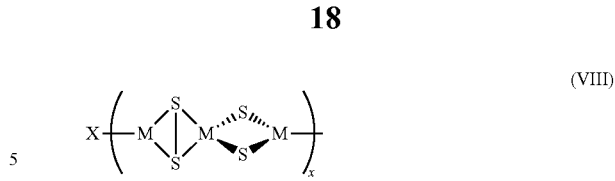

(VIII)

where M is either the first metal or the second metal, and at least one M is the first metal and at least one M is the second metal, X is selected from the group consisting of $SO_4$, $PO_4$, oxalate ($C_2O_4$), acetylacetonate, acetate, citrate, tartrate, Cl, Br, I, $ClO_4$, and $NO_3$, and x is at least 2.

The catalyst used in the process of the present invention preferably is formed primarily of the material comprised of the first metal, second metal, and sulfur, and the material of the catalyst is formed primarily of one or more compounds having a structure in accordance with formula (I), formula (II), formula (III), and/or formula (IV). The first metal, second metal, and sulfur may comprise at least 75 wt. %, or at least 80 wt. %, or at least 85 wt. %, or at least 90 wt. %, or at least 95 wt. %, or at least 99 wt. % or 100 wt. % of the material of the catalyst, where the material of the catalyst comprises at least 50 wt. %, or at least 60 wt. %, or at least 70 wt. %, or at least 75 wt. %, or at least 80 wt. %, or at least 90 wt. %, or at least 95 wt. %, or at least 99 wt. % or 100 wt. % of the catalyst. In an embodiment, the catalyst comprises at most 0.1 wt. %, or at most 0.01 wt. %, or at most 0.001 wt. % of alumina, alumina-silica, or silica, and, preferably, the catalyst contains no detectable alumina, alumina-silica, or silica.

The first metal may be present in the material of the catalyst, and/or in the catalyst, in an atomic ratio relative to the second metal of at least 1:2. The atomic ratio of the first metal to the second metal in the material of the catalyst, and/or in the catalyst, may be greater than 1:2, or at least 2:3, or at least 1:1, or at least 2:1, or at least 3:1, or at least 5:1. It is believed that the first metal contributes significantly to the catalytic activity of the catalyst in the process of the present invention when the first metal is present in the material of the catalyst, and/or in the catalyst, in an amount relative to the second metal ranging from slightly less of the first metal to the second metal to significantly more of the first metal to the second metal. Therefore, the first metal may be incorporated in the material of the catalyst, and/or in the catalyst, in an amount, relative to the second metal, such that the atomic ratio of the first metal to the second metal ranges from one half to significantly greater than one, such that the first metal is not merely a promoter of the second metal in the material of the catalyst, and/or in the catalyst.

In an embodiment of the process of the present invention, the catalyst and the material of the catalyst may contain little or no oxygen. As discussed above, the catalytic activity of the catalyst in the process of the present invention is, in part, believed to be due to the availability of electrons from the catalyst. Due to its electronegativity, oxygen tends to reduce the availability of electrons from the catalyst and the material of the catalyst when it is present in the material of the catalyst in appreciable quantities, therefore, the catalyst preferably contains little or no oxygen. The catalyst, and the material of the catalyst, may comprise at most 0.1 wt. %, or at most 0.05 wt. %, or at most 0.01 wt. % oxygen as measured by neutron activation. In an embodiment, oxygen is not detectable in the catalyst or in the material of the catalyst.

The catalyst used in the process of the present invention is preferably substantially non-acidic. The catalyst used in the process of the present invention may have an acidity as measured by ammonia chemisorption of at most 200 µmol ammonia per gram of catalyst, or at most 100 µmol ammonia per gram of catalyst, or at most 50 μmol ammonia per gram of catalyst, or at most 25, or at most 10 μmol ammonia per gram of catalyst. The catalyst may have an acidity as measured by ammonia chemisorption of 0 μmol ammonia per gram of catalyst. The catalyst should be sufficiently non-acidic to avoid catalyzing the formation of coke. It is believed that coke formation, in part, is induced by the formation of hydrocarbon cation radicals upon cracking a hydrocarbon—which is promoted by catalysts having significant acidity. Therefore, it is preferred that the catalyst have little or no acidity to avoid selectively directing cracking reactions in a manner that promotes the formation of coke.

The catalyst—when primarily formed of the material of the catalyst, where the material of the catalyst is primarily formed of the first metal, the second metal, and sulfur arranged in structure in accordance with formula (I), formula (II), formula (III) and/or formula (IV), and particularly when the first metal, the second metal, and the sulfur that form the material of the catalyst are not supported on a carrier or support material to form the catalyst—may have a significant degree of porosity, pore volume, and surface area. In the absence of a support or a carrier, the catalyst may have a pore size distribution, where the pore size distribution has a mean and/or median pore diameter of from 50 angstroms to 1000 angstroms, or from 60 angstroms to 350 angstroms. In the absence of a support or a carrier, the catalyst may have a pore volume of at least 0.2 cm$^3$/g, or at least 0.25 cm$^3$/g, or at least 0.3 cm$^3$/g, or at least 0.35 cm$^3$/g, or at least 0.4 cm$^3$/g. In the absence of a support or a carrier, the catalyst may have a BET surface area of at least 50 m$^2$/g, or at least 100 m$^2$, and up to 400 m$^2$/g or up to 500 m$^2$/g.

The relatively large surface area of the catalyst, particularly relative to conventional non-supported bulk metal catalysts, is believed to be due, in part, to the porosity of the catalyst imparted by at least a portion of the material of the catalyst being formed of abutting or adjoining linked tetrahedrally structured atomic formations of the first metal and sulfur and the second metal and sulfur, where the tetrahedrally structured atomic formations may be edge-bonded. Interstices or holes that form the pore structure of the catalyst may be present in the material of the catalyst as a result of the bonding patterns of the tetrahedral structures. The catalyst, therefore, may be highly catalytically active since 1) the catalyst has a relatively large surface area; and 2) the surface area of the catalyst is formed substantially, or entirely, of the elements that provide catalytic activity.

The catalyst may be a solid particulate substance having a particle size distribution with a relatively small mean or median particle size, where the solid catalyst particles preferably are nanometer size particles. The catalyst may have a particle size distribution with a median or mean particle size of at least 50 nm, or at least 75 nm, or up to 1 μm, or up to 750 nm; or up to 500 nm, or from 50 nm up to The solid particulate catalyst having a particle size distribution with a large quantity of small particles, for example having a mean or median particle size of up to 1 μm, has a large aggregate surface area since little of the catalyst material is located within the interior of a particle. The particulate catalyst having a particle size distribution with a large quantity of small particles, therefore, may be desirable for use in the process of the present invention to provide a relatively high degree catalytic activity due to the surface area of the catalyst available for catalytic activity. The catalyst used in the process of the invention may be a solid particulate substance preferably having a particle size distribution with a mean or median particle size of up to 1 μm, preferably having a pore size distribution with a mean pore diameter of from 50 angstroms to 300 angstroms, preferably having a porosity of at least 0.2 cm$^3$/g, and preferably having a BET surface area of at least 50 m$^2$/g.

The solid particulate catalyst may be insoluble in the hydrocarbon-containing feed and in a hydrocarbon-depleted feed residuum formed by the process of the present invention. The solid particulate catalyst having a particle size distribution of at least 50 nm may be insoluble in the hydrocarbon-containing feed and the hydrocarbon-depleted residuum due, in part, to the size of the particles, which may be too large to be solvated by the hydrocarbon-containing feed or the residuum. Use of a solid particulate catalyst which is insoluble in the hydrocarbon-containing feed and the hydrocarbon-depleted residuum may be desirable in the process of the present invention so that the catalyst may be separated from the residuum formed by the process, and subsequently regenerated for reuse in the process.

The material of the catalyst may contain less than 0.5 wt. % of ligands other than sulfur-containing ligands including sulfate-metal complexes and sulfur-metal complexes between sulfur and the first metal and between sulfur and the second metal. Ligands, other than the sulfur-containing ligands, may not be present in significant quantities in the material since they may limit the particle size of the material of the catalyst to less than 50 nm, for example, by inhibiting the first metal and the second metal from forming sulfur-bridged chains.

Method of Preparing the Catalyst

The material of the catalyst, and/or the catalyst, utilized in the process of the present invention may be prepared by mixing a first salt and a second salt in an aqueous mixture under anaerobic conditions at a temperature of from 15° C. to 150° C., and separating a solid from the aqueous mixture to produce the catalyst material.

The first salt utilized to form the material of the catalyst, and/or the catalyst, includes a cationic component comprising a metal in any non-zero oxidation state selected from the group consisting of Cu, Fe, Ni, Co, Bi, Ag, Mn, Zn, Sn, Ru, La, Ce, Pr, Sm, Eu, Yb, Lu, Dy, Pb, and Sb, where the metal of the cationic component is the first metal of the material of the catalyst. The cationic component of the first salt may consist essentially of a metal selected from the group consisting of Cu, Fe, Ni, Co, Bi, Ag, Mn, Zn, Sn, Ru, La, Ce, Pr, Su, Eu, Yb, Lu, Dy, Pb, and Sb. The cationic component of the first salt must be capable of bonding with the anionic component of the second salt to form the material of the catalyst in the aqueous mixture at a temperature of from 15° C. to 150° C. and under anaerobic conditions.

The first salt also contains an anionic component associated with the cationic component of the first salt to form the first salt. The anionic component of the first salt may be selected from a wide range of counterions to the cationic component of the first salt so long as the combined cationic component and the anionic component of the first salt form a salt that is dispersible, and preferably soluble, in the aqueous mixture in which the first salt and the second salt are mixed, and so long as the anionic component of the first salt does not prevent the combination of the cationic component of the first salt with the anionic component of the second salt in the aqueous mixture to form the material of the catalyst. The anionic component of the first salt may be selected from the group consisting of sulfate, chloride, bromide, iodide, acetate, acetylacetonate, phosphate, nitrate, perchlorate, oxalate, citrate, and tartrate.

The anionic component of the first salt may associate with or be incorporated into a polymeric structure including the cationic component of the first salt and the anionic component of the second salt to form the material of the catalyst. For example, the anionic component of the first salt may complex with a polymeric structure formed of the cationic component of the first salt and the anionic component of the second salt as shown in formulas VI and VII above, where X=the anionic component of the first salt, or may be incorporated into a polymeric structure including the cationic component of the first salt and the anionic component of the second salt as shown in formula (VIII) above, where X=the anionic component of the first salt.

Certain compounds are preferred for use as the first salt to form the catalyst material. In particular, the first salt is preferably selected from the group consisting of $CuSO_4$, copper acetate, copper acetylacetonate, $FeSO_4$, $Fe_2(SO_4)_3$, iron acetate, iron acetylacetonate, $NiSO_4$, nickel acetate, nickel acetylacetonate, $CoSO_4$, cobalt acetate, cobalt acetylacetonate, $ZnCl_2$, $ZnSO_4$, zinc acetate, zinc acetylacetonate, silver acetate, silver acetylacetonate, $SnSO_4$, $SnCl_4$, tin acetate, tin acetylacetonate, $MnSO_4$, manganese acetate, manganese acetylacetonate, bismuth acetate, bismuth acetylacetonate, and hydrates thereof. These materials are generally commercially available, or may be prepared from commercially available materials according to well-known methods.

The first salt may be contained in an aqueous solution or an aqueous mixture, where the aqueous solution or aqueous mixture containing the first salt (hereinafter the "first aqueous solution") may be mixed with an aqueous solution or an aqueous mixture containing the second salt (hereinafter the "second aqueous solution") in the aqueous mixture to form the material of the catalyst. The first salt may be dispersible, and most preferably soluble, in the first aqueous solution and is dispersible, and preferably soluble, in the aqueous mixture of the first and second salts. The first aqueous solution may contain more than 50 vol. % water, or at least 75 vol. % water, or at least 90 vol. % water, or at least 95 vol. % water, and may contain more than 0 vol. % but less than 50 vol. %, or at most 25 vol. %, or at most 10 vol. %, or at most 5 vol. % of an organic solvent containing from 1 to 5 carbons selected from the group consisting of an alcohol, a diol, an aldehyde, a ketone, an amine, an amide, a furan, an ether, acetonitrile, and mixtures thereof. The organic solvent present in the first aqueous solution, if any, should be selected so that the organic compounds in the organic solvent do not inhibit reaction of the cationic component of the first salt with the anionic component of the second salt upon forming an aqueous mixture containing the first and second salts, e.g., by forming ligands or by reacting with the first or second salts or their respective cationic or anionic components. The first aqueous solution may contain no organic solvent, and may consist essentially of water, preferably deionized water, and the first salt.

The concentration of the first salt in the first aqueous solution may be selected to promote formation of the material of the catalyst, and/or the catalyst, having a particle size distribution with a small mean and/or median particle size, where the particles have a relatively large surface area, upon mixing the first salt and the second salt in the aqueous mixture. To promote the formation of a catalyst material having a relatively large surface area and having a particle size distribution with a relatively small mean and/or median particle size, the first aqueous solution may contain at most 3 moles per liter, or at most 2 moles per liter, or at most 1 mole per liter, or at most 0.6 moles per liter, or at most 0.2 moles per liter of the first salt.

The second salt utilized to form the catalyst material and/or the catalyst includes an anionic component that is a tetrathiometallate of molybdenum, tungsten, vanadium, tin or antimony. In particular, the second salt may contain an anionic component that is selected from the group consisting of $MoS_4^{2-}$, $WS_4^{2-}$, $VS_4^{3-}$, $SnS_4^{4-}$, and $SbS_4^{3-}$.

The second salt also contains a cationic component associated with the anionic component of the second salt to form the second salt. The cationic component of the second salt may be selected from an ammonium counterion, and alkali metal and alkaline earth metal counterions to the tetrathiometallate anionic component of the second salt so long as the combined cationic component and the anionic component of the second salt form a salt that is dispersable, and preferably soluble, in the aqueous mixture in which the first salt and the second salt are mixed, and so long as the cationic component of the second salt does not prevent the combination of the cationic component of the first salt with the anionic component of the second salt, optionally with the anionic component of the first salt, in the aqueous mixture to form the catalyst material. The cationic component of the second salt may comprise one or more sodium ions, or one or more potassium ions, or one or more ammonium ions.

Certain compounds are preferred for use as the second salt used to form the material of the catalyst and/or the catalyst. In particular, the second salt is preferably selected from the group consisting of $Na_2MoS_4$, $Na_2WS_4$, $Na_3VS_4$, $K_2MoS_4$, $K_2WS_4$, $K_3VS_4$, $(NH_4)_2MoS_4$, $(NH_4)_2WS_4$, $(NH_4)_3VS_4$, $Na_4SnS_4$, $(NH_4)_4SnS_4$, $(NH_4)_3SbS_4$, $Na_3SbS_4$, and hydrates thereof.

The second salt may be a commercially available tetrathiomolybdate, tetrathiotungstate, or tetrathiovanadate salt. For example, the second salt may be ammonium tetrathiomolybdate, which is commercially available from AAA Molybdenum Products, Inc. 7233 W. 116 Pl., Broomfield, Colo., USA 80020, or ammonium tetrathiotungstate, which is commercially available from Sigma-Aldrich, 3050 Spruce St., St. Louis, Mo., USA 63103, or ammonium tetrathiovanadate, which is commercially available from Chemos GmbH, Germany.

Alternatively, the second salt may be produced from a commercially available tetrathiomolybdate, tetrathiotungstate, or tetrathiovanadate salt. For example, the second salt may be produced from ammonium tetrathiomolybdate or from ammonium tetrathiotungstate, or from ammonium tetrathiovanadate. The second salt may be formed from the commercially available ammonium tetrathiometallate salts by exchanging the cationic ammonium component of the commercially available salt with a desired alkali or alkaline earth cationic component from a separate salt. The exchange of the cationic components to form the desired second salt may be effected by mixing the commercially available salt and the salt containing the desired cationic component in an aqueous solution to form the desired second salt.

A method of forming the second salt is to disperse an ammonium tetrathiomolybdate, ammonium tetrathiotungstate, or ammonia tetrathiovanadate in an aqueous solution, preferably water, and to disperse an alkali metal or alkaline earth metal cationic component donor salt, preferably a carbonate, in the aqueous solution, where the cationic component donor salt is provided in an amount relative to the ammonium tetrathiomolybdate, ammonium tetrathiotungstate, or ammonium tetrathiovanadate salt to provide a stoichiometrically equivalent or greater amount of its cation to ammonium of the ammonium tetrathiomolybdate, ammonium tetrathiotungstate, or ammonium tetrathiovanadate salt. The aqueous solution may be heated to a temperature of at least 50° C., or at least 65° C. up to 100° C. to evolve ammonia from the ammonium containing salt and carbon dioxide from the carbonate containing salt as gases, and to form the second salt. For example a $Na_2MoS_4$ salt may be prepared for use as the second salt by mixing commercially available $(NH_4)_2MoS_4$ and $Na_2CO_3$ in water at a temperature of 70° C.-80° C. for a time period sufficient to permit evolution of a significant amount, preferably substantially all, of ammonia and carbon dioxide gases from the solution, typically from 30 minutes to 4 hours, and usually about 2 hours.

If the second salt is a sodium tetrathiostannate salt, it may be produced by dissolving $Na_2Sn(OH)_6$ and $Na_2S$ in a 1:4 molar ratio in boiling deionized water (100 g of $Na_2Sn(OH)_6$ per 700 ml of water and 250 g of $Na_2S$ per 700 ml of water), stiffing the mixture at 90-100° C. for 2-3 hours, adding finely pulverized MgO to the mixture at a 2:5 wt. ratio relative to the $Na_2Sn(OH)_6$ and continuing stiffing the mixture at 90-100° C. for an additional 2-3 hours, cooling and collecting precipitated impurities from the mixture, then concentrating the remaining solution by 50-60 vol. %, allowing the concentrated solution to stand, then collecting the $Na_4SnS_4$ that crystallizes from the concentrated solution. A ammonium tetrathiostannate salt may be produced by mixing $SnS_2$ with $(NH_4)_2S$ in a 1:2 mole ratio in liquid ammonia under an inert gas (e.g. nitrogen), filtering, and recovering the solid $(NH_4)_4SnS_4$ as a residue.

The second salt may be contained in an aqueous solution (the second aqueous solution, as noted above), where the second aqueous solution containing the second salt is mixed with the first aqueous solution containing the first salt in the aqueous mixture to form the material of the catalyst. The second salt is preferably dispersible, and most preferably soluble, in the second aqueous solution and is dispersible, and preferably soluble, in the aqueous mixture containing the first and second salts. The second aqueous solution contains more than 50 vol. % water, or at least 75 vol. % water, or at least 90 vol. % water, or at least 95 vol. % water, and may contain more than 0 vol. % but less than 50 vol. %, or at most 25 vol. %, or at most 10 vol. %, or at most 5 vol. % of an organic solvent containing from 1 to 5 carbons and selected from the group consisting of an alcohol, a diol, an aldehyde, a ketone, an amine, an amide, a furan, an ether, acetonitrile, and mixtures thereof. The organic solvent present in the second aqueous solution, if any, should be selected so that the organic compounds in the organic solvent do not inhibit reaction of the cationic component of the first salt with the anionic component of the second salt upon forming an aqueous mixture containing the first and second salts, e.g., by forming ligands or by reacting with the first or second salts or their respective cationic or anionic components. Preferably, the second aqueous solution contains no organic solvent. Most preferably the second aqueous solution consists essentially of water, preferably deionized, and the second salt.

The concentration of the second salt in the second aqueous solution may be selected to promote formation of the material of the catalyst having a particle size distribution with a small mean and/or median particle size and having a relatively large surface area per particle upon mixing the first salt and the second salt in the aqueous mixture. To promote the formation of a catalyst material having a particle size distribution with a relatively small mean and/or median particle size, the second aqueous solution may contain at most 0.8 moles per liter, or at most 0.6 moles per liter, or at most 0.4 moles per liter, or at most 0.2 moles per liter, or at most 0.1 moles per liter of the second salt.

The first and second solutions containing the first and second salts, respectively, are mixed in an aqueous mixture to form the material of the catalyst and/or the catalyst. The amount of the first salt relative to the amount of the second salt provided to the aqueous mixture may be selected so that the atomic ratio of the cationic component metal of the first salt to the metal of the anionic component of the second salt, either molybdenum or tungsten, is at least 1:2, or at least 2:3, or at least 1:1, and at most 20:1, or at most 15:1, or at most 10:1.

The aqueous mixture of the first and second salts may be formed by adding the first aqueous solution containing the first salt and the second aqueous solution containing the second salt into an aqueous solution separate from both the first aqueous solution and the second aqueous solution. The separate aqueous solution will be referred hereafter as the "third aqueous solution". The third aqueous solution may contain more than 50 vol. % water, or at least 75 vol. % water, or at least 90 vol. % water, or at least 95 vol. % water, and may contain more than 0 vol. % but less than 50 vol. %, or at most 25 vol. %, or at most 10 vol. %, or at most 5 vol. % of an organic solvent containing from 1 to 5 carbons and selected from the group consisting of an alcohol, a diol, an aldehyde, a ketone, an amine, an amide, a furan, an ether, acetonitrile, and mixtures thereof. The organic solvent present in the third aqueous solution, if any, should be selected so that the organic compounds in the organic solvent do not inhibit reaction of the cationic component of the first salt with the anionic component of the second salt upon forming the aqueous mixture, e.g., by forming ligands or reacting with the cationic component of the first salt or with the anionic component of the second salt. Preferably, the third aqueous solution contains no organic solvent, and most preferably comprises deionized water.

The aqueous mixture of the first and second salts may be formed by combining the first aqueous solution containing the first salt and the second aqueous solution containing the second salt in the third aqueous solution. The volume ratio of the third aqueous solution to the first aqueous solution containing the first salt may be from 0.5:1 to 50:1 where the first aqueous solution may contain at most 3, or at most 2, or at most 1, or at most 0.8, or at most 0.5, or at most 0.3 moles of the first salt per liter of the first aqueous solution. Likewise, the volume ratio of the third aqueous solution to the second aqueous solution containing the second salt may be from 0.5:1 to 50:1 where the second aqueous solution may contain at most 0.8, or at most 0.4, or at most 0.2, or at most 0.1 moles of the second salt per liter of the second aqueous solution.

The first salt and the second salt may be combined in the aqueous mixture so that the aqueous mixture containing the first and second salts contains at most 1.5, or at most 1.2, or at most 1, or at most 0.8, or at most 0.6 moles of the combined first and second salts per liter of the aqueous mixture. The particle size of the catalyst material produced by mixing the first and second salts in the aqueous mixture increases, and the surface area of the particles decreases, with increasing concentrations of the salts. Therefore, to limit the particle sizes in the particle size distribution of the catalyst material and to increase the relative surface area of the particles, the aqueous mixture may contain at most 0.8 moles of the combined first and second salts per liter of the aqueous mixture, more preferably at most 0.6 moles, or at most 0.4 moles, or at most 0.2 moles of the combined first and second salts per liter of the aqueous mixture. The amount of the first salt and the total volume of the aqueous mixture may be selected to provide at most 1, or at most 0.8, or at most 0.4 moles of the cationic component of the first salt per liter of the aqueous mixture and the amount of the second salt and the total volume of the aqueous mixture may be selected to provide at most 0.4, or at most 0.2, or at most 0.1, or at most 0.01 moles of the anionic component of the second salt per liter of the aqueous mixture.

The rate of addition of the first and second aqueous solutions containing the first and second salts, respectively, to the aqueous mixture may be controlled to limit the instantaneous concentration of the first and second salts in the aqueous mixture to produce a catalyst material comprised of relatively small particles having relatively large surface area Limiting the instantaneous concentration of the salts in the aqueous mixture may reduce the mean and/or median particle size of the resulting catalyst material by limiting the simultaneous availability of large quantities of the cationic components of the first salt and large quantities of the anionic components of the second salt that may interact to form a catalyst material comprised primarily of relatively large particles. The rate of addition of the first and second solutions to the aqueous mixture may be controlled to limit the instantaneous concentration of the first salt and the second salt in the aqueous mixture to at most 0.05 moles per liter, or at most 0.01 moles per liter, or at most 0.001 moles per liter.

The first aqueous solution containing the first salt and the second aqueous solution containing the second salt may be added to the third aqueous solution, preferably simultaneously, at a controlled rate selected to provide a desired instantaneous concentration of the first salt and the second salt in the aqueous mixture. The first aqueous solution containing the first salt and the second aqueous solution containing the second salt may be added to the third aqueous solution at a controlled rate by adding the first aqueous solution and the second aqueous solution to the third aqueous solution in a dropwise manner. The rate that drops of the first aqueous solution and the second aqueous solution are added to the third aqueous solution may be controlled to limit the instantaneous concentration of the first salt and the second salt in the aqueous mixture as desired. The first aqueous solution containing the first salt and the second aqueous solution containing the second salt may be dispersed directly into the third aqueous solution at a flow rate selected to provide a desired instantaneous concentration of the first salt and the second salt. The first aqueous solution and the second aqueous solution may be dispersed directly into the third aqueous solution using conventional means for dispersing one solution into another solution at a controlled flow rate. For example, the first aqueous solution and the second aqueous solution may be dispersed into the third aqueous solution through separate nozzles located within the third aqueous solution, where the flow of the first and second solutions through the nozzles is metered by separate flow metering devices.

The particle size distribution of the catalyst material produced by mixing the first salt and the second salt in the aqueous mixture is preferably controlled by the rate of addition of the first and second aqueous solutions to the third aqueous solution, as described above, so that the median and/or mean particle size of the particle size distribution falls within a range of from 50 nm to 1 μm. The particle size distribution of the catalyst material may be controlled by the rate of addition of the first and second aqueous solutions to the third aqueous solution so that the median and/or mean particle size of the particle size distribution of the catalyst material may range from at least 50 nm up to 750 nm, or up to 500 μm, or up to 250 nm.

The surface area of the catalyst material particles produced by mixing the first and second aqueous solutions in the third aqueous solution is preferably controlled by the rate of addition of the first and second aqueous solutions to the third aqueous solution, as described above, so that the BET surface area of the catalyst material particles may range from 50 m$^2$/g to 500 m$^2$/g. The surface area of the catalyst material particles may be controlled by the rate of addition of the first and second aqueous solutions to the third aqueous solution so that the BET surface area of the catalyst material particles is from 100 m$^2$/g to 350 m$^2$/g The aqueous mixture containing the first salt and the second salt is mixed to facilitate interaction and reaction of the cationic component of the first salt with the anionic component of the second salt to form the catalyst material. The aqueous mixture may be mixed by any conventional means for agitating an aqueous solution or an aqueous dispersion, for example by mechanical stiffing.

During mixing of the aqueous mixture of the first and second salts, the temperature of the aqueous mixture is maintained in the range of from 15° C. to 150° C., or from 60° C. to 125° C., or from 65° C. to 100° C. When the cationic component of the second salt is ammonium, the temperature should be maintained in a range from 65° C. to 150° C. to evolve ammonia as a gas from the second salt. The temperature of the aqueous mixture during mixing may be maintained at less than 100° C. so that the mixing may be conducted without the application of positive pressure necessary to inhibit the water in the aqueous mixture from becoming steam. If the second salt is a tetrathiostannate, the temperature of the aqueous mixture may be maintained at 100° C. or less to inhibit the degradation of the second salt into tin disulfides.

Maintaining the temperature of the aqueous mixture in a range of from 50° C. to 150° C. may result in production of a catalyst material having a relatively large surface area and a substantially reduced median or mean particle size relative to a catalyst material produced in the same manner at a lower temperature. It is believed that maintaining the temperature in the range of 50° C. to 150° C. drives the reaction of the cationic component of the first salt with the anionic component of the second salt, reducing the reaction time and limiting the time available for the resulting product to agglomerate prior to precipitation. Maintaining the temperature in a range of from 50° C. to 150° C. during the mixing of the first and second salts in the aqueous mixture may result in production of a catalyst material having a particle size distribution with a median or mean particle size of from 50 nm up to 5 μm, or up to 1 μm, or up to 750 nm; and having a BET surface area of from 50 m$^2$/g up to 500 m$^2$/g or from 100 m$^2$/g to 350 m$^2$/g.

The first and second salts in the aqueous mixture may be mixed under a pressure of from 0.101 MPa to 10 MPa (1.01 bar to 100 bar). Preferably, the first and second salts in the aqueous mixture are mixed at atmospheric pressure, however, if the mixing is effected at a temperature greater than 100° C. the mixing may be conducted under positive pressure to inhibit the formation of steam.

During mixing, the aqueous mixture of the first and second salts is maintained under anaerobic conditions. Maintaining the aqueous mixture under anaerobic conditions during mixing inhibits the oxidation of the catalyst material or the anionic component of the second salt. The aqueous mixture of the first and second salts may be maintained under anaerobic conditions during mixing by conducting the mixing in an atmosphere containing little or no oxygen, preferably an inert atmosphere. The mixing of the first and second salts in the aqueous mixture may be conducted under nitrogen gas, argon gas, and/or steam to maintain anaerobic conditions during the mixing. An inert gas, preferably nitrogen gas or steam, may be continuously injected into the aqueous mixture during mixing to maintain anaerobic conditions and to facilitate mixing of the first and second salts in the aqueous mixture and displacement of ammonia gas if the second salt contains an ammonium cation.

The first and second salts may be mixed in the aqueous mixture at a temperature of from 15° C. to 150° C. under anaerobic conditions for a period of time sufficient to permit the formation of the catalyst material. The first and second salts may be mixed in the aqueous mixture for a period of at least 1 hour, or at least 2 hours, or at least 3 hours, or at least 4 hours, or from 1 hour to 10 hours, or from 2 hours to 9 hours, or from 3 hours to 8 hours, or from 4 hours to 7 hours to form the catalyst material. The first and/or second salt(s) may be added to the aqueous mixture over a period of from 30 minutes to 4 hours while mixing the aqueous mixture, and, after the entirety of the first and second salts have been mixed into the aqueous mixture, the aqueous mixture may be mixed for at least an additional 1 hour, or 2 hours, or 3 hours or 4 hours, or 5 hours to form the catalyst material.

After completing mixing of the aqueous mixture of the first and second salts, a solid is separated from the aqueous mixture to produce the material of the catalyst. The solid may be separated from the aqueous mixture by any conventional means for separating a solid phase material from a liquid phase material. For example, the solid may be separated by allowing the solid to settle from the resulting mixture, preferably for a period of from 1 hour to 16 hours, and separating the solid from the mixture by vacuum or gravitational filtration or by centrifugation. To enhance recovery of the solid, water may be added to the aqueous mixture prior to allowing the solid to settle. Water may be added to the aqueous mixture in a volume relative to the volume of the aqueous mixture of from 0.1:1 to 0.75:1. Alternatively, but less preferably, the solid may be separated from the mixture by centrifugation without first allowing the solid to settle and/or without the addition of water. The solid may also be separated from the mixture by spray drying the mixture.

The material of the catalyst, or catalyst, may be washed subsequent to separation from the aqueous mixture, if desired. The separated material of the catalyst, or catalyst, may be contaminated with minor amounts, typically less than 0.5 wt. %, of the cationic component from the second salt. These minor contaminants may be removed from the separated material of the catalyst, or catalyst, by washing the separated material with water. Substantial volumes of water may be used to wash the separated catalyst material since the separated catalyst material is insoluble in water, and the yield of catalyst material will not be significantly affected by the wash.

Process for Cracking a Hydrocarbon-Containing Feedstock

In the process of the present invention, a catalyst as described above, the hydrocarbon-containing feedstock, and hydrogen are mixed at a temperature selected from 375° C. to 500° C. and a total pressure selected from 6.9 MPa to 27.5 MPa, where the hydrocarbon-containing feedstock, catalyst, and hydrogen form a mixture upon mixing. The catalyst, hydrocarbon-containing feedstock, and hydrogen may be mixed by contact with each other in a mixing zone maintained at a temperature of from 375° C. to 500° C. and a total pressure of from 6.9 MPa to 27.5 MPa. A hydrocarbon-containing product that comprises one or more hydrocarbon compounds that are liquid at STP is separated from the mixture in the mixing zone.

In an embodiment of the process of the invention, as shown in FIG. 1, the mixing zone 1 may be in a reactor 3, where the conditions of the reactor 3 may be controlled to maintain the temperature and pressure in the mixing zone 1 at 375° C. to 500° C. and 6.9 MPa to 27.5 MPa, respectively. The hydrocarbon-containing feedstock may be provided continuously or intermittently from a feed supply 2 to the mixing zone 1 in the reactor 3 through feed inlet 5. The hydrocarbon-containing feedstock may be preheated to a temperature of from 100° C. to 350° C. by a heating element 4, which may be a heat exchanger, prior to being fed to the mixing zone 1. Hydrogen may be provided continuously or intermittently to the mixing zone 1 of the reactor 3 through hydrogen inlet line 7, or, alternatively, may be mixed together with the hydrocarbon-containing feedstock, and optionally the catalyst, and provided to the mixing zone 1 through the feed inlet 5.

The catalyst may be located in the mixing zone 1 in the reactor 3 or may be provided to the mixing zone 1 in the reactor 3 during the process of the present invention. The catalyst may be located in the mixing zone 1 in a catalyst bed. Preferably, however, the catalyst is provided to the mixing zone 1 during the process, or, if located in the mixing zone initially, may be blended with the hydrocarbon-containing feed and hydrogen, and is not present in a catalyst bed. The catalyst may be provided to the mixing zone 1 together with the hydrocarbon-containing feedstock through feed inlet 5, where the catalyst may be dispersed in the hydrocarbon-containing feedstock prior to feeding the mixture to the mixing zone 1 through the feed inlet 5. Alternatively, the catalyst may be provided to the mixing zone 1 through a catalyst inlet 9, where the catalyst may be mixed with sufficient hydrocarbon-containing feedstock or another fluid, for example a hydrocarbon-containing fluid, to enable the catalyst to be delivered to the mixing zone 1 through the catalyst inlet 9.

The catalyst is provided to be mixed with the hydrocarbon-containing feedstock and the hydrogen in the mixing zone 1 in a sufficient amount to catalytically crack the hydrocarbon-containing feedstock. The catalyst may be provided for mixing with the hydrocarbon-containing feedstock and hydrogen in an amount of from 0.125 g to 5 g of catalyst per kg of hydrocarbon-containing feedstock. Alternatively, the catalyst may be provided for mixing with the hydrocarbon-containing feedstock and hydrogen in an amount of from 0.125 g to 50 g of catalyst per kg of hydrocarbons in the hydrocarbon-containing feedstock having a boiling point of at least 538° C. at a pressure of 0.101 MPa as determined in accordance with ASTM Method D5307.

The hydrocarbon-containing feedstock may be provided to the mixing zone 1 of the reactor 3 at a rate of at least 350 kg/hr per $m^3$ of the mixture volume within mixing zone 1 of the reactor 3. The mixture volume is defined herein as the combined volume of the catalyst(s), the hydrocarbon-depleted feed residuum (as defined herein), and the hydrocarbon-containing feedstock in the mixing zone 1, where the hydrocarbon-depleted feed residuum may contribute no volume to the mixture volume (i.e. at the start of the process before a hydrocarbon-depleted feed residuum has been produced in the mixing zone 1), and where the hydrocarbon-containing feedstock may contribute no volume to the mixture volume (i.e. after initiation of the process during a period between intermittent addition of fresh hydrocarbon-containing feedstock into the mixing zone 1). The mixture volume within the mixing zone 1 may be affected by 1) the rate of addition of the hydrocarbon-containing feedstock into the mixing zone 1; 2) the rate of removal of the vapor from the reactor 3; and, optionally, 3) the rate at which a bleed stream of the hydrocarbon-depleted feed residuum, catalyst(s), and hydrocarbon-containing feedstock is separated from and recycled to the reactor 3, as described in further detail below. The hydrocarbon-containing feedstock may be provided to the mixing zone 1 of the reactor 3 at a rate of at least 400, or at least 500, or at least 600, or at least 700, or at least 800, or at least 900, or at least 1000 kg/hr per $m^3$ of the mixture volume within the mixing zone 1 up to 5000 kg/hr per $m^3$ of the mixture volume within the mixing zone 1.

Preferably, the mixture volume of the hydrocarbon-containing feedstock, the hydrocarbon-depleted feed residuum, and the catalyst(s) is maintained within the mixing zone within a selected range of the reactor volume by selecting 1) the rate at which the hydrocarbon-containing feedstock is provided to the mixing zone 1; and/or, optionally, 2) the rate at which a bleed stream is removed from and recycled to the mixing zone 1; and/or 3) the temperature and pressure within the mixing zone 1 and the reactor 3 to provide a selected rate of vapor removal from the mixing zone 1 and the reactor 3. The combined volume of the hydrocarbon-containing feedstock and the catalyst(s) initially provided to the mixing zone 1 at the start of the process define an initial mixture volume, and the amount of hydrocarbon-containing feedstock and the amount of the catalyst(s) initially provided to the mixing zone 1 may be selected to provide an initial mixture volume of from 5% to 97% of the reactor volume, preferably from 30% to 75% of the reactor volume. The rate at which the hydrocarbon-containing feedstock is provided to the mixing zone 1 and/or the rate at which a bleed stream is removed from and recycled to the mixing zone 1 and/or the rate at which vapor is removed from the reactor 3 may be selected to maintain the mixture volume of the hydrocarbon-containing feedstock, the hydrocarbon-depleted feed residuum, and the catalyst(s) at a level of at least 10%, or at least 25%, or within 90%, or within 70%, or within 50% of the initial mixture volume during the process.

The hydrocarbon-containing feedstock may be provided to the mixing zone 1 at such relatively high rates for reacting a feedstock containing relatively large quantities of heavy, high molecular weight hydrocarbons due to the inhibition of coke formation in the process of the present invention. Conventional processes for cracking heavy hydrocarbonaceous feedstocks are typically operated at rates on the order of 10 to 300 kg/hr per $m^3$ of reaction volume so that the conventional cracking process may be conducted either 1) at sufficiently low temperature to avoid excessive coke-make to maximize yield of desirable cracked hydrocarbons; or 2) at higher temperatures with significant quantities of coke production, where the high levels of solids produced impedes operation of the process at a high rate.

Hydrogen may be provided to the mixing zone 1 of the reactor 3 at a rate sufficient to hydrogenate hydrocarbons cracked in the process. The hydrogen may be provided to the mixing zone 1 in a ratio relative to the hydrocarbon-containing feedstock provided to the mixing zone 1 of from 1 $Nm^3/m^3$ to 16,100 $Nm^3/m^3$ (5.6 SCFB to 90160 SCFB), or from 2 $Nm^3/m^3$ to 8000 $Nm^3/m^3$ (11.2 SCFB to 44800 SCFB), or from 3 $Nm^3/m^3$ to 4000 $Nm^3/m^3$ (16.8 SCFB to 22400 SCFB), or from 5 $Nm^3/m^3$ to 320 $Nm^3/m^3$ (28 SCFB to 1792 SCFB). The hydrogen partial pressure in the reactor may be maintained in a pressure range of from 2.1 MPa to 27.5 MPa or from 5 MPa to 20 MPa, or from 10 MPa to 15 MPa.

The catalyst, the hydrocarbon-containing feedstock, and the hydrogen may be mixed by being blended into an intimate admixture in the mixing zone 1. The catalyst, hydrocarbon-containing feedstock and the hydrogen may be blended in the mixing zone 1, for example, by stirring a mixture of the components, for example by a mechanical stirring device located in the mixing zone 1. The catalyst, hydrocarbon-containing feedstock, and hydrogen may also be mixed in the mixing zone 1 by blending the components prior to providing the components to the mixing zone 1 and injecting the blended components into the mixing zone 1 through one or more nozzles which may act as the feed inlet 5. The catalyst, hydrocarbon-containing feedstock, and hydrogen may also be blended in the mixing zone 1 by blending the hydrocarbon-containing feedstock and catalyst and injecting the mixture into the mixing zone 1 through one or more feed inlet nozzles positioned with respect to the hydrogen inlet line 7 such that the mixture is blended with hydrogen entering the mixing zone 1 through the hydrogen inlet line 7. Baffles may be included in the reactor 3 in the mixing zone 1 to facilitate blending the hydrocarbon-containing feedstock, catalyst, and hydrogen. Less preferably, the catalyst is present in the mixing zone 1 in a catalyst bed, and the hydrocarbon-containing feedstock, hydrogen, and catalyst are mixed by bringing the hydrocarbon-containing feedstock and hydrogen simultaneously into contact with the catalyst in the catalyst bed.

The temperature and pressure conditions in the mixing zone 1 are maintained so that heavy hydrocarbons in the hydrocarbon-containing feedstock may be cracked. The temperature in the mixing zone 1 is maintained from 375° C. to 500° C. Preferably, the mixing zone 1 is maintained at a temperature of from 425° C. to 500° C., or from 430° C. to 500° C., or from 440° C. to 500° C., or from 450° C. to 500° C. Higher temperatures may be preferred in the process of the present invention since 1) the rate of conversion of the hydrocarbon-containing feedstock to a hydrocarbon-containing product increases with temperature; and 2) the present process inhibits or prevents the formation of coke, even at temperatures of 430° C. or greater, which typically occurs rapidly in conventional cracking processes at temperatures of 430° C. or greater.

Mixing the hydrocarbon-containing feedstock, the catalyst, and hydrogen in the mixing zone 1 at a temperature of from 375° C. to 500° C. and a total pressure of from 6.9 MPa to 27.5 MPa produces a vapor comprised of hydrocarbons that are vaporizable at the temperature and pressure within the mixing zone 1. The vapor may be comprised of hydrocarbons present initially in the hydrocarbon-containing feedstock that vaporize at the temperature and pressure within the mixing zone 1 and hydrocarbons that are not present initially in the hydrocarbon-containing feedstock but are produced by cracking and hydrogenating hydrocarbons initially in the hydrocarbon-containing feedstock that were not vaporizable at the temperature and pressure within the mixing zone 1.

At least a portion of the vapor comprised of hydrocarbons that are vaporizable at the temperature and pressure within the mixing zone 1 may be continuously or intermittently separated from the mixture of hydrocarbon-containing feedstock, hydrogen, and catalyst since the more volatile vapor physically separates from the hydrocarbon-containing feedstock, catalyst, and hydrogen mixture. The vapor may also contain hydrogen gas, which also separates from the mixture, and hydrogen sulfide gas, which forms as a result of cracking sulfur-containing heteroatoms.

Separation of the vapor from the mixture leaves a hydrocarbon-depleted feed residuum from which the hydrocarbons present in the vapor have been removed. The hydrocarbon-depleted feed residuum is comprised of hydrocarbons that are liquid at the temperature and pressure within the mixing zone 1. The hydrocarbon-depleted feed residuum may also be comprised of solids such as metals freed from cracked hydrocarbons and minor amounts of coke. The hydrocarbon-depleted feed residuum may contain little coke or proto-coke since the process of the present invention inhibits the generation of coke. The hydrocarbon-depleted feed residuum may contain, per metric ton of hydrocarbon feedstock provided to the mixing zone 1, at most 50 kg, or less than 30 kg, or at most 20 kg, or at most 10 kg, or at most 5 kg of hydrocarbons insoluble in toluene as measured by ASTM Method D4072.

At least a portion of the hydrocarbon-depleted feed residuum is retained in the mixing zone 1 while the vapor is separated from the mixing zone 1. The portion of the hydrocarbon-depleted feed residuum retained in the mixing zone 1 may be subject to further cracking to produce more vapor that may be separated from the mixing zone 1 and then from the reactor 3 from which the liquid hydrocarbon-containing product may be produced by cooling. Hydrocarbon-containing feedstock and hydrogen may be continuously or intermittently provided to the mixing zone 1 at the rates described above and mixed with the catalyst(s) and the hydrocarbon-depleted feed residuum retained in the mixing zone 1 to produce further vapor comprised of hydrocarbons that are vaporizable at the temperature and pressure within the mixing zone 1 for separation from the mixing zone 1 and the reactor 3.

At least a portion of the vapor separated from the mixture of the hydrocarbon-containing feedstock, hydrogen, and catalyst may be continuously or intermittently separated from the mixing zone 1 while retaining the hydrocarbon-depleted feed residuum, catalyst, and any fresh hydrocarbon-containing feedstock in the mixing zone 1. At least a portion of the vapor separated from the mixing zone 1 may be continuously or intermittently separated from the reactor 3 through a reactor product outlet 11. The reactor 3 is preferably configured and operated so that substantially only vapors and gases may exit the reactor product outlet 11, where the vapor product exiting the reactor 3 comprises at most 5 wt. %, or at most 3 wt. %, or at most 1 wt. %, or at most 0.5 wt. %, or at most 0.1 wt. %, or at most 0.01 wt. %, or at most 0.001 wt. % solids and liquids at the temperature and pressure at which the vapor product exits the reactor 3.

A stripping gas may be injected into the reactor 3 over the mixing zone 1 to facilitate separation of the vapor from the mixing zone 1. The stripping gas may be heated to a temperature at or above the temperature within the mixing zone 1 to assist in separating the vapor from the mixing zone 1. In an embodiment of the process, the stripping gas may be hydrogen gas and/or hydrogen sulfide gas.

Figure 2:
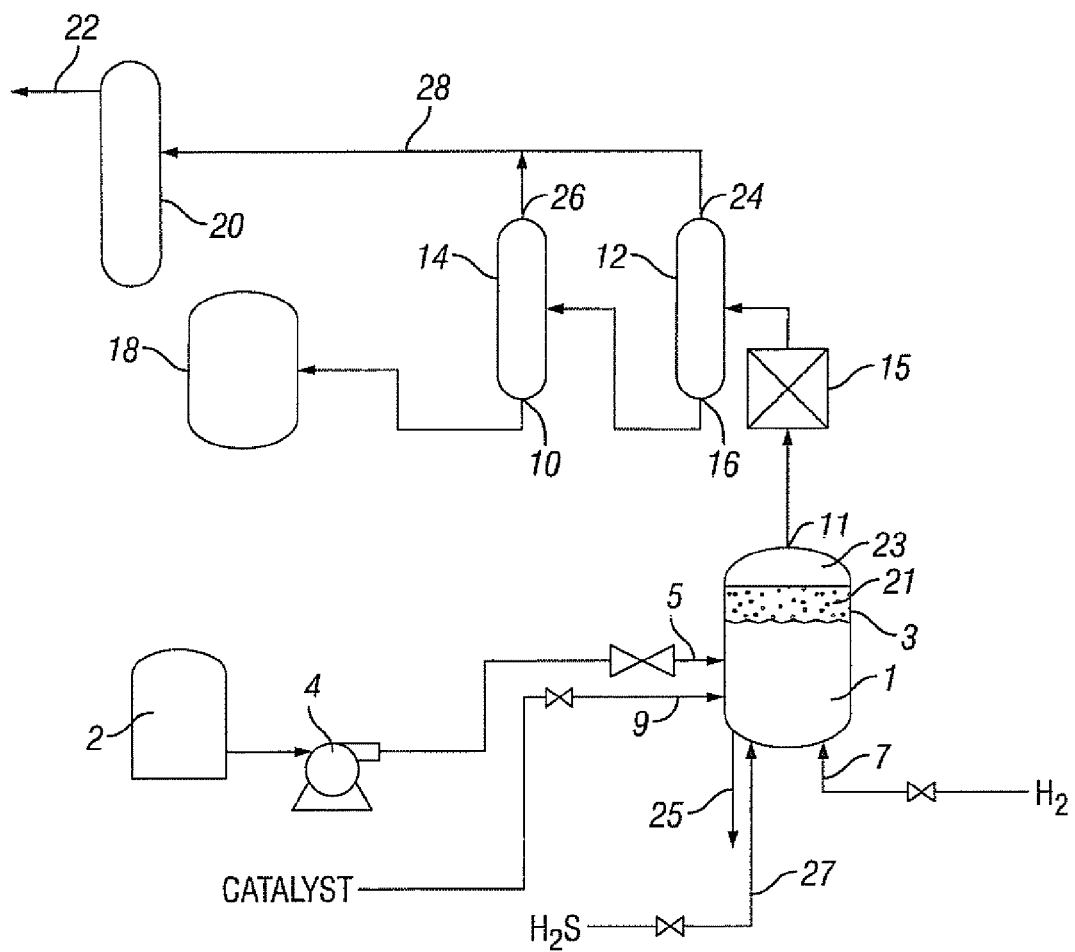
FIG. 2 is a schematic of a system useful for practicing the process of the present invention including a reactor having three zones.

As shown in FIG. 2, the reactor 3 may be comprised of a mixing zone 1, a disengagement zone 21, and a vapor/gas zone 23. The vapor comprised of hydrocarbons that are vaporizable at the temperature and pressure within the mixing zone 1 may separate from the mixture of hydrocarbon-depleted residuum, catalyst, hydrogen, and fresh hydrocarbon-containing feed, if any, in mixing zone 1 into the disengagement zone 21. A stripping gas such as hydrogen may be injected into the disengagement zone 21 to facilitate separation of the vapor from the mixing zone 1. Some liquids and solids may be entrained by the vapor as it is separated from the mixing zone 1 into the disengagement zone 21, so that the disengagement zone 21 contains a mixture of vapor and liquids, and potentially solids. At least a portion of the vapor separates from the disengagement zone 21 into the vapor/gas zone 23, where the vapor separating from the disengagement zone 21 into the vapor/gas zone 23 contains little or no liquids or solids at the temperature and pressure within the vapor/gas zone. At least a portion of the vapor in the vapor/gas zone 23 exits the reactor 3 through the reactor product outlet 11.

Referring now to FIGS. 1 and 2, in the process of the present invention, the hydrocarbons in the hydrocarbon-containing feed are contacted and mixed with the catalyst and hydrogen in the mixing zone 1 of the reactor only as long as necessary to be vaporized and separated from the mixture, and are retained in the reactor 3 only as long as necessary to be vaporized and exit the reactor product outlet 11. Low molecular weight hydrocarbons having a low boiling point may be vaporized almost immediately upon being introduced into the mixing zone 1 when the mixing zone 1 is maintained at a temperature of 375° C. to 500° C. and a total pressure of from 6.9 MPa to 27.5 MPa. These hydrocarbons may be separated rapidly from the reactor 3. High molecular weight hydrocarbons having a high boiling point, for example hydrocarbons having a boiling point greater than 538° C. at 0.101 MPa, may remain in the mixing zone 1 until they are cracked into hydrocarbons having a boiling point low enough to be vaporized at the temperature and pressure in the mixing zone 1 and to exit the reactor 3. The hydrocarbons of the hydrocarbon-containing feed, therefore, are contacted and mixed with the catalyst and hydrogen in the mixing zone 1 of the reactor 3 for a variable time period, depending on the boiling point of the hydrocarbons under the conditions in the mixing zone 1 and the reactor 3.

The rate of the process of producing the vapor product from the hydrocarbon-containing feedstock may be adjusted by selection of the temperature and/or pressure in the reactor 3, and particularly in the mixing zone 1, within the temperature range of 375° C.-500° C. and within the pressure range of 6.9 MPa-27.5 MPa. Increasing the temperature and/or decreasing the pressure in the mixing zone 1 permits the hydrocarbon-containing feedstock to be provided to the reactor 3 at an increased rate and the vapor product to be removed from the reactor 3 at an increased rate since the hydrocarbons in the hydrocarbon-containing feedstock may experience a decreased residence time in the reactor 3 due to higher cracking activity and/or faster vapor removal. Conversely, decreasing the temperature and/or increasing the pressure in the mixing zone 1 may reduce the rate at which the hydrocarbon-containing feedstock may be provided to the reactor 3 and the vapor product may be removed from the reactor 3 since the hydrocarbons in the hydrocarbon-containing feedstock may experience an increased residence time in the reactor 3 due to lower cracking activity and/or slower vapor removal.

As a result of the inhibition and/or prevention of the formation of coke in the process, the hydrocarbons in the hydrocarbon-containing feed may be contacted and mixed with the catalyst and hydrogen in the mixing zone 1 at a temperature of 375° C. to 500° C. and a pressure of 6.9 MPa to 27.5 MPa for as long as necessary to be vaporized; or to be cracked, hydrogenated, and vaporized. It is believed that high boiling, high molecular weight hydrocarbons may remain in the mixing zone 1 in the presence of cracked hydrocarbons since the catalyst promotes the formation of hydrocarbon radical anions upon cracking that react with hydrogen to form stable hydrocarbon products rather than hydrocarbon radical cations that react with other hydrocarbons to form coke. Coke formation is also avoided because the cracked hydrogenated hydrocarbons preferentially exit the mixing zone 1 as a vapor rather remaining in the mixing zone 1 to combine with hydrocarbon radicals in the mixing zone 1 to form coke or proto-coke.

At least a portion of the vapor separated from the mixing zone 1 and separated from the reactor 3 may be condensed and collected apart from the mixing zone 1 to produce the liquid hydrocarbon-containing product. Referring now to FIG. 1, the portion of the vapor separated from the reactor 3 may be provided to a condenser 13 wherein at least a portion of the vapor separated from the reactor 3 may be condensed to produce the hydrocarbon-containing product that is comprised of hydrocarbons that are a liquid at STP. A portion of the vapor separated from the reactor 3 may be passed through a heat exchanger 15 to cool the vapor prior to providing the vapor to the condenser 13.

Condensation of the liquid hydrocarbon-containing product from the vapor separated from the reactor 3 may also produce a non-condensable gas that may be comprised of hydrocarbons having a carbon number from 1 to 6, hydrogen, and hydrogen sulfide. The condensed hydrocarbon-containing liquid product may be separated from the non-condensable gas through a condenser liquid product outlet 17 and stored in a product receiver 18, and the non-condensable gas may be separated from the condenser 13 through a non-condensable gas outlet 19 and passed through an amine or caustic scrubber 20 and recovered through a gas product outlet 22.

Alternatively, referring now to FIG. 2, the portion of the vapor separated from the reactor 3 may be provided to a high pressure separator 12 to separate a liquid hydrocarbon-containing product from gases not condensable at the temperature and pressure within the high pressure separator 12, and the liquid hydrocarbon-containing product collected from the high pressure separator may be provided through line 16 to a low pressure separator 14 operated at a pressure less than the high pressure separator 12 to separate the liquid hydrocarbon-containing product from gases that are not condensable at the temperature and pressure at which the low pressure separator 14 is operated. The vapor/gas exiting the reactor 3 from the reactor product outlet 11 may be cooled prior to being provided to the high pressure separator 12 by passing the vapor/gas through heat exchanger 15. The condensed hydrocarbon-containing liquid product may be separated from the non-condensable gas in the low pressure separator through a low pressure separator liquid product outlet 10 and stored in a product receiver 18. The non-condensable gas may be separated from the high pressure separator 12 through a high pressure non-condensable gas outlet 24 and from the low pressure separator 14 through a low pressure non-condensable gas outlet 26. The non-condensable gas streams may be combined in line 28 and passed through an amine or caustic scrubber 20 and recovered through a gas product outlet 22.

Alternatively, the vapor separated from the mixing zone 1 and from the reactor 3 may be further hydroprocessed without condensing the hydrocarbon-containing product. For example, the vapor separated from the reactor may be hydrotreated to reduce sulfur, nitrogen, and olefins in the hydrocarbon-containing product by passing the vapor from the reactor 3 to a hydroprocessing reactor, where the vapor may be contacted with a conventional hydroprocessing catalyst and hydrogen at a temperature of from 260° C. to 425° C. and a total pressure of from 3.4 MPa to 27.5 MPa.

A portion of the hydrocarbon-depleted feed residuum and catalyst(s) may be separated from the mixing zone to remove solids including metals and hydrocarbonaceous solids including coke from the hydrocarbon-depleted feed residuum and to regenerate the catalyst(s). Referring now to FIGS. 1 and 2, the reactor 3 may include a bleed stream outlet 25 for removal of a stream of hydrocarbon-depleted feed residuum and catalyst(s) from the mixing zone 1 and the reactor 3. The bleed stream outlet 25 may be operatively connected to the mixing zone 1 of the reactor 3.

A portion of the hydrocarbon-depleted feed residuum and the catalyst(s) may be removed together from the mixing zone 1 and the reactor 3 through the bleed stream outlet 25 while the process is proceeding. Solids and the catalyst(s) may be separated from a liquid portion of the hydrocarbon-depleted feed residuum in a solid-liquid separator 30. The solid-liquid separator 30 may be a filter or a centrifuge. The liquid portion of the hydrocarbon-depleted feed residuum may be recycled back into the mixing zone 1 via a recycle inlet 32 for further processing or may be combined with the hydrocarbon-containing feed and recycled into the mixing zone 1 through the feed inlet 5.

In a preferred embodiment, hydrogen sulfide is mixed with the hydrocarbon-containing feedstock, hydrogen, and the catalyst in the mixing zone 1 of the reactor 3. The hydrogen sulfide may be provided continuously or intermittently to the mixing zone 1 of the reactor 3 as a liquid or a gas. The hydrogen sulfide may be mixed with the hydrocarbon-containing feedstock and provided to the mixing zone 1 with the hydrocarbon-containing feedstock through the feed inlet 5. Alternatively, the hydrogen sulfide may be mixed with hydrogen and provided to the mixing zone 1 through the hydrogen inlet line 7. Alternatively, the hydrogen sulfide may be provided to the mixing zone 1 through a hydrogen sulfide inlet line 27.

Although the process of the invention is not to be limited thereby, it is believed that the hydrogen sulfide acts as a further catalyst in the cracking of hydrocarbons in the hydrocarbon-containing feedstock in the presence of hydrogen and the catalyst comprised of the first metal, second metal, and sulfur. Hydrogen sulfide and hydrogen each may act as an atomic hydrogen donor to a cracked hydrocarbon radical anion to produce a stable hydrocarbon having a smaller molecular weight than the hydrocarbon from which the hydrocarbon radical was derived. Hydrogen, however, may only act as an atomic hydrogen donor to a cracked hydrocarbon radical at or near the catalyst surface. Hydrogen sulfide, however, may act as a hydrogen donor significantly further from the catalyst surface, and, after donation of a hydrogen atom to a cracked hydrocarbon radical, may accept a hydrogen atom from hydrogen at or near the surface of the catalyst. The hydrogen sulfide, therefore, may act as an atomic hydrogen shuttle to provide atomic hydrogen to a cracked hydrocarbon radical at a distance from the catalyst. Furthermore, the thiol group remaining after hydrogen sulfide has provided a hydrogen atom to a cracked hydrocarbon radical may be provided to another hydrocarbon radical, thereby forming a meta-stable thiol-containing hydrocarbon. This may be described chemically as follows:

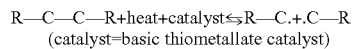
(catalyst=basic thiometallate catalyst)     1

    2

    3

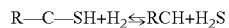    4

The thiol of the meta-stable thiol-containing hydrocarbon may be replaced by a hydrogen atom from either another hydrogen sulfide molecule or hydrogen, or may react intramolecularly to form a thiophene ring and subsequently be vaporized and separated from the reactor as a hydrocarbon-containing product. The hydrogen sulfide may direct the selectivity of the process away from producing coke by providing hydrogen at an increased rate to the cracked hydrocarbon radicals and by providing a thiol to the cracked hydrocarbon radicals—thereby inhibiting the cracked hydrocarbon radicals from agglomerating with other hydrocarbons.

It is believed that hydrogen sulfide lowers the activation energy to crack hydrocarbons in the hydrocarbon-containing feedstock, thereby increasing the rate of the reaction. The rate of the process, in particular the rate that the hydrocarbon-containing feedstock may be provided to the mixing zone 1 for cracking and cracked product may be removed from the reactor 3, therefore, may be greatly increased with the use of significant quantities of hydrogen sulfide in the process. For example, the rate of the process may be increased by at least 1.5 times, or by at least 2 times, the rate of the process in the absence of significant quantities of hydrogen sulfide.

The hydrogen sulfide provided to be mixed with the hydrocarbon-containing feedstock, hydrogen, and the catalyst may be provided in an amount effective to increase the rate of the cracking reaction. In order to increase the rate of the cracking reaction, hydrogen sulfide may be provided in an amount on a mole ratio basis relative to hydrogen provided to be mixed with the hydrocarbon-containing feedstock and catalyst, of at least 0.5 mole of hydrogen sulfide per 9.5 moles hydrogen, where the combined hydrogen sulfide and hydrogen partial pressures are maintained to provide at least 60%, or at least 70%, or at least 80%, or at least 90%, or at least 95% of the total pressure in the reactor. The hydrogen sulfide may be provided in an amount on a mole ratio basis relative to the hydrogen provided of at least 1:9, or at least 1.5:8.5, or at least 2.5:7.5, or at least 3:7 or at least 3.5:6.5, or at least 4:6, up to 1:1, where the combined hydrogen sulfide and hydrogen partial pressures are maintained to provide at least 60%, or at least 70%, or at least 80%, or at least 90%, or at least 95% of the total pressure in the reactor. The hydrogen sulfide partial pressure in the reactor may be maintained in a pressure range of from 0.4 MPa to 13.8 MPa, or from 2 MPa to 10 MPa, or from 3 MPa to 7 MPa.

The combined partial pressure of the hydrogen sulfide and hydrogen in the reactor may be maintained to provide at least 60% of the total pressure in the reactor, where the hydrogen sulfide partial pressure is maintained at a level of at least 5% of the hydrogen partial pressure. Preferably, the combined partial pressure of the hydrogen sulfide and hydrogen in the reactor is maintained to provide at least 70%, or at least 75%, or at least 80%, or at least 90%, or at least 95% of the total pressure in the reactor, where the hydrogen sulfide partial pressure is maintained at a level of at least 5% of the hydrogen partial pressure. Other gases may be present in the reactor in minor amounts that provide a pressure contributing to the total pressure in the reactor. For example, a non-condensable gas produced in the vapor along with the hydrocarbon-containing product may be separated from the hydrocarbon-containing product and recycled back into the mixing zone, where the non-condensable gas may comprise hydrocarbon gases such as methane, ethane, and propane as well as hydrogen sulfide and hydrogen.

The vapor separated from the mixing zone 1 and from the reactor 3 through the reactor product outlet 11 may contain hydrogen sulfide. The hydrogen sulfide in the vapor product may be separated from the hydrocarbon-containing liquid product in the condenser 13 (FIG. 1) or in the high and low pressure separators 12 and 14 (FIG. 2), where the hydrogen sulfide may form a portion of the non-condensable gas. When hydrogen sulfide is provided to the mixing zone 1 in the process, it is preferable to condense the hydrocarbon-containing liquid product at a temperature of from 60° C. to 93° C. (140° F.-200° F.) so that hydrogen sulfide is separated from the hydrocarbon-containing liquid product with the non-condensable gas rather than condensing with the liquid hydrocarbon-containing product. The non-condensable gas including the hydrogen sulfide may be recovered from the condenser 13 through the gas product outlet 19 (FIG. 1) or from the high pressure separator 12 through high pressure separator gas outlet 24 and the low pressure separator gas outlet 26 (FIG. 2). The hydrogen sulfide may be separated from the other components of the non-condensable gas by treatment of the non-condensable gas to recover the hydrogen sulfide. For example, the non-condensable gas may be scrubbed with an amine solution in the scrubber 20 to separate the hydrogen sulfide from the other components of the non-condensable gas. The hydrogen sulfide may then be recovered and recycled back into the mixing zone 1.

The process of the present invention may be effected for a substantial period of time on a continuous or semi-continuous basis, in part because the process generates little or no coke. The hydrocarbon-containing feedstock, hydrogen, catalyst, and hydrogen sulfide (if used in the process) may be continuously or intermittently provided to the mixing zone 1 in the reactor 3 and mixed in the mixing zone 1 at a temperature of from 375° C.-500° C. and a total pressure of from 6.9 MPa-27.5 MPa for a period of at least 40 hours, or at least 100 hours, or at least 250 hours, or at least 500 hours, or at least 750 hours to generate the vapor comprised of hydrocarbons that are vaporizable at the temperature and pressure in the mixing zone 1 and the hydrocarbon-depleted residuum, as described above. The vapor may be continuously or intermittently separated from the mixing zone 1 and the reactor 3 over substantially all of the time period that the hydrocarbon-containing feedstock, catalyst, hydrogen, and hydrogen sulfide, if any, are mixed in the mixing zone 1. Fresh hydrocarbon-containing feedstock, hydrogen, and hydrogen sulfide, if used in the process, may be blended with the hydrocarbon-depleted residuum in the mixing zone 1 over the course of the time period of the reaction as needed. In a preferred embodiment, fresh hydrocarbon-containing feedstock, hydrogen, and hydrogen sulfide, if any, are provided continuously to the mixing zone 1 over substantially all of the time period the reaction is effected. Solids may be removed from the mixing zone 1 continuously or intermittently over the time period the process is run by separating a bleed stream of the hydrocarbon-containing feed residuum from the mixing zone 1 and the reactor 3, removing the solids from the bleed stream, and recycling the bleed stream from which the solids have been removed back into the mixing zone 1 as described above.

The process of the present invention produces, in part, a hydrocarbon-containing product that is a liquid at STP. The hydrocarbon-containing product contains less than 3 wt. %, or at most 2 wt. %, or at most 1 wt. %, or at most 0.5 wt. % of hydrocarbons having a boiling point of greater than 538° C. as determined in accordance with ASTM Method D5307. Furthermore, the hydrocarbon-containing product contains at least 80%, or at least 85%, or at least 90%, or at least 95%, or at least 97% of the atomic carbon present in the hydrocarbon-containing feedstock. Therefore, when the process of the present invention is utilized, most of the hydrocarbons in the hydrocarbon-containing feedstock may be recovered in the hydrocarbon-containing product that is liquid at STP, and little of the hydrocarbons in the hydrocarbon-containing feedstock are converted to coke or gas.

The hydrocarbon-containing product may contain VGO hydrocarbons, distillate hydrocarbons, and naphtha hydrocarbons. The hydrocarbon-containing product may contain, per gram, at least 0.05 grams, or at least 0.1 grams of hydrocarbons having a boiling point from the initial boiling point of the hydrocarbon-containing product up to 204° C. (400° F.). The hydrocarbon-containing product may also contain, per gram, at least 0.1 grams, or at least 0.15 grams of hydrocarbons having a boiling point of from 204° C. (400° F.) up to 260° C. (500° F.). The hydrocarbon-containing product may also contain, per gram, at least 0.25 grams, or at least 0.3 grams, or at least 0.35 grams of hydrocarbons having a boiling point of from 260° C. (500° F.) up to 343° C. (650° F.). The hydrocarbon-containing product may also contain, per gram, at least 0.3 grams, or at least 0.35 grams, or at least 0.4, or at least 0.45 grams of hydrocarbons having a boiling point of from 343° C. (500° F.) up to 510° C. (950° F.). The relative amounts of hydrocarbons within each boiling range and the boiling range distribution of the hydrocarbons may be determined in accordance with ASTM Method D5307.

The hydrocarbon-containing product produced by the process of the present invention may contain significant amounts of sulfur. The hydrocarbon-containing product may contain, per gram, at least 0.0005 gram of sulfur or at least 0.001 gram of sulfur. The sulfur content of the hydrocarbon-containing product may be determined in accordance with ASTM Method D4294. The sulfur-containing hydrocarbon compounds in the hydrocarbon-containing product may be primarily benzothiophenic compounds. In the hydrocarbon-containing product, at least 70 wt. % of the sulfur may be contained benzothiophenic compounds. At least 75 wt. % or at least 80 wt. %, or at least 85 wt. % of the sulfur in the hydrocarbon-containing product may be contained in benzothiophenic compounds. The amount of sulfur in benzothiophenic compounds in the hydrocarbon-containing product relative to the amount of sulfur in all sulfur containing compounds in the hydrocarbon-containing product may be determined by sulfur chemiluminescence two dimensional gas chromatography (GC×GC-SCD).

The hydrocarbon-containing product produced by the process of the present invention may contain, per gram, at least 0.0005 gram or at least 0.001 gram of nitrogen as determined in accordance with ASTM Method D5762. The hydrocarbon-containing product may have a relatively low ratio of basic nitrogen compounds to other nitrogen containing compounds therein. The nitrogen may be contained in hydrocarbon compounds, where the nitrogen containing hydrocarbon compounds in the hydrocarbon-containing product may be primarily carbazolic compounds and acridinic compounds. In the hydrocarbon-containing product at least 70 wt. %, or at least 75 wt. %, or at least 80 wt. %, or at least 85 wt. % of the nitrogen in the hydrocarbon-containing product may be contained in carbazolic compounds and acridinic compounds. The amount of nitrogen in carbazolic and acridinic compounds relative to the amount of nitrogen in all nitrogen containing compounds in the hydrocarbon-containing product may be determined by nitrogen chemiluminescence two dimensional gas chromatography (GC×GC-NCD).

The hydrocarbon-containing product produced by the process of the present invention may contain significant quantities of aromatic hydrocarbon compounds. The hydrocarbon-containing product may contain, per gram, at least 0.3 gram, or at least 0.35 gram, or at least 0.4 gram, or at least 0.45 gram, or at least 0.5 gram of aromatic hydrocarbon compounds.

The hydrocarbon-containing product of the process of the present invention may contain relatively few polyaromatic hydrocarbon compounds containing two or more aromatic ring structures (e.g. naphthalene, benzothiophene, bi-phenyl, quinoline, anthracene, phenanthrene, di-benzothiophene) relative to mono-aromatic hydrocarbon compounds (e.g. benzene, toluene, pyridine). The mono-aromatic hydrocarbon compounds in the hydrocarbon-containing product may be present in the hydrocarbon-containing product in a weight ratio relative to the polyaromatic hydrocarbon compounds (containing two or more aromatic ring structures) of at least 1.5:1.0, or at least 2.0:1.0, or at least 2.5:1.0. The relative amounts of mono-aromatic and polyaromatic compounds in the hydrocarbon-containing product may be determined by flame ionization detection-two dimensional gas chromatography (GC×GC-FID).

The hydrocarbon-containing product of the process of the present invention may contain olefins, where a significant amount of the olefins may be alpha olefins having a terminal double bond. Olefin content in the hydrocarbon-containing product may be determined in accordance with ASTM Method D6730. The hydrocarbon-containing product may contain, per gram, at least 0.05 grams, or at least 0.1 grams of alpha olefins. The alpha olefins in the hydrocarbon-containing product may be present in the hydrocarbon-containing product relative to olefins having an internal double bond in a weight ratio of alpha olefins to internal double bond olefins is at least 0.7:1.0, or at least 0.9:1.0, or at least 1.0:1.0.

The hydrocarbon-containing product of the process of the present invention may contain paraffins, where a significant amount of the paraffins may be n-paraffins. Paraffin content in the hydrocarbon-containing product may be determined in accordance with ASTM Method D6730. The n-paraffins in the hydrocarbon-containing product may be present relative to isoparaffins in a weight ratio of isoparaffins to n-paraffins of at most 1.4:1.0, or at most 1.0:1.0.

To facilitate a better understanding of the present invention, the following examples of certain aspects of some embodiments are given. In no way should the following examples be read to limit, or define, the scope of the invention.

EXAMPLE 1

A catalyst for use in a process of the present invention containing copper, molybdenum, and sulfur was produced, where at least a portion of the catalyst had a structure according to Formula (X).

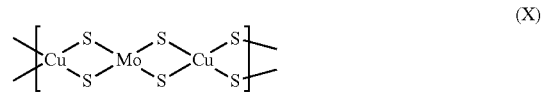

1798 grams of $CuSO_4$ were mixed with sufficient deionized water to make a 4 liter solution. Separately, 260 grams of $(NH_4)_2MoS_4$ were mixed in 2 liters of deionized water to form an aqueous solution. 212 grams of $Na_2CO_3$ in 600 ml deionized water were added to the solution of $(NH_4)_2MoS_4$, and the mixture was heated to 75° C. for 1 hour to form a solution containing $Na_2MoS_4$. The solution containing $Na_2MoS_4$ and the solution containing the $CuSO_4$ were charged separately to opposite sides of a 22 liter vessel containing 7.6 liters of deionized water using a 2"×0.02" injection nozzle for the copper solution and a 1/16" injection nozzle for the molybdenum solution. The solutions were charged to the aqueous mixture under nitrogen at a temperature of 26° C. over a period of 2 hours while the mixture was being stirred by mechanical stiffing. After completion of addition of the solutions to the aqueous mixture, the mixture was stirred for an additional twelve hours under nitrogen while maintaining the temperature of the mixture at 26° C. The mixture was then centrifuged at 8000 G to separate the solid catalyst from the solution. The solid catalyst was washed with deionized water until the conductivity measurements of the wash were under 100 μS at 32° C. The resulting solid catalyst material was heated to 55° C. for 3 days under vacuum 303.8 g of the solid catalyst was recovered. Semi-quantitative XRF indicated that the catalyst contained, on a mass basis, 45.6% Cu, 19.3% Mo, 31.7% S, and 0.131% Cl. The catalyst was particulate having a particle size distribution with a mean particle size of 450 angstroms as determined by laser diffractometry using a Mastersizer S made by Malvern Instruments. The BET surface area of the catalyst was measured and found to be 130 m²/g. The pore volume of the catalyst was found to be 0.273 cm³/g and the mean pore diameter was found to be 84 angstroms. X-ray diffraction and Raman IR spectroscopy confirmed that at least a portion of the catalyst had a structure in which copper, sulfur, and molybdenum were arranged as shown in Formula (X) above.

EXAMPLE 2

A covellite (CuS) catalyst for use in a comparative process was prepared. 1694.6 grams of $CuSO_4$ stock solution in 6.6 liters of deionized water were added via a 2'×0.02' nozzle to a near boiling solution of 312.2 grams of sodium sulfide in 7.6 liters of water over a period of 2 hours. The solution was mixed thoroughly during the addition. The mixture was then allowed to cool and settle. The covellite catalyst was separated from the mixture by centrifugation at 7000 G. The separated solid catalyst material was washed until the solution conductivity of the wash water was less than 10 μS at 33° C. The washed solid catalyst material was dried under vacuum at 60° C. to produce 155.4 grams of the covellite catalyst.

EXAMPLE 3

Bitumen from Peace River, Canada was selected as a hydrocarbon-containing feedstock for cracking. The Peace River bitumen was analyzed to determine its composition. The properties of the Peace River bitumen are set forth in Table 1:

TABLE 1

| Property | Value |
|---|---|
| Hydrogen (wt. %) | 10.1 |
| Carbon (wt. %) | 82 |
| Oxygen (wt. %) | 0.62 |
| Nitrogen (wt. %) | 0.37 |
| Sulfur (wt. %) | 6.69 |
| Nickel (wppm) | 70 |
| Vanadium (wppm) | 205 |
| Microcarbon residue (wt. %) | 12.5 |
| C5 asphaltenes (wt. %) | 10.9 |
| Density (g/ml) | 1.01 |
| Viscosity at 38° C. (cSt) | 8357 |
| TAN-E (ASTM D664) (mg KOH/g) | 3.91 |
| Boiling Range Distribution | |
| Initial Boiling Point-204° C. (400° F.)(wt. %) [Naphtha] | 0 |
| 204° C. (400° F.)-260° C. (500° F.) (wt. %) [Kerosene] | 1 |
| 260° C. (500° F.)-343° C. (650° F.) (wt. %) [Diesel] | 14 |
| 343° C. (650° F.)-538° C. (1000° F.) (wt. %) [VGO] | 37.5 |
| >538° C. (1000° F.) (wt. %) [Residue] | 47.5 |

Four samples of the Peace River bitumen were cracked in separate cracking treatments: 1) a thermal cracking treatment in which no catalyst was included while the bitumen was cracked; 2) a catalytic cracking treatment including the covellite (CuS) catalyst prepared in Example 3; 3) a catalytic cracking treatment utilizing a 50:50 weight mixture of the covellite (CuS) catalyst prepared in Example 3 and a commercially available MoS$_3$ catalyst; and 4) a catalytic cracking treatment according to the process of the present invention including the copper tetrathiomolybdate catalyst prepared in Example 1.

In each cracking treatment, the Peace River bitumen was preheated to approximately 105° C.-115° C. in a 10 gallon feed drum and circulated through a closed feed loop system from which the bitumen was fed into a semi-continuous stirred tank reactor with vapor effluent capability, where the reactor had an internal volume capacity of 600 cm$^3$. The reactor was operated in a continuous mode with respect to the bitumen feedstream and the vapor effluent product, however, the reactor did not include a bleed stream to remove accumulating metals and/or carbonaceous solids. The feed was fed to the reactor as needed to maintain a working volume of feed in the reactor of approximately 475 ml, where a Berthold single-point source nuclear level detector located outside the reactor was used to control the working volume in the reactor. Hydrogen was fed to the reactor at a flow rate of 600 standard liters per hour, and the pressure in the reactor was maintained at 11 MPa (110 bar). The bitumen feed, hydrogen, and the selected catalyst (if any) were mixed together in the reactor by stirring with a shaft-driven impeller, where the mixer shaft was driven at 1200 rpm or higher. The temperature in the reactor was maintained at 450° C. Vaporized product exited the reactor, where a liquid product was separated from the vaporized product by passing the vaporized product through a high pressure separator and then through a low pressure separator to separate the liquid product from non-condensable gases. The amount, by weight, of liquid product exiting the reactor was measured on an hourly basis. The reaction was halted when the rate of liquid product exiting the reactor dropped to 25 grams/hour or less over a period of several hours after initial production of a liquid product, where the drop in the rate of production of liquid product was due to accumulation of metals and/or heavy carbonaceous material in the reactor.

In one treatment, the bitumen was cracked by a thermal cracking process. In a second treatment, the bitumen was cracked by a catalytic cracking process wherein 40 grams of covellite (CuS) produced in Example 3 were mixed with the bitumen in the reactor during the course of the cracking process. In a third treatment, the bitumen was cracked by a catalytic cracking process wherein 20 grams of covellite (CuS) produced in Example 3 and 20 grams of commercially available MoS$_3$ were mixed with the bitumen in the reactor during the course of the cracking process. In a fourth treatment, the bitumen was cracked by a catalytic cracking process in accordance with the present invention wherein 40 grams of copper tetrathiomolybdate as prepared in Example 1 were mixed with the bitumen in the reactor during the course of the cracking process.

Figure 3:
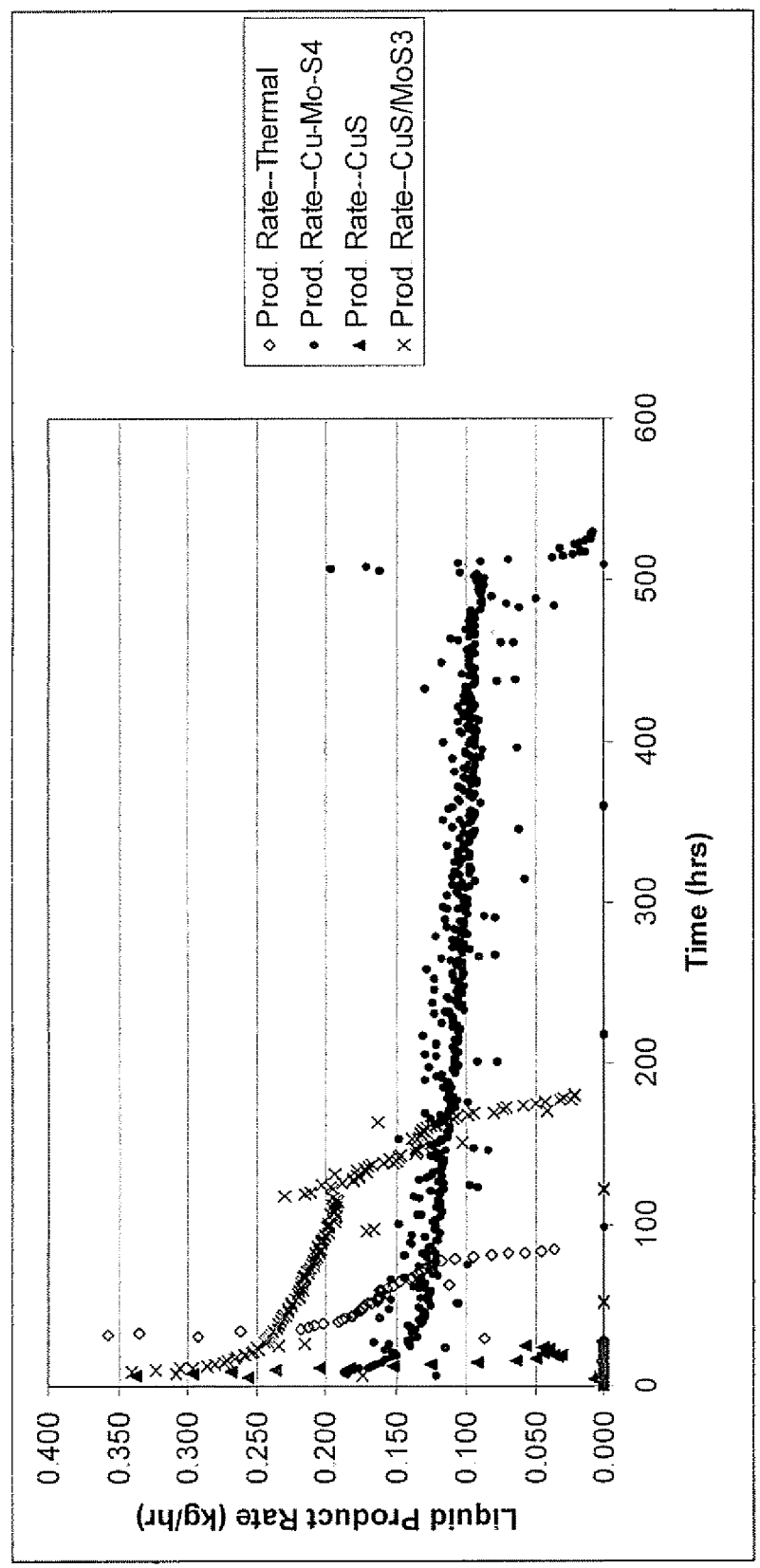
FIG. 3 is a chart plotting the liquid production rate v. time of reaction for a process practiced in accordance with the present invention utilizing a copper tetrathiomolybdate catalyst relative to processes not in accordance with the present invention.

As shown in FIG. 3, the bitumen was cracked using the copper tetrathiomolybdate catalyst for a significantly longer period of time than bitumen cracked thermally, or with a CuS (covellite) catalyst, or with a combination of a CuS (covellite) catalyst and a MoS$_3$ catalyst before the rate of production of liquid product dropped consistently below 25 grams/hour. As a result, far more of the bitumen was cracked to form liquid product utilizing the copper tetrathiomolybdate catalyst in accordance with the process of the present invention, than was produced using the CuS catalyst, the CuS/MoS$_3$ catalyst, or by thermal cracking. Table 2 shows the relative amounts of bitumen and hydrogen provided in each treatment, the relative amounts of liquid products and solid byproducts produced by each process, as well as the boiling range distribution of the liquid products for the copper tetrathiomolybdate catalyst cracking process, the CuS cracking process, the CuS/MoS$_3$ cracking process, and the thermal cracking process, and the sulfur content and nitrogen content of the liquid products of the copper tetrathiomolybdate catalyst cracking process and the thermal cracking process.

TABLE 2

| | Cu—Mo—S$_4$ Catalyst Treatment 450° C. | Covellite (CuS) Catalyst Treatment 450° C. | CuS/MoS$_3$ Catalyst Treatment 450° C. | Thermal Treatment 450° C. |
|---|---|---|---|---|
| Total feed (kg) | 62.7 | 3.8 | 37.1 | 9.0 |
| Total H$_2$ (kg) | 26.1 | 1.2 | 9.0 | 4.2 |
| Total liquid product (kg) | 55.4 | 2.6 | 32.3 | 8.9 |
| Total solid product (kg) | 0.5 | 0.5 | 0.5 | 0.5 |

TABLE 2-continued

|  | Cu—Mo—S$_4$ Catalyst Treatment 450° C. | Covellite (CuS) Catalyst Treatment 450° C. | CuS/MoS$_3$ Catalyst Treatment 450° C. | Thermal Treatment 450° C. |
| --- | --- | --- | --- | --- |
| Run time (hours) | 526 | 25 | 181 | 85 |
| Boiling point. IBP-204° C (wt. %) | 15 | 15 | 15 | 13 |
| Boiling point 204° C. up to 260° C. (wt. %) | 11 | 12 | 15 | 12 |
| Boiling point 260° C. up to 343° C. (wt. %) | 29 | 35 | 42 | 37 |
| Boiling point 343° C. to 538° C. (wt. %) | 44.5 | 35 | 28 | 35 |
| Boiling point >538° C. (wt. %) | 0 | 2.5 | 0 | 2.5 |
| Sulfur (wt. %) | 2.2 | not measured | not measured | 0.3 |
| Nitrogen (wt. %) | 0.3 | not measured | not measured | 3.4 |

As shown in Table 2, bitumen cracked when mixed with hydrogen and a copper tetrathiomolybdate catalyst in accordance with the process of the invention provided significantly more liquid product, and liquid product relative to solid product, than cracking thermally, with a CuS catalyst, or with a CuS/MoS$_3$ catalyst. The period of time that the bitumen was cracked was very significantly longer with the copper tetrathiomolybdate catalyst than any of the other cracking processes, being at least double the cracking time period of the second best cracking process utilizing a CuS/MoS$_3$ catalyst.

EXAMPLE 4

A catalyst for use in a process of the present invention containing copper, tungsten, and sulfur was produced, where at least a portion of the catalyst had a structure according to Formula (XI).

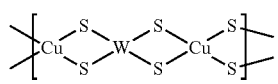

(XI)

1199 grams of CuSO$_4$ were mixed with 7.6 liters of water to form a CuSO$_4$ solution. Separately, 696 grams of (NH$_4$)$_2$WS$_4$ were mixed in 7.6 liters of deionized water to form an aqueous (NH$_4$)$_2$WS$_4$ solution. Under nitrogen, the solution containing CuSO$_4$ was charged into the (NH$_4$)$_2$WS$_4$ solution using a 2"×0.02" injection nozzle. The CuSO$_4$ solution was charged to the aqueous mixture under nitrogen at ambient temperature (21° C.) over a period of 2 hours while the mixture was being stirred by mechanical stirring. After completion of addition of the CuSO$_4$ solution to the aqueous mixture, the mixture was allowed to settle overnight under nitrogen while maintaining the temperature of the mixture at ambient. The mixture was then centrifuged at 7000 G to separate the solid catalyst from the solution. The solid catalyst was washed with deionized water until the conductivity measurements of the wash were under 111 μS at 25° C. The resulting solid catalyst material was heated to 50° C.-55° C. for 5 days under vacuum 329 g of the catalyst were recovered. Semi-quantitative XRF indicated that the catalyst contained, on a mass % basis, 18.6% Cu, 54.0% W, 28.1% S, and <0.1% Ca. The catalyst was particulate and had a particle size distribution with a mean particle size of 1.86 μm as determined by laser diffractometry using a Mastersizer S made by Malvern Instruments. The BET surface area of the catalyst was measured and found to be 0.4 m$^2$/g. The pore volume of the solid catalyst material was found to be 0.001 cm$^3$/g and the mean pore diameter was found to be 108 angstroms. X-ray diffraction and Raman IR spectroscopy confirmed that at least a portion of the catalyst was a copper tetrathiotungstate that had a structure in which copper, sulfur, and tungsten were arranged as shown in Figure (XI) above.

Figure 4:
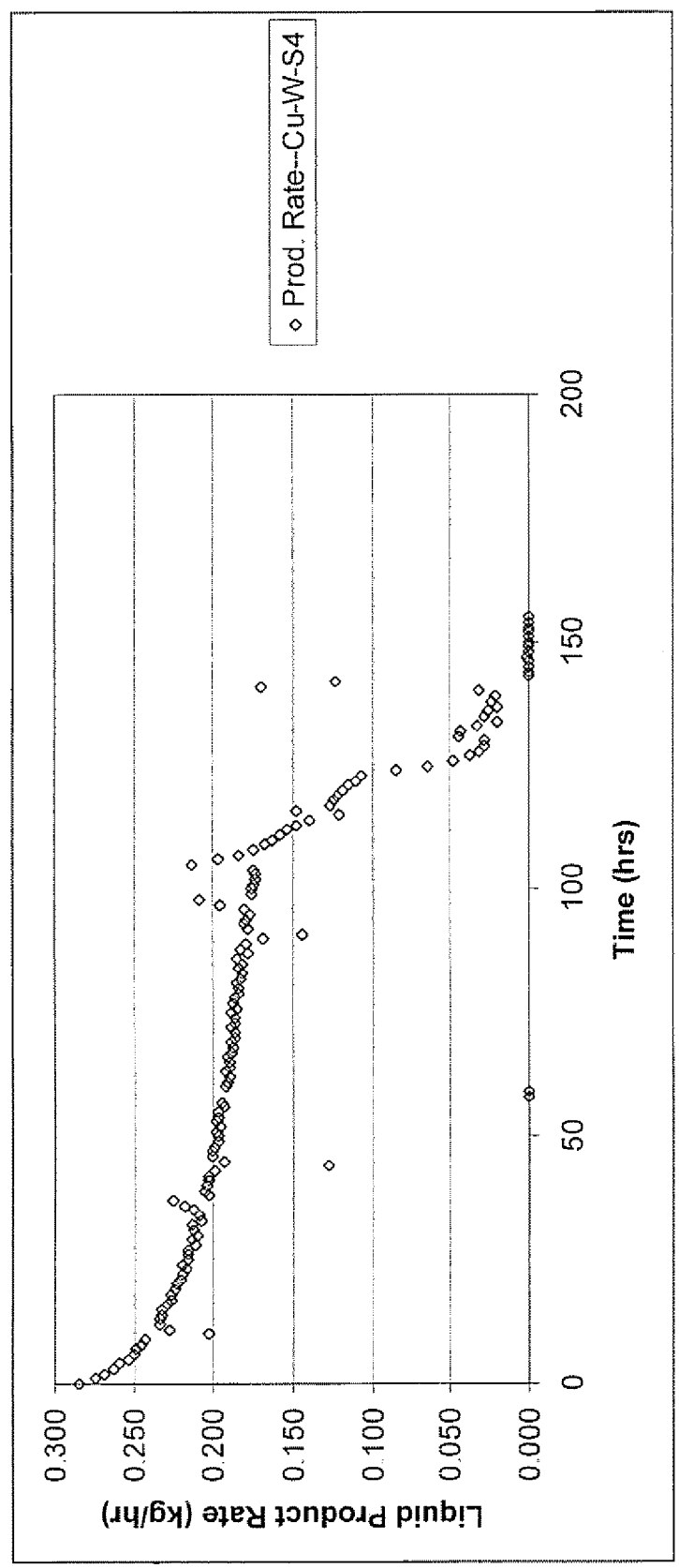
FIG. 4 is a chart plotting the liquid production rate v. time of reaction for a process practiced in accordance with the present invention utilizing a copper tetrathiotungstate.

A sample of the Peace River bitumen utilized in Example 3 above was cracked according to the process of the present invention using the copper tetrathiotungstate catalyst. The conditions for the cracking process were the same as described above in Example 3, except that the copper tetrathiotungstate catalyst was used. FIG. 4 shows the liquid production rate relative to the time of the cracking process utilizing the copper tetrathiotungstate catalyst. Table 3 shows the relative amounts of bitumen and hydrogen provided in the cracking process, the relative amounts of liquid product and solid byproduct produced by the process, as well as the sulfur content, nitrogen content, and boiling range distribution of the liquid product produced in the cracking process utilizing the copper tetrathiotungstate catalyst.

TABLE 3

|  | Cu—W—S$_4$ Catalyst Treatment 450° C. |
| --- | --- |
| Total feed (kg) | 29.9 |
| Total H$_2$ (kg) | 8.3 |
| Total liquid product (kg) | 25.9 |
| Total solid product (kg) | 0.6 |
| Run time (hours) | 168 |
| Boiling point <180° C. (wt. %) | 16 |
| Boiling point 180° C. up to 250° C. (wt. %) | 14 |
| Boiling point 250° C. up to 360° C. (wt. %) | 39 |
| Boiling point 360° C. to 538° C. (wt. %) | 29 |
| Boiling point >520° C. (wt. %) | 1.5 |
| Sulfur (wt. %) | 2.24 |
| Nitrogen (wt. %) | 0.3 |

EXAMPLE 5

A catalyst containing iron, molybdenum, and sulfur was produced, where at least a portion of the catalyst was analyzed and found to have iron, molybdenum and sulfur structurally formed according to Formula (XII):

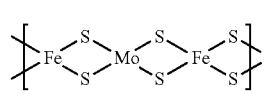

(XII)

Initially, iron sulfate heptahydrate was prepared from iron powder and sulfuric acid. 100 g of iron powder were added to 7.6 liters of deionized water in a 22 liter round bottomed flask. Separately, 86 ml of concentrated H$_2$SO$_4$ was mixed with 500 ml of deionized water to prepare a sulfuric acid solution. The sulfuric acid solution was added dropwise over a period of 2 hours to the iron powder slurry while mixing the slurry. The slurry was stirred overnight after completion of addition of the sulfuric acid solution to the slurry to form a solution of iron sulfate heptahydrate. After stirring, the solution was heated between 30-45° C. for 3 hours and gas evolution was observed. The warm iron sulfate solution was then added over a period of 1 hour to a stirred solution, under nitrogen, containing 398 g of $(NH_4)_2MoS_4$ in 7.6 liters of deionized water. The iron sulfate solution was added to the $(NH_4)_2MoS_4$ solution by pumping the iron sulfate solution through a 2.75"× 0.020" outer diameter injector nozzle immersed in the $(NH_4)_2MoS_4$ solution. After addition of the iron sulfate solution to the $(NH_4)_2MoS_4$ solution was completed, the mixture was stirred under nitrogen at ambient temperature (28° C.) for a period of 2 hours. The mixture was then allowed to settle overnight. The solids were then separated from the mixture using a continuous centrifuge. The separated solids were washed with deionized water, then dried by azeotropic distillation. 526 grams of solid catalyst were recovered. Semi-quantitative fluorometry (XRF) indicated that the catalyst contained, on a mass basis, 17.6% Fe, 37.8% Mo, 44.5% S, and 0.04% Ni. The catalyst material was particulate and had a particle size distribution with a mean particle size of 213 µm as determined by laser diffractometry using a Mastersizer S made by Malvern Instruments. The BET surface area of the catalyst was measured and found to be 301 $m^2/g$. The pore volume of the catalyst was found to be 0.311 $cm^3/g$ and the mean pore diameter was found to be from 20 to 150 angstroms. X-ray diffraction and Raman IR spectroscopy confirmed that at least a portion of the catalyst had an iron tetrathiomolybdate structure in which iron, sulfur, and molybdenum were arranged as shown in Formula (XII) above.

EXAMPLE 6

Three samples of the Peace River bitumen were cracked in separate cracking treatments: 1) a thermal cracking treatment in which no catalyst was included while the bitumen was cracked; 2) a catalytic cracking treatment including a pyrite ($FeS_2$) catalyst; and 3) a catalytic cracking treatment according to the process of the present invention including the iron tetrathiomolybdate catalyst prepared in Example 5. The cracking treatments were performed in accordance with the process as set forth in Example 3, except utilizing the iron tetrathiomolybdate or pyrite catalysts in place of the copper catalysts.

In one treatment, the bitumen was cracked by a thermal cracking process. In a second treatment, the bitumen was cracked by a catalytic cracking process wherein 40 grams of pyrite ($FeS_2$) was mixed with the bitumen in the reactor during the course of the cracking process. In a third treatment, the bitumen was cracked by a catalytic cracking process in accordance with the present invention wherein 40.12 grams of iron tetrathiomolybdate as prepared in Example 5 was mixed with the bitumen in the reactor during the course of the cracking process.

Figure 5:
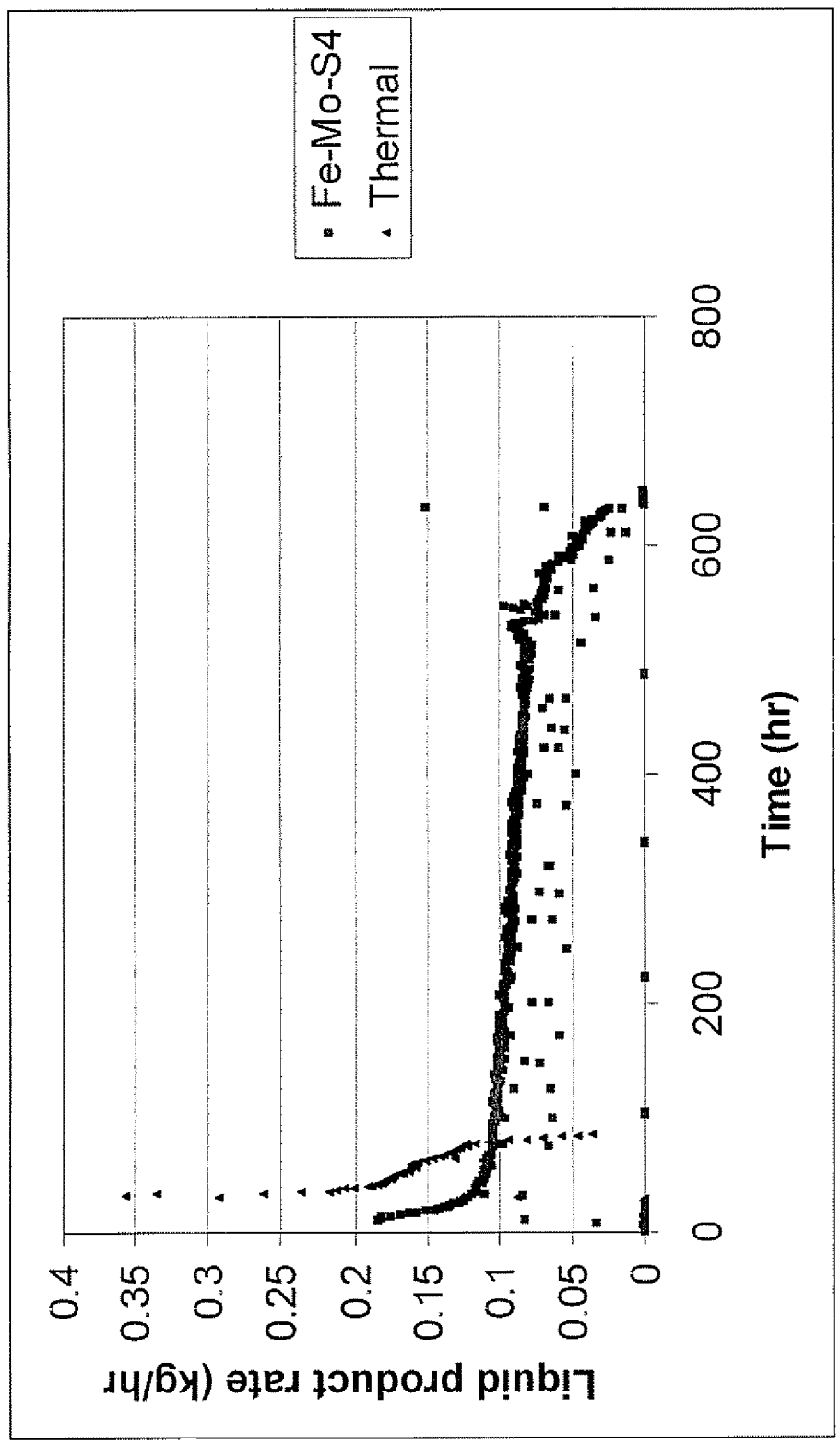
FIG. 5 is a chart plotting the liquid production rate v. time of reaction for a process practiced in accordance with the present invention utilizing a iron tetrathiomolybdate catalyst relative to processes not in accordance with the present invention.

As shown in FIG. 5, the bitumen was cracked using the iron tetrathiomolybdate catalyst for a significantly longer period of time than bitumen cracked thermally before the rate of production of liquid product dropped consistently below 25 grams/hour. No data is recorded in FIG. 5 for the cracking treatment utilizing the pyrite catalyst since the rate of production of liquid product dropped below 25 grams/hour nearly within a day when pyrite was used as a catalyst due to excessive solids accumulation in the reactor.

As a result, far more of the bitumen was cracked to form liquid product utilizing the iron tetrathiomolybdate catalyst in accordance with the process of the present invention than was produced by cracking the bitumen using the pyrite catalyst or by thermal cracking. Table 4 shows the relative amounts of bitumen and hydrogen provided in each treatment, the relative amounts of liquid product and solid byproduct produced by each process, as well as the sulfur content, nitrogen content, and boiling range distribution of the liquid products for the cracking treatments.

TABLE 4

|  | Fe—Mo—$S_4$ Catalyst Treatment 450° C. | Pyrite ($FeS_2$) Catalyst Treatment 450° C. | Thermal Treatment 450° C. |
|---|---|---|---|
| Total feed (kg) | 56.1 | 5.0 | 9.0 |
| Total $H_2$ (kg) | 32.1 | 1.3 | 4.2 |
| Total liquid product (kg) | 54.1 | 4.0 | 8.9 |
| Total solid product (kg) | 0.5 | not measured | 0.5 |
| Run time (hours) | 648 | 27 | 85 |
| Boiling point <180° C. (wt. %) | 10 | not measured | 13 |
| Boiling point 180° C. up to 250° C. (wt. %) | 10 | not measured | 12 |
| Boiling point 250° C. up to 360° C. (wt. %) | 38 | not measured | 37 |
| Boiling point 360° C. to 538° C. (wt. %) | 40 | not measured | 35 |
| Boiling point >538° C. (wt. %) | 1.5 | not measured | 2.5 |
| Sulfur (wt. %) | 2.9 | not measured | 0.3 |
| Nitrogen (wt. %) | 0.3 | not measured | 3.4 |

As shown in Table 4, bitumen cracked when mixed with hydrogen and an iron tetrathiomolybdate catalyst in accordance with the process of the invention provided significantly more liquid product than thermal cracking and cracking with an $FeS_2$ catalyst. Although not shown, more liquid product relative to solid product is also produced when iron tetrathiomolybdate is utilized as the catalyst relative to when pyrite was used as the catalyst since substantially less liquid product was produced when utilizing pyrite because the reaction was stopped due to a build-up of solid material in the reactor. Also as shown in Table 4, significantly less hydrocarbons having a boiling point of 538° C. or greater were present in the liquid product produced utilizing the iron tetrathiomolybdate catalyst relative to the thermally cracked liquid product. The liquid product produced by cracking the bitumen in the presence of the iron tetrathiomolybdate catalyst according to the process of the invention reduced the sulfur content relative to the bitumen feed, however, thermal cracking reduced the sulfur content of the thermally cracked liquid product significantly more.

EXAMPLE 7

A catalyst for use in a process of the present invention containing nickel, molybdenum, and sulfur was produced, where at least a portion of the catalyst had a structure according to Formula (XIII)

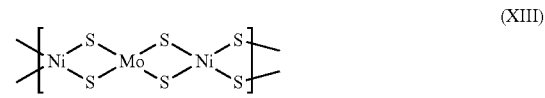

(XIII)

1429 grams of $NiSO_4$ were mixed with 9.5 liters of deionized water to form a nickel sulfate solution. Under nitrogen, the nickel sulfate solution was injected through a 2.75"×0.020" outer diameter nozzle into a stirred solution of 483 grams of $(NH_4)_2MoS_4$ in 11.4 liters of deionized water over a period of two hours at ambient temperature (25° C.). The mixture was stirred under nitrogen for an additional 2 hours after the addition of the nickel sulfate solution to the mixture was complete. The resulting slurry was allowed to settle for several hours, and then the solid catalyst material was separated from the mixture by centrifugal separation. The separated solid catalyst material was subsequently washed with water until conductivity measurements of the wash were below 300 µS at 28.4° C. The solid catalyst material was then dried by azeotropic distillation with xylenes at above 96° C. 539 g of the solid catalyst was recovered. Semi-quantitative XRF indicated that the catalyst contained, on a mass basis, 19.5% Ni, 31.1% Mo, 32.8% S, and minor elements 0.248% Cl, 0.153% P, and 0.171% Fe, providing a molar ratio of Ni:Mo of 0.98:1. The catalyst was particulate having a particle size distribution with a mean particle size of 203 µm as determined by laser diffractometry using a Mastersizer S made by Malvern Instruments. The BET surface area of the catalyst was measured and found to be 219 m$^2$/g. The pore volume of the catalyst was found to be 0.266 cm$^3$/g and the mean pore diameter was found to be 49 angstroms. X-ray diffraction and Raman IR spectroscopy confirmed that at least a portion of the catalyst had a structure in which nickel, sulfur, and molybdenum were arranged as shown in Formula (XIII) above.

EXAMPLE 8

Three samples of the Peace River bitumen were cracked in separate cracking treatments: 1) a thermal cracking treatment in which no catalyst was included while the bitumen was cracked; 2) a catalytic cracking treatment utilizing vaesite (NiS$_2$) as a catalyst; and 3) a catalytic cracking treatment according to the process of the present invention including the nickel tetrathiomolybdate catalyst prepared in Example 7. The cracking treatments were performed in accordance with the process as set forth in Example 3, except that the temperature in the reactor was maintained at 430° C. instead of 450° C. and nickel tetrathiomolybdate or vaesite catalysts were utilized in place of the copper catalysts.

In one treatment, the bitumen was cracked by a thermal cracking process. In a second treatment, the bitumen was cracked by a catalytic cracking process wherein 40 grams of vaesite (NiS$_2$) were mixed with the bitumen in the reactor at startup and during the course of the cracking process. In a third treatment, the bitumen was cracked by a catalytic cracking process in accordance with the present invention wherein 40 grams of nickel tetrathiomolybdate as prepared in Example 7 were mixed with the bitumen in the reactor at startup and during the course of the cracking process.

Figure 6:
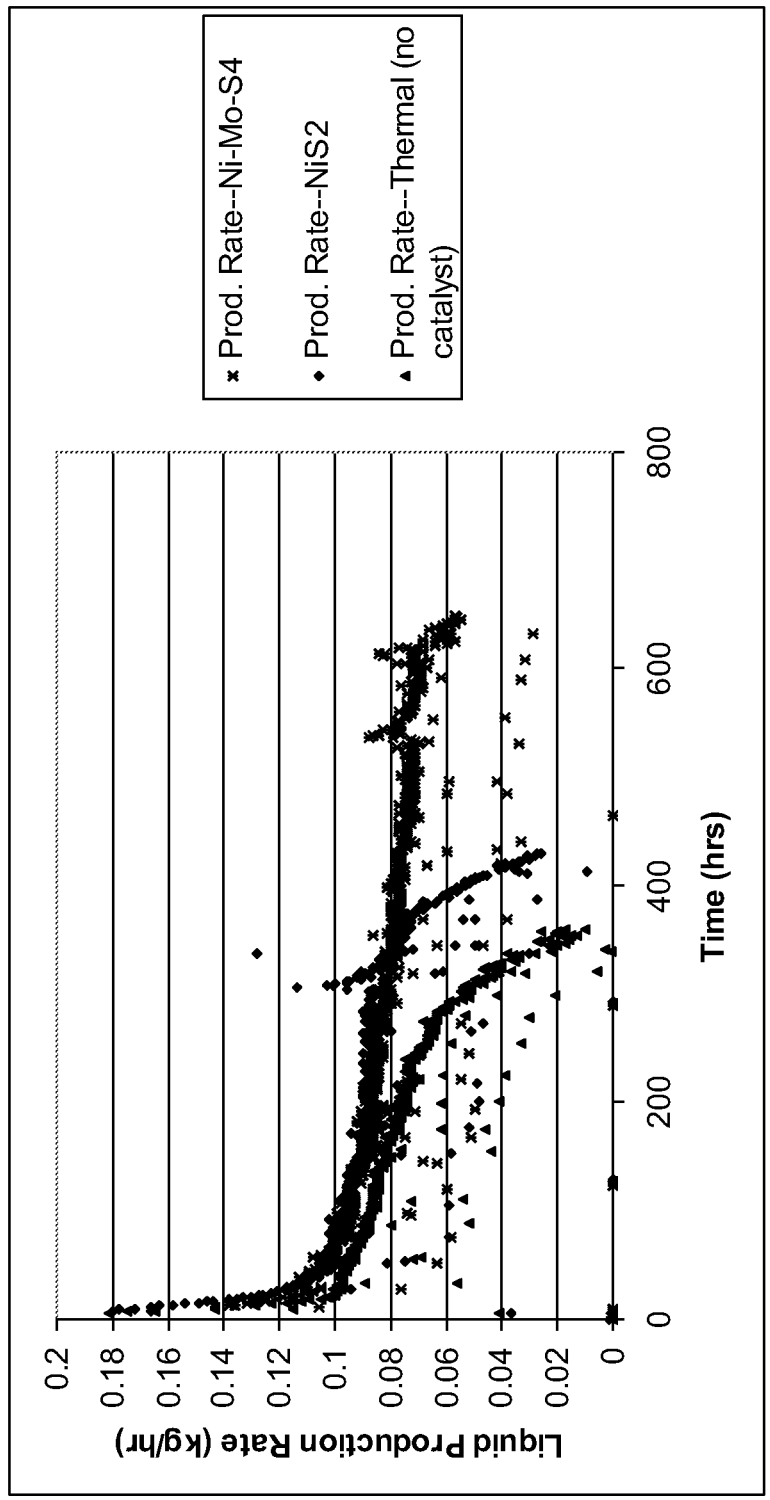
FIG. 6 is a chart plotting the liquid production rate v. time of a reaction for a process practiced in accordance with the present invention utilizing a nickel tetrathiomolybdate catalyst relative to processes not in accordance with the present invention.

As shown in FIG. 6, the bitumen could be cracked using the nickel tetrathiomolybdate catalyst for a significantly longer period of time than bitumen cracked with a vaesite (NiS$_2$) catalyst, which was cracked for a significantly longer period of time than a thermally cracked bitumen using no catalyst. As a result, far more of the bitumen was cracked to form liquid product utilizing the nickel tetrathiomolybdate catalyst in accordance with the process of the present invention, than was produced using the NiS$_2$ catalyst or by thermal cracking.

Table 5 shows the relative amounts of bitumen and hydrogen provided in each treatment, the relative amounts of liquid product and solid byproduct produced by each process, as well as the sulfur content, nitrogen content, and boiling range distribution of the liquid products for the nickel tetrathiomolybdate catalyst cracking process, the NiS$_2$ catalyst cracking process, and the thermal cracking process.

TABLE 5

| | Ni—Mo—S$_4$ Catalyst Treatment 430° C. | Vaesite (NiS$_2$) Catalyst Treatment 430° C. | Thermal Treatment 430° C. (no catalyst) |
|---|---|---|---|
| Total feed (kg) | 59.8 | 41.1 | 30.4 |
| Total H$_2$ (kg) | 34.7 | 21.3 | 17.8 |
| Total liquid product (kg) | 53.5 | 36.3 | 25.7 |
| Total solid product (kg) | 0.45 | 0.53 | 0.58 |
| Run time (hours) | 700 | 430 | 360 |
| Boiling point <180° C. (wt. %) | 10 | 10 | 10 |
| Boiling point 180° C. up to 250° C. (wt. %) | 10 | 11 | 11 |
| Boiling point 250° C. up to 360° C. (wt. %) | 37 | 38 | 38 |
| Boiling point 360° C. to 538° C. (wt. %) | 42 | 40.5 | 40 |
| Boiling point >538° C. (wt. %) | 0.5 | 0 | 0.5 |
| Sulfur (wt. %) | 2.78 | 3.14 | 3.33 |
| Nitrogen (wt. %) | 0.31 | 0.32 | 0.31 |

As shown in Table 5, cracking bitumen with hydrogen and a nickel tetrathiomolybdate catalyst in accordance with the process of the invention provided significantly more liquid product, and liquid product relative to solid product, than cracking thermally, or with an NiS$_2$ catalyst. The period of time that the bitumen was cracked was very significantly longer with the nickel tetrathiomolybdate catalyst than any of the other cracking processes.

EXAMPLE 9

A catalyst for use in a process of the present invention containing cobalt, molybdenum, and sulfur was produced, where at least a portion of the catalyst had a structure according to Formula (XIV).

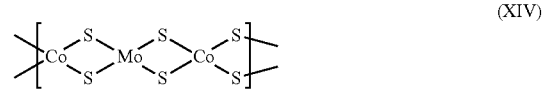

(XIV)

A Na$_2$MoS$_4$ solution was prepared by adding 120 g of Na$_2$CO$_3$ and 260.3 g of (NH$_4$)$_2$MoS$_4$ into 18.9 liters of deionized water at 83° C. with stirring. Under nitrogen, 281.1 g of cobalt sulfate in 1.2 liters of deionized water was injected into the stirred Na$_2$MoS$_4$ solution via 2.75"×0.020 outer diameter injector nozzle over a period of 18 minutes while maintaining the temperature at 83° C. The mixture was stirred under nitrogen for a few hours at 83° C., and then was cooled to ambient temperature and allowed to settle for several hours. Solids were then separated from the mixture by centrifugal separation. The separated solids were then washed with water until the conductivity measurement of the wash water was below 300 µS at 28° C. 305 g of the solid catalyst was recovered. Semi-quantitative XRF indicated that the catalyst contained, on a mass basis, 20.4% Co, 30.6% Mo, 46.6% S, and minor elements 0.161% Cu, 1.88% Na, <0.1% Ca, Ti, providing a molar ratio of Co:Mo of 1.08:1. The catalyst was particulate having a trimodal particle size distribution with a median particle size of 5 µm for the first mode, 50 µm for the second mode, and 120 μm for the third mode as determined by laser diffractometry using a Mastersizer S made by Malvern Instruments. The BET surface area of the catalyst was measured and found to be 101 m²/g. The pore volume of the catalyst was found to be 0.07 cm³/g and the mean pore diameter was found to be 27 angstroms. X-ray diffraction and Raman IR spectroscopy confirmed that at least a portion of the catalyst had a structure in which cobalt, sulfur, and molybdenum were arranged as shown in Formula (XIV) above.

EXAMPLE 10

Figure 7:
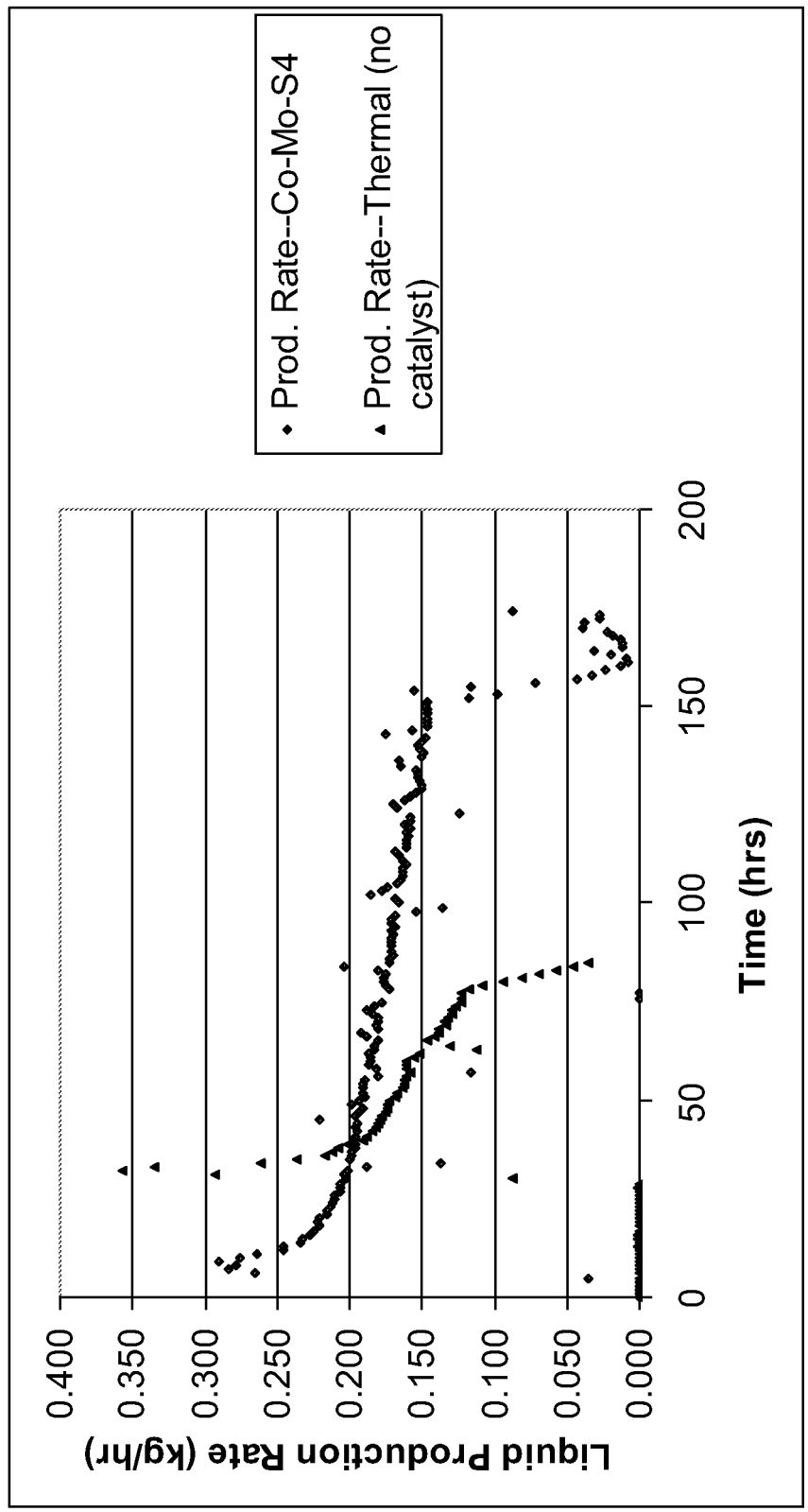
FIG. 7 is a chart plotting the liquid production rate v. time of a reaction for a process practiced in accordance with the present invention utilizing a cobalt tetrathiomolybdate catalyst relative to a process not in accordance with the present invention.

Samples of the Peace River bitumen utilized in Example 3 above were cracked at 450° C. according to the process of the present invention using the cobalt tetrathiomolybdate catalyst prepared in Example 9 and thermally with no catalyst. The conditions for the cracking processes were the same as described above in Example 3 except that the cobalt tetrathiomolybdate catalyst was utilized in place of the copper tetrathiomolybdate catalyst. FIG. 7 shows the liquid production rate relative to the time of the cracking process utilizing the cobalt tetrathiomolybdate catalyst and using no catalyst (thermal cracking). As shown in FIG. 7, the bitumen was cracked using the cobalt tetrathiomolybdate catalyst for a significantly longer period of time than a thermally cracked bitumen using no catalyst.

Table 6 shows the relative amounts of bitumen and hydrogen provided in the cracking process utilizing the cobalt tetrathiomolybdate catalyst and the thermal cracking process, the relative amounts of liquid products and solid byproducts produced by the processes, as well as the sulfur content, nitrogen content, and boiling range distribution of the liquid products produced in the cracking processes.

TABLE 6

|  | Co—Mo—S$_4$ Catalyst Treatment 450° C. | Thermal Cracking 450° C. (no catalyst) |
|---|---|---|
| Total feed (kg) | 30.4 | 9.0 |
| Total H$_2$ (kg) | 8.6 | 4.2 |
| Total liquid product (kg) | 27.3 | 8.9 |
| Total solid product (kg) | 0.61 | 0.5 |
| Run time (hours) | 174 | 85 |
| Boiling point <180° C. (wt. %) | 10 | 13 |
| Boiling point 180° C. up to 250° C. (wt. %) | 10 | 12 |
| Boiling point 250° C. up to 360° C. (wt. %) | 35 | 37 |
| Boiling point 360° C. to 538° C. (wt. %) | 43 | 35 |
| Boiling point >538° C. (wt. %) | 3 | 2.5 |
| Sulfur (wt. %) | 2.7 | 0.3 |
| Nitrogen (wt. %) | 0.32 | 3.4 |

As shown in Table 6, cracking bitumen with hydrogen and a cobalt tetrathiomolybdate catalyst in accordance with the process of the invention provided significantly more liquid product, and liquid product relative to solid product, than a thermal cracking process including no catalyst.

EXAMPLE 11

Processes in accordance with the present invention were conducted including different levels of hydrogen sulfide in the hydrocracking reaction mixture. Six samples of the Peace River bitumen described in Example 3 above were separately hydrocracked by mixing each bitumen sample with the catalyst prepared in Example 1, hydrogen, and hydrogen sulfide. The bitumen samples, catalyst, hydrogen, and hydrogen sulfide were mixed at selected temperatures, gas flow rates, hydrogen partial pressures, hydrogen sulfide partial pressures, feed uptake rates, and space velocities, as set forth in Table 7 below. The total pressure of each hydrocracking treatment was maintained at 13.1 MPa, where the hydrogen partial pressure of the treatments ranged from 8.8 MPa to 10.2 MPa, and the hydrogen sulfide partial pressure ranged from 2.9 MPa to 4.3 MPa. The total gas flow rate of each hydrocracking treatment was maintained at 950 standard liters per hour, where the hydrogen flow rate of the treatments ranged from 640-720 standard liters per hour and the hydrogen sulfide flow rate of the treatments ranged from 210-310 standard liters per hour. The liquid hourly space velocity of the bitumen feed for hydrocracking depended on the reaction rate, and ranged from 0.6 to 0.8 hr$^{-1}$. A target temperature was selected for each hydrocracking treatment within the range of 420° C. to 450° C. The conditions for each hydrocracking treatment of the six samples are shown below in Table 7.

In the hydrocracking treatment of each sample, the Peace River bitumen was preheated to approximately 105° C.-115° C. in a 10 gallon feed drum and circulated through a closed feed loop system from which the bitumen was fed into a semi-continuous stirred tank reactor with vapor effluent capability, where the reactor had an internal volume capacity of 1000 cm³. The reactor was operated in a continuous mode with respect to the bitumen feedstream and the vapor effluent product, however, the reactor did not include a bleed stream to remove accumulating metals and/or carbonaceous solids. The bitumen feed of each sample was fed to the reactor as needed to maintain a working volume of feed in the reactor of approximately 475 ml, where a Berthold single-point source nuclear level detector located outside the reactor was used to control the working volume in the reactor. 50 grams of the catalyst was mixed with the hydrogen, hydrogen sulfide, and bitumen feed sample in the reactor during the course of the hydrocracking treatment. The bitumen feed sample, hydrogen, hydrogen sulfide, and the catalyst were mixed together in the reactor by stirring with an Autoclave Engineers MagneDrive® impeller at 1200 rpm. Vaporized product exited the reactor, where a liquid product was separated from the vaporized product by passing the vaporized product through a high pressure separator operated at reaction pressure and 80° C. and then through a low pressure separator operated at 0.17 MPa and 80° C. to separate the liquid product from non-condensable gases. Each hydrocracking treatment was halted when the quantity of solids accumulating in the reactor as a byproduct of the hydrocracking reaction halted the impeller stirring by breaking the magnetic coupling of the internal mixer magnet with the external mixing magnet.

The hydrocracking conditions and liquid product characteristics for each sample are shown in Table 7:

TABLE 7

|  | Sample 1 | Sample 2 | Sample 3 | Sample 4 | Sample 5 |
|---|---|---|---|---|---|
| Catalyst loaded (g) | 50 | 50 | 50 | 50 | 50 |
| Temperature (° C.) | 428 | 426 | 435 | 454 | 454 |
| Total pressure (MPa) | 13.1 | 13.1 | 13.1 | 13.1 | 13.1 |
| Gas flow rate (SLPH) | 952 | 952 | 952 | 952 | 949 |
| $H_2$ partial pressure (MPa) | 9.4 | 8.9 | 9.3 | 8.8 | 8.8 |
| $H_2S$ partial pressure (MPa) | 3.7 | 4.1 | 3.8 | 4.3 | 4.3 |
| Bitumen feed rate (g/h) | 250 | 250 | 305 | 400 | 425 |
| Total liquid in (kg) | 36.4 | 20.6 | 30.4 | 17.2 | 17.8 |
| Total liquid out (kg) | 29.9 | 17.5 | 24.9 | 14.7 | 14.1 |
| Liquid recovery (wt. %) | 82.1 | 85.0 | 82.0 | 85.2 | 79.0 |
| Product density (g/cm³) | 0.9326 | 0.9268 | 0.9284 | 0.9234 | 0.9235 |
| Product API Gravity (15.6° C.) | 20.2 | 21.2 | 20.9 | 21.8 | 21.7 |
| Product viscosity (cSt)(15.6° C.) | 24.3 | 22.1 | 19.7 | 10.3 | 10.4 |
| Product carbon content (wt. %) | 84.8 | 84.8 | 85.1 | 85.0 | 85.4 |
| Product sulfur content (wt. %) | 3.4 | 3.4 | 3.2 | 3.3 | 3.2 |
| Product nitrogen content (wt. %) | 0.3 | 0.3 | 0.3 | 0.3 | 0.3 |
| Boiling point fractions (wt. %— Simulated Distillation as per ASTM D5307) | | | | | |
| Initial boiling point-204° C. (IBP-400° F.) | 8.5 | 9.0 | 10.5 | 15.5 | 16.0 |
| 204° C.-260° C. (400° F.-500° F.) | 10.5 | 11.0 | 11.5 | 14.5 | 14.5 |
| 260° C.-343° C. (500° F.-650° F.) | 31.0 | 31.0 | 29.5 | 31.0 | 30.5 |
| 343° C.-538° C. (650° F.-1000° F.) | 48.5 | 47.5 | 47.0 | 37.5 | 38.0 |
| 538° C.+ (1000° F.+) | 1.5 | 1.5 | 1.5 | 1.5 | 1.0 |

The liquid products of samples 1 and 2 were combined and the combined liquid product was then analyzed by GC-GC sulfur chemiluminescence to determine the carbon number of sulfur-containing hydrocarbons in the combined liquid product of hydrocarbons having a carbon number from 6 to 17 and of hydrocarbons having a carbon number of 18 or higher, and to determine the type of sulfur-containing hydrocarbons contained in the combined liquid product. The results are shown in Table 8, where non-benzothiophenes include sulfides, thiols, disulfides, thiophenes, arylsulfides, benzonaphthothiophenes, and naphthenic benzonaphthothiophenes, and where benzothiophenes include benzothiophene, naphthenic benzothiophenes, di-benzothiophenes, and naphthenic di-benzothiophenes. Sulfur-containing hydrocarbons for which a carbon number could not be determined are shown as having an indeterminate carbon number in Table 8.

TABLE 8

|  | Non-benzo-thiophenic compounds | Benzo-thiophenic compounds | Total | % of total | % benzothio-phenic compounds in fraction |
|---|---|---|---|---|---|
| C6-C17 S-containing hydrocarbons (wppm S) | 4554 | 17213 | 21767 | 62.9 | 79.1 |
| C18 and greater S-containing hydrocarbons (wppm S) | 1425 | 1382 | 2807 | 8.1 | |
| Indetermine C-number S-containing hydrocarbons (wppm S) | 3835 | 6194 | 10029 | 29.0 | |

As shown in Table 8, the hydrocracking treatment provided a hydrocarbon composition in which a significant portion of the sulfur in the composition was contained in relatively low carbon number hydrocarbons. These low carbon number heteroatomic hydrocarbons generally have a low molecular weight relative to the sulfur containing hydrocarbons having a carbon number of 18 or greater, and generally are contained in the naphtha and distillate boiling fractions, not the high molecular weight, high boiling residue and asphaltene fractions in which sulfur-containing hydrocarbons are more refractory.

The combined liquid product was then analyzed by flame ionization detection-two dimensional gas chromatography (GC×GC-FID) to determine the monoaromatic, diaromatic, and polyaromatic hydrocarbon (3 or more aromatic rings) content of the combined liquid product. Mono-aromatic compounds included mono-aromatics and naphthenic mono-aromatics, di-aromatic compounds included di-aromatics and naphthenic di-aromatics, and polyaromatics included polyaromatic compounds and naphthenic polyaromatic compounds. The results are shown in Table 9:

TABLE 9

|  | Mono-aromatic compounds | Di-aromatic compounds | Combined mono-aromatic and di-aromatic compounds | Poly-aromatic compounds | Total Aromatic compounds |
|---|---|---|---|---|---|
| wt. % of composition | 19.1 | 23.2 | 42.3 | 22.2 | 64.5 |

As shown in Table 9, the hydrocracking treatment provided a hydrocarbon composition that had a significant quantity of mono-aromatic and di-aromatic hydrocarbon compounds relative to the polyaromatic hydrocarbon compounds, where the weight ratio of the combined mono-aromatic and di-aromatic hydrocarbon compounds relative to the polyaromatic hydrocarbon compounds was 1.9:1.

EXAMPLE 12

Another catalyst was prepared, where at least a portion of the catalyst had the structure as shown in formula (XVII)

above. 781 grams of ammonium tetrathiomolybdate was mixed with 636 grams of $Na_2CO_3$ in 6 liters of water while stirring. The resulting solution was heated to 70° C. and then stirred for three hours to produce a solution of $Na_2MoS_4$. The $Na_2MoS_4$ solution was then permitted to cool overnight. A second solution was prepared by mixing 1498 grams of $CuSO_4 \cdot 5H_2O$ in 6 liters of water. The $CuSO_4$ solution was then added to the $Na_2MoS_4$ solution via pneumatic pump through a 0.02"×0.5" nozzle while stirring the mixture at ambient temperature. The mixture was stirred for two hours, and then the resulting solids were separated by centrifuge. 880 grams of solid particulate catalyst was recovered. The solids were then washed with water until the effluent from the wash had a conductivity of 488 µS at 33° C. The catalyst solids were particulate and had a particle size distribution with a mean particle size of 8.5 µm as determined by laser diffractometry using a Mastersizer S (Malvern Instruments). The BET surface area of the catalyst solids was measured to be 29.3 m²/g. Semi-quantitative XRF of the catalyst solids indicated that the catalyst solids contained 45.867 mass % Cu, 18.587 mass % Mo, and 27.527 mass % S. X-ray diffraction and Raman IR spectroscopy confirmed that at least a portion of the catalyst had a structure in which copper, molybdenum, and sulfur were arranged as shown in formula (XVII) above.

EXAMPLE 13

Peace River bitumen having the composition shown in Table 1 above was hydrocracked in a process in accordance with the present invention using different hydrogen sulfide levels to determine the effect of hydrogen sulfide on the rate of the hydrocracking reaction. Hydrogen sulfide was provided at 5 mol %, 11.4 mol %, and 20.1 mol % of the gas fed to the reactor. Hydrogen was provided at 70 mol % of the gas fed to the reactor when hydrogen sulfide was provided at 5 mol % (mole ratio of 1:14, hydrogen sulfide:hydrogen); 68.6 mol % of the gas fed to the reactor when hydrogen sulfide was provided at 11.4 mol % (mole ratio of 1:6, hydrogen sulfide: hydrogen); and 69.9 mol % of the gas fed to the reactor when hydrogen sulfide was provided at 20.1 mol % (mole ratio of 1:3.5, hydrogen sulfide:hydrogen). A control hydrocracking reaction was also run at 0 mol % hydrogen sulfide and 70.2 mol % hydrogen. Nitrogen was provided as an inert gas in the gas fed to the reactor to maintain the total pressure of the reaction at 8.3 MPa, where nitrogen was provided as 25 mol % of the gas fed to the reactor when hydrogen sulfide was provided at 5 mol % of the gas fed to the reactor; as 20 mol % of the gas fed to the reactor when hydrogen sulfide was provided at 11.4 mol % of the gas fed to the reactor; as 10 mol % of the gas fed to the reactor when hydrogen sulfide was provided at 20.1 mol % of the gas fed to the reactor; and as 29.8 mol % of the gas fed to the reactor in the control. Hydrogen and hydrogen sulfide provided 75% of the total pressure in the reaction when hydrogen sulfide was provided at 5 mol % of the gas fed to the reactor, and provided 80% of the total pressure when hydrogen sulfide was provided at 11.4 mol % and 20.1 mol % of the gas fed to the reactor.

Four samples of the bitumen were hydrocracked, one each at the above specified hydrogen sulfide:hydrogen:nitrogen levels. The hydrocracking conditions were the same as specified above for Example 11 except that the catalyst that was used was the catalyst prepared in Example 12, the total pressure was maintained at 8.3 MPa, hydrogen sulfide and hydrogen partial pressures depended on the amount of each provided to each of the hydrocracking reactions as set forth above, the temperature was 430° C. for each of the hydrocracking reactions, the gas flow rate was maintained at 900 standard liters per hour, and the working volume of feed in the reactor was maintained at 500 ml.

The rate of the production of hydrocracked product was measured for each of the samples. The results are shown in Table 10:

TABLE 10

| [mol %] $H_2S$ | time [hrs] | | | |
|---|---|---|---|---|
| | 5 | 10 | 15 | 20 |
| | Rate [Kg/h · m³] | | | |
| 0.0% | 370 | 335 | 300 | 265 |
| 5.0% | 403 | 370 | 338 | 305 |
| 11.4% | 426 | 394 | 361 | 329 |
| 20.1% | 448 | 418 | 387 | 357 |

Figure 8:
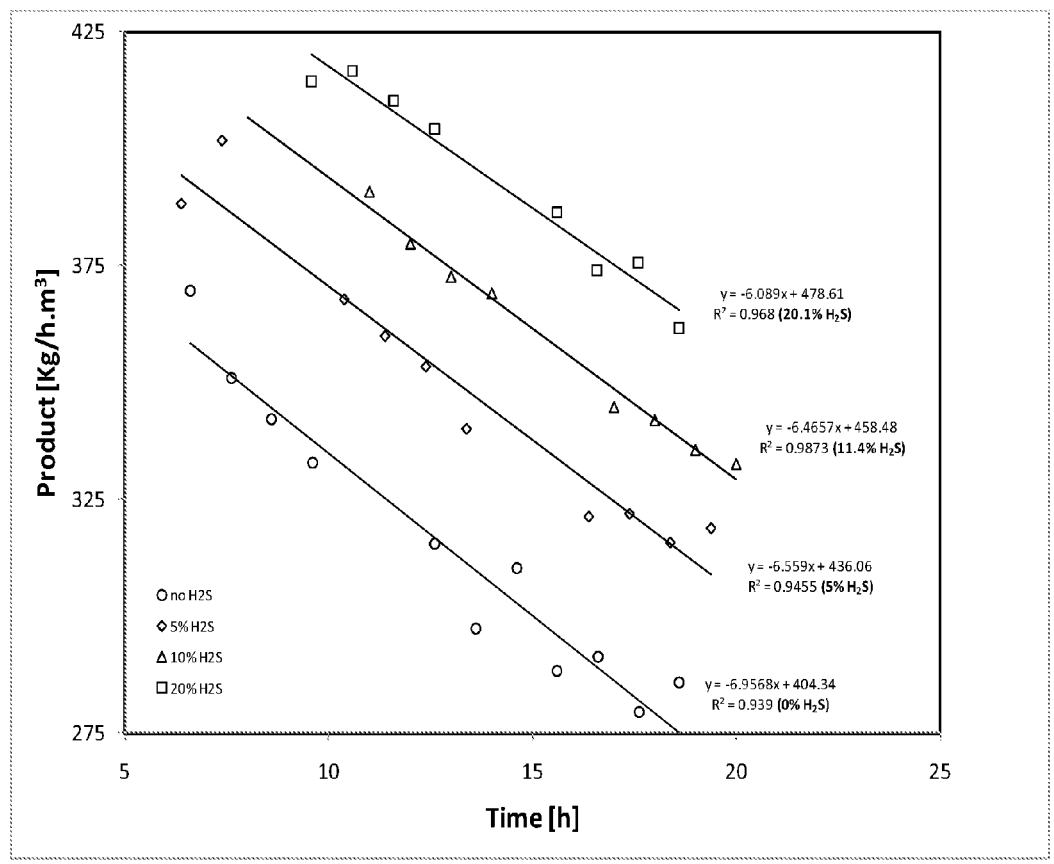
FIG. 8 is a chart plotting the effect of hydrogen sulfide on the rate of reaction of a process in accordance with the present invention.

A graphic depiction of the rate of production of product in each of the hydrocracking reactions is shown in FIG. 8.

As shown in Table 10 and FIG. 8, the rate of production of product in the hydrocracking reactions at constant temperature and total pressure increases as the quantity of hydrogen sulfide in the reaction mixture increases. It is believed that the rate will increase further at each hydrogen sulfide partial pressure, respectively, as temperature and total pressure are increased, for example, to 450° C. and 13.8 MPa. The rate of the reaction is maintained above 350 kg/h-m³ for a sustained period when hydrogen sulfide is present in an amount relative to hydrogen of at least 1:14 where the hydrogen sulfide and hydrogen provide at least 60% of the total pressure in the reaction, and is sustained for a longer period as the hydrogen sulfide levels increase.

EXAMPLE 14

Another catalyst was prepared for use in a hydrocracking process of the present invention to determine the relative amount of liquid hydrocarbon product, coke, non-condensable gas, and hold-up produced by the process. A solution was prepared by mixing 780 grams of ammonium tetrathiomolybdate and 636 grams of $Na_2CO_3$ in 13.5 liters of deionized water. The solution was heated to 85° C. to generate $Na_2MoS_4$. A separate solution of $CuSO_4$ was prepared by mixing 2994 grams of $CuSO_4$ in 5 liters of water. The $CuSO_4$ solution was heated to 85° C. and added to the $Na_2MoS_4$ solution through a 0.0625" spray nozzle. The mixed solution was stirred at 85° C. for 2 hours and then at room temperature overnight. Solid catalyst material was then separated from the solution by centrifuge. The solid catalyst material was washed until the wash effluent had a pH of 7 and conductivity of 488 µS at 33° C. The solid catalyst material was then dried. 548 grams of glossy black catalyst solids were recovered.

The catalyst solids were particulate and had a particle size distribution with a mean particle size of between 400 and 500 nm as determined by laser diffractometry using a Mastersizer S. The BET surface area of the catalyst was measured to be 58 m²/g. Semi-quantitative XRF indicated that the solid catalyst material contained 37.633 mass % Cu, 22.231 mass % Mo, 27.734 mass % S, and 0.503 mass % Na. X-ray diffraction and Raman IR spectroscopy confirmed that at least a portion of the catalyst solids had a structure in which copper, molybdenum, and sulfur were arranged as shown in formula (XVII) above. The catalyst solids had an acidity as measured by ammonia chemisorption of 70 µmol ammonia per gram of catalyst solids.

EXAMPLE 15

Peace River bitumen having the composition shown in Table 1 above was hydrocracked in a process in accordance with the present invention using gas containing 36.5 mol % hydrogen sulfide and 63.7 mol % hydrogen (mole ratio 1:1.75, hydrogen sulfide:hydrogen) to determine the relative amounts of liquid hydrocarbon product, non-compressible gas, and coke produced by the hydrocracking reaction. Hydrocracking conditions were the same as set forth in Example 11 except that the catalyst that was used in the process was the catalyst prepared in Example 14, the hydrogen sulfide partial pressure was 4.78 MPa, the temperature was 420° C., the gas flow rate was maintained at 948 standard liters per hour, the working volume of feed in the reactor was maintained at 500 ml, and the pressure in the low temperature separator was maintained at 1.38 MPa to improve the capture yield of condensable vapors.

Figure 9:
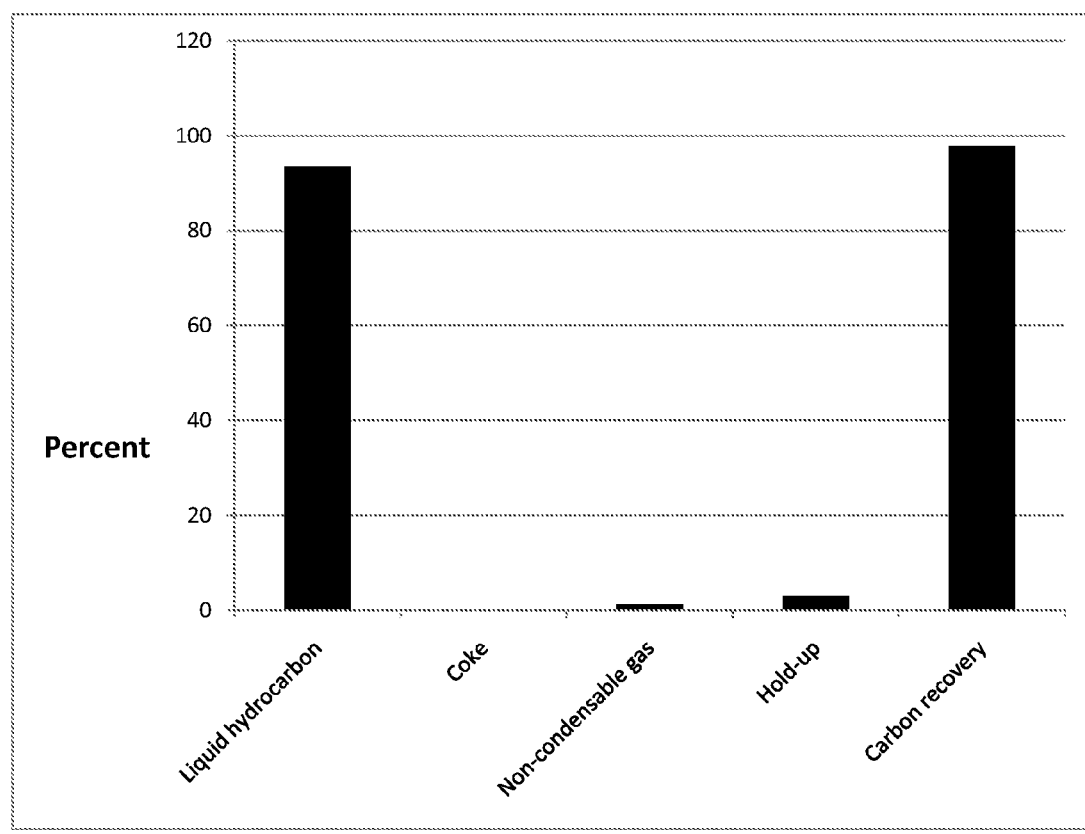
FIG. 9 is a chart plotting the yield of a process in accordance with the present invention.

The yield of liquid hydrocarbon product, non-condensable gas—including hydrogen, hydrogen sulfide, and hydrocarbons having a carbon number of from 1 to 6, coke, and hold-up were measured and compared with the carbon content of the feed provided. Hold-up included residual high molecular weight hydrocarbons that did not vaporize as product and that were soluble in toluene (so not, by definition, coke) and metals. The results are shown in FIG. 9. 93.5% of the carbon content of the material produced by the hydrocracking reaction was captured as liquid hydrocarbon product; 0.1% of the carbon content was produced as coke, 1.2% of the carbon content was produced as non-condensable gas, and 3.1% of the carbon content was produced as hold-up, where 97.8% of the carbon content of the bitumen feed was captured in the combined liquid hydrocarbon product, non-condensable gas, coke, and hold-up.

EXAMPLE 16

A zinc tetrathiomolybdate catalyst for use in a process of the present invention containing zinc, molybdenum, and sulfur was produced. 424 grams of $Na_2CO_3$ were added mixed in 0.5 liters of deionized water to form an aqueous $Na_2CO_3$ solution. The $Na_2CO_3$ solution was added dropwise to an aqueous solution containing 520.6 grams of $(NH_4)_2MoS_4$ dispersed in 1 liter of deionized water while stirring. The solutions were mixed at 53° C. After the addition of the $Na_2CO_3$ solution was complete, the 3 liters of deionized water was added to the aqueous mixture. Separately, 1076.8 grams of $ZnSO_4.H_2O$ was mixed in 3 liters of deionized water and heated to 74° C. In a 22 liter flask separate from the $Na_2CO_3$ solution and the $ZnSO_4$ solution, 8 liters of deionized water was heated to 89° C. Under a nitrogen atmosphere, the $Na_2CO_3$ solution and the $ZnSO_4$ solution were added simultaneously to the flask containing the heated water by pumping the solutions through separate 2"×0.02" nozzles at 40 ml/minute, where the aqueous mixture was stirred during the addition of the solutions. The aqueous mixture was stirred for an additional 1 hour at 80° C. after each of the solutions had been completely added to the aqueous mixture. A solid catalyst material was separated from the resulting slurry by centrifuge. The solids were collected and washed with water until the wash effluent had a conductivity of 1.4 mS at 26.5° C. The solid catalyst material was then dried at 55° C. under vacuum 851.9 grams of catalyst solids were recovered. Semi-quantitative XRF analysis showed that the solid catalyst material contained, on a mass basis, 44.636% Zn, 14.458% Mo, 21.311% S, 7.953 Na, and less than 0.005% Al, Si, Cl, Fe, and Ni.

The catalyst solids were particulate having a monomodal particle size distribution between 0.05 μm and 878 μm with the highest particle volume distribution centered at 150 μm as determined by laser diffractometry using a Mastersizer S (Malvern Instruments). The BET surface area of the catalyst was analyzed and measured to be 32.5 m²/g and the total pore volume of the catalyst was measured to be 0.061 cm³/g. The catalyst solids had a pore size distribution where the median pore size diameter was determined to be 75 angstroms.

EXAMPLE 17

A sample of the Peace River bitumen utilized in Example 3 above was cracked according to the process described above in Example 3, except that the zinc tetrathiomolybdate catalyst produced in Example 16 was used and the reactor had a volume capacity of 1000 cm³ where the working volume of was maintained at 500 ml. The total product produced from the hydrocracking of the bitumen was analyzed to determine the yield of liquid hydrocarbon product relative to coke and non-condensable gas and to determine its boiling point distribution, sulfur content, hydrogen content, and carbon content. The results are set forth in Table 11:

TABLE 11

| Property | Hydrocracked product |
|---|---|
| Hydrogen (wt. %) | 11.4 |
| Carbon (wt. %) | 85.7 |
| Sulfur (wt. %) | 2.2 |
| Viscosity at 38° C. (cSt) | 10 |
| Boiling Range Distribution | |
| Initial Boiling Point-204° C. (400° F.)(wt. %) [Naphtha] | 18 |
| 204° C. (400° F.)-343° C. (650° F.) (wt. %) [Distillates] | 41 |
| 343° C. (650° F.)-538° C. (1000° F.) (wt. %) [VGO] | 40 |
| >538° C. (1000° F.) (wt. %) [Residue] included in recovered liquid product | 0.8 |
| Coke | 0 |
| Non-condensable gas | 4.9 |

As shown in Table 11, the hydrocracked product comprised large quantity of liquid hydrocarbons relative to coke and gas, where coke was negligible, and where greater than 90% of the liquid hydrocarbons have a boiling point below 538° C.

The present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," or "including" various components or steps, the compositions and methods can also "consist essentially of" or "consist of" the various components and steps. Whenever a numerical range with a lower limit and an upper limit is disclosed, any number and any included range falling within the range is specifically disclosed. In particular, every range of values (of the form, "from a to b," or, equivalently, "from a-b") disclosed herein is to be understood to set forth every number and range encompassed within the broader range of values. Whenever a numerical range having a specific lower limit only, a specific upper limit only, or a specific upper limit and a specific lower limit is disclosed, the range also includes any numerical value "about" the specified lower limit and/or the specified upper limit Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces.

What is claimed is:

1. A process for cracking a hydrocarbon-containing feedstock, comprising:
   mixing, at a temperature selected from 375° C. to 500° C. and a total pressure selected from 69 MPa to 27.5 MPa:
   a) a hydrocarbon-containing feedstock containing at least 20 wt. % hydrocarbons having a boiling point of greater than 538° C. as determined in accordance with ASTM Method D5307;
   b) hydrogen; and
   c) a catalyst comprising a material comprised of a first metal and a second metal where the first metal is selected from the group consisting of Cu, Fe, Ni, Co, Bi, Ag, Mn, Zn, Sn, Ru, La, Ce, Pr, Sm, Eu, Yb, Lu, Dy, Pb, and Sb, where the second metal is selected from the group consisting of Mo, W, V, Sn, and Sb, where the second metal is different from the first metal, wherein at least a portion of the material of the catalyst has a structure according to a formula selected from the group consisting of formula (I), formula (VI), formula (VII), and formula (VIII):

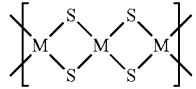
(I)

where M is either the first metal or the second metal, and at least one M is the first metal and at least one M is the second metal and at least a portion of the material of the catalyst having a structure of formula (I) has a structure according formula (V):

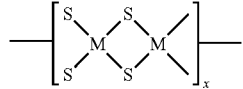
(V)

where M is either the first metal or the second metal, at least one M is the first metal, at least one M is the second metal, and x is at least 2;

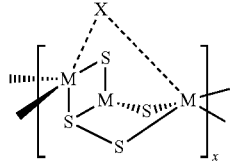
(VI)

where M is either the first metal or the second metal, at least one M is the first metal and at least one M is the second metal, and X is selected from the group consisting of $SO_4$, $PO_4$, oxalate ($C_2O_4$), acetylacetonate, acetate, citrate, tartrate, Cl, Br, I, $ClO_4$, and $NO_3$, and x is at least 2;

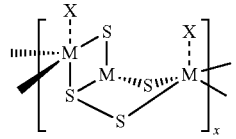
(VII)

where M is either the first metal or the second metal, at least one M is the first metal and at least one M is the second metal, and X is selected from the group consisting of $SO_4$, $PO_4$, oxalate ($C_2O_4$), acetylacetonate, acetate, citrate, tartrate, Cl, Br, I, $ClO_4$, and $NO_3$, and x is at least 2;

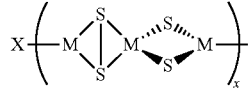
(VIII)

where M is either the first metal or the second metal, at least one M is the first metal and at least one M is the second metal, and X is selected from the group consisting of $SO_4$, $PO_4$, oxalate ($C_2O_4$), acetylacetonate, acetate, citrate, tartrate, Cl, Br, I, $ClO_4$, and $NO_3$, and x is at least 2;
where the hydrocarbon-containing feedstock, catalyst, and hydrogen form a mixture upon mixing; and
while mixing the mixture at the selected temperature and selected total pressure, separating a vapor comprising a hydrocarbon-containing product from the mixture, where the hydrocarbon-containing product is comprised of one or more hydrocarbon compounds that are liquid at STP.

2. The process of claim 1 further comprising the step of, apart from the mixture, condensing at least a portion of the vapor separated from the mixture to produce a liquid hydrocarbon-containing product separate from the mixture.

3. The process of claim 1 wherein at least a portion of the catalyst is in solid particulate form.

4. The process of claim 3 wherein the portion of the catalyst in solid particulate form has a particle size distribution having a median particle size or a mean particle size of from 50 nm up to 1 µm.

5. The process of claim 1 wherein the hydrocarbon-containing product separated from the mixture contains less than 3 wt. % hydrocarbons having a boiling point of greater than 538° C. as determined in accordance with ASTM Method D5307, and contains at least 80% of the atomic carbon initially contained in the hydrocarbon-containing feedstock.

6. The process of claim 1 wherein the atomic ratio of the first metal to the second metal in the catalyst is greater than 1:2.

7. The process of claim 1 wherein:
a) the hydrocarbon-containing feedstock, the catalyst, and the hydrogen are mixed by blending the hydrocarbon-containing feedstock, the catalyst, and the hydrogen in a mixing zone, where the mixing zone is maintained at a temperature of from 375° C. to 500° C. under a total pressure of from 6.9 MPa to 27.5 MPa to produce 1) the vapor comprising the hydrocarbon-containing product and
2) a hydrocarbon-depleted feed residuum comprising hydrocarbons that are liquid at the temperature and pressure within the mixing zone;

b) separating at least a portion of the vapor comprising the hydrocarbon-containing product from the mixing zone while blending the hydrocarbon-depleted feed residuum with the catalyst and hydrogen in the mixing zone.

8. The process of claim 7 wherein the hydrocarbon-containing feedstock, the hydrocarbon-depleted feed residuum, and the catalyst define a mixture volume, and the hydrocarbon-containing feedstock is provided to be mixed at a rate of at least 400 kg/hr per m³ of the mixture volume.

9. The process of claim 7 wherein the hydrocarbon-depleted feed residuum produced by blending the hydrocarbon-containing feedstock, the catalyst, and the hydrogen in the mixing zone contains less than 0.03 grams of carbonaceous substances that are insoluble in toluene as measured by ASTM Method D4072 per gram of hydrocarbon-containing feedstock provided to the mixing zone.

10. The process of claim 1 further comprising mixing hydrogen sulfide with the hydrocarbon-containing feedstock, the hydrogen, and the catalyst at a temperature of from 375° C. to 500° C. wherein the hydrogen sulfide is provided for mixing at a mole ratio of hydrogen sulfide to hydrogen of at least 0.5:9.5, where the hydrogen and hydrogen sulfide are provided for mixing such that the combined hydrogen and hydrogen sulfide partial pressures provide at least 60% of the total pressure.

11. The process of claim 1 wherein the hydrocarbon-containing feedstock contains at least 30 wt. % of hydrocarbons that are liquid at STP and have a boiling point of less than 538° C. as determined in accordance with ASTM Method D5307.

12. The process of claim 1 wherein the material comprised of the first metal and the second metal comprises at least 50 wt. % of the catalyst.

13. The process of claim 1 wherein the hydrocarbon-containing product separated from the mixture contains at least 40% of the atomic sulfur present in the hydrocarbon-containing feedstock.

14. The process of claim 1 wherein the hydrocarbon-containing product separated from the mixture contains at least 40% of the atomic nitrogen present in the hydrocarbon-containing feedstock.

15. The process of claim 1 wherein the first metal is selected from copper or iron and the second metal is molybdenum.

16. The process of claim 1 wherein the first metal is selected from copper or nickel and the second metal is vanadium.

17. The process of claim 1 wherein the hydrocarbon-containing feedstock contains at least 30 wt. % hydrocarbons having a boiling point of greater than 538° C. as determined in accordance with ASTM Method D5307.

18. The process of claim 1 wherein the catalyst has an acidity as measured by ammonia chemisorption of at most 200 µmol ammonia per gram of catalyst.

19. The process of claim 1 wherein the material of the catalyst that is comprised of the first metal and the second metal is a polymer.

20. The process of claim 1 wherein the material of the catalyst that is comprised of the first metal and the second metal contains less than 0.5 wt. % of non-sulfur-containing ligands.

21. The process of claim 1 wherein the catalyst has a BET surface area of from 50 m²/g to 500 m²/g.

22. The process of claim 1 wherein the hydrocarbon-containing product contains at most 0.001 wt. % vanadium, at most 0.001 wt. % iron, and at most 0.001 wt. % nickel.

23. The process of claim 1 wherein the material of the catalyst having the structure according to formula (I), (II), (III), or (IV) is comprised of a third metal selected from the group consisting of Cu, Fe, Bi, Ag, Mn, Zn, Ni, Co, Sn, Re, Rh, Pd, Ir, Pt, Ce, La, Pr, Sm, Eu, Yb, Lu, Dy, Pb, Cd, Sb, and In, where the third metal is not the same as the first metal or the second metal, where M of formula (I), (II), (III), or (IV) is either the first metal, the second metal, or the third metal and where one M is the first metal, one M is the second metal, and one M is the third metal.

24. The process of claim 1 wherein the vapor separated from mixture is hydroprocessed by contacting the vapor with a hydroprocessing catalyst and hydrogen at a temperature of from 260° C. to 425° C. and a total pressure of from 3.4 MPa to 27.5 MPa.

* * * * *